(12) United States Patent
Kanei et al.

(10) Patent No.: US 12,062,503 B2
(45) Date of Patent: Aug. 13, 2024

(54) PHOTOELECTRIC CONVERSION ELEMENT, PHOTOELECTRIC CONVERSION MODULE, ELECTRONIC DEVICE, AND POWER SUPPLY MODULE

(71) Applicants: Naomichi Kanei, Shizuoka (JP); Tamotsu Horiuchi, Kyoto (JP); Yuuji Tanaka, Shizuoka (JP); Nozomu Tamoto, Shizuoka (JP); Tetsuya Honda, Shizuoka (JP)

(72) Inventors: Naomichi Kanei, Shizuoka (JP); Tamotsu Horiuchi, Kyoto (JP); Yuuji Tanaka, Shizuoka (JP); Nozomu Tamoto, Shizuoka (JP); Tetsuya Honda, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 113 days.

(21) Appl. No.: 17/770,666

(22) PCT Filed: Nov. 30, 2020

(86) PCT No.: PCT/JP2020/044414
§ 371 (c)(1),
(2) Date: Apr. 21, 2022

(87) PCT Pub. No.: WO2021/107158
PCT Pub. Date: Jun. 3, 2021

(65) Prior Publication Data
US 2022/0392714 A1  Dec. 8, 2022

(30) Foreign Application Priority Data

Nov. 28, 2019 (JP) ................................ 2019-215219
Feb. 27, 2020 (JP) ................................ 2020-031165
Nov. 27, 2020 (JP) ................................ 2020-196723

(51) Int. Cl.
*H01G 9/20* (2006.01)

(52) U.S. Cl.
CPC ......... *H01G 9/2077* (2013.01); *H01G 9/2068* (2013.01); *H01G 9/2081* (2013.01); *H01G 9/2031* (2013.01)

(58) Field of Classification Search
CPC .. H01G 9/2077; H01G 9/2081; H01G 9/2068; H10K 30/50; H10K 30/88
See application file for complete search history.

(56) References Cited

U.S. PATENT DOCUMENTS 10,367,103 B2    7/2019   Tanaka et al.
10,636,579 B2    4/2020   Tanaka et al.
(Continued)

FOREIGN PATENT DOCUMENTS

EP        3547339 A1     10/2019
JP      2013-004178      1/2013
(Continued)

OTHER PUBLICATIONS

English machine translation of WO 2013/114733A1. (Year: 2013).*
(Continued)

*Primary Examiner* — Lindsey A Buck
(74) *Attorney, Agent, or Firm* — XSENSUS LLP

(57) ABSTRACT

A photoelectric conversion element including: a first substrate; a first electrode; a photoelectric conversion layer; a second electrode; and a second substrate, wherein the photoelectric conversion element includes a sealing part sealing at least the photoelectric conversion layer, the sealing part is disposed so as to surround periphery of the photoelectric conversion layer, and a width of the sealing part disposed at each side has a minimum width A and a maximum width B in a width direction, and a ratio (B/A) of the maximum width B to the minimum width A is 1.02 or more but 5.0 or less.

16 Claims, 12 Drawing Sheets

(56) References Cited

U.S. PATENT DOCUMENTS

| | | |
|---|---|---|
| 10,651,390 B2 | 5/2020 | Matsuyama et al. |
| 10,727,001 B2 | 7/2020 | Kanei et al. |
| 10,763,050 B2 | 9/2020 | Tanaka et al. |
| 2011/0223704 A1 | 9/2011 | Doi et al. |
| 2017/0243698 A1 | 8/2017 | Kanei et al. |
| 2018/0197688 A1 | 7/2018 | Horiuchi et al. |
| 2018/0198083 A1* | 7/2018 | Tanaka ................. H10K 30/151 |
| 2019/0252129 A1 | 8/2019 | Horiuchi et al. |
| 2019/0305153 A1 | 10/2019 | Tanaka et al. |
| 2019/0305168 A1 | 10/2019 | Honda et al. |
| 2020/0066458 A1 | 2/2020 | Matsuyama et al. |

FOREIGN PATENT DOCUMENTS

| | | |
|---|---|---|
| JP | 2016-174086 | 9/2016 |
| JP | 2018-098223 | 6/2018 |
| JP | 2019-169615 | 10/2019 |
| JP | 2019-176136 | 10/2019 |
| WO | WO2013/114733 A1 | 8/2013 |

OTHER PUBLICATIONS

Extended European Search Report issued Dec. 14, 2022, in corresponding European Patent Application No. 20893405.9, 6 pp.
International Search Report Issued Feb. 9, 2021 for counterpart International Patent Application No. PCT/JP2020/044414 filed Nov. 30, 2020, 3 pages.
Written Opinion Issued Feb. 9, 2021 for counterpart International Patent Application No. PCT/JP2020/044414 filed Nov. 30, 2020, 4 pages.

* cited by examiner

[Fig. 1]
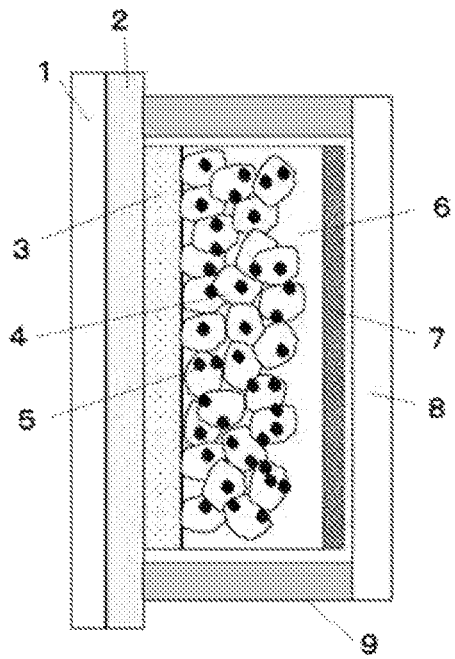
[Fig. 2]
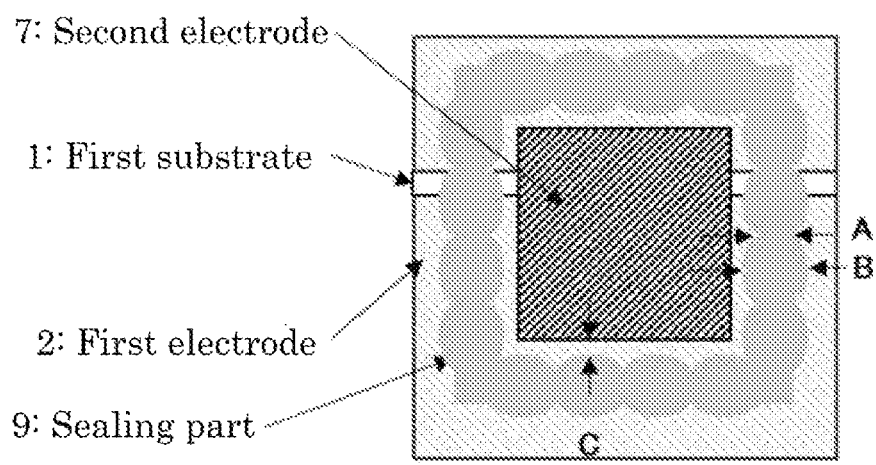

[Fig. 3]
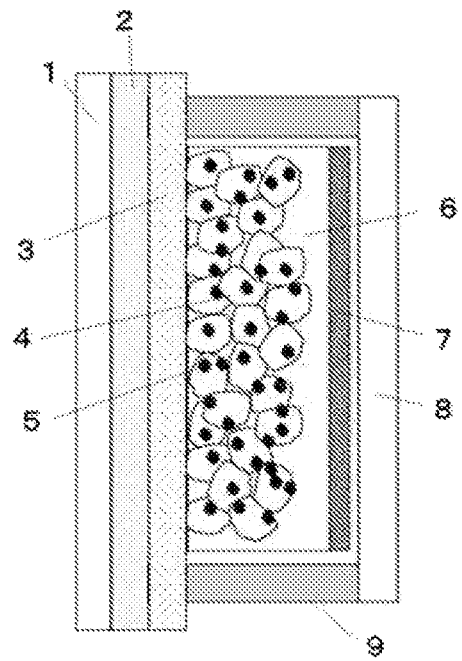
[Fig. 4]
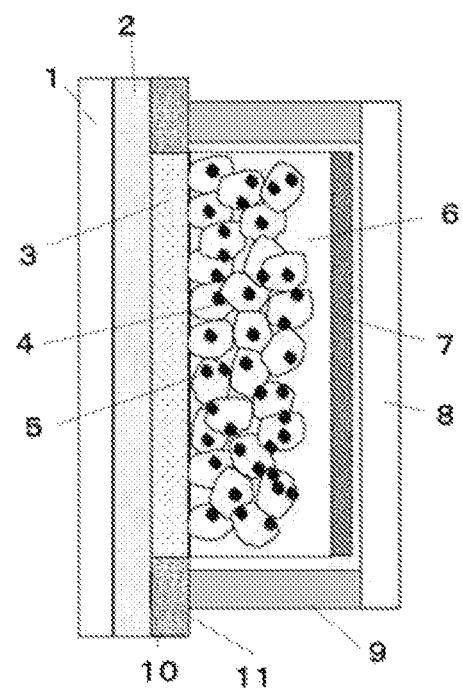

[Fig. 5]
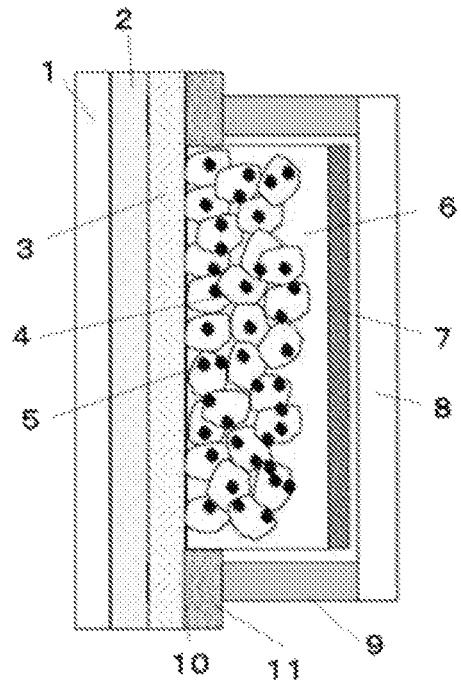
[Fig. 6]
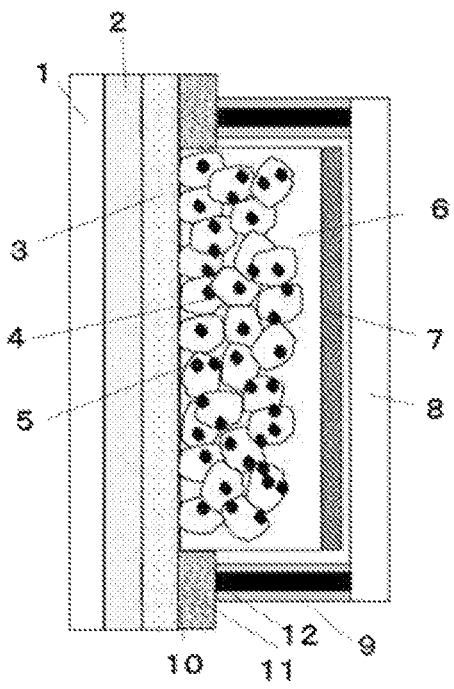

[Fig. 7]
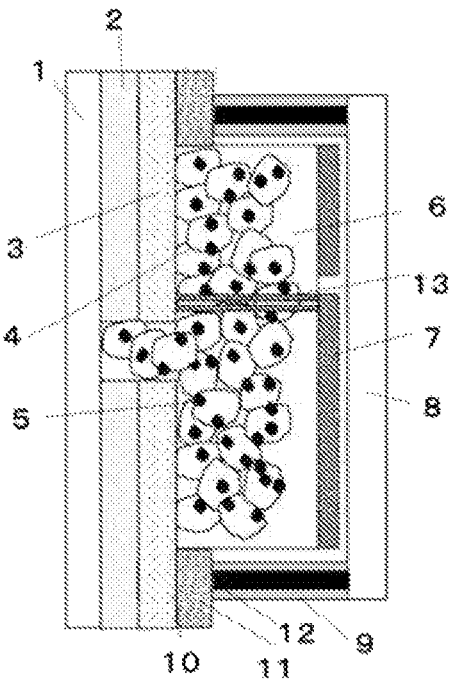
[Fig. 8]
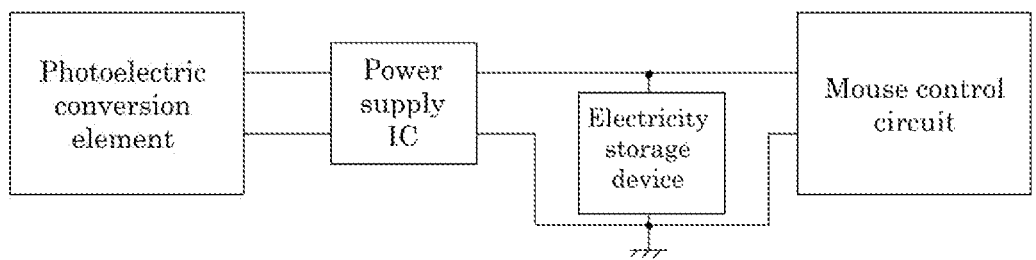
[Fig. 9]
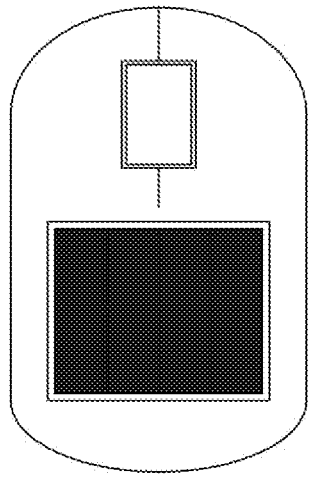

[Fig. 10]
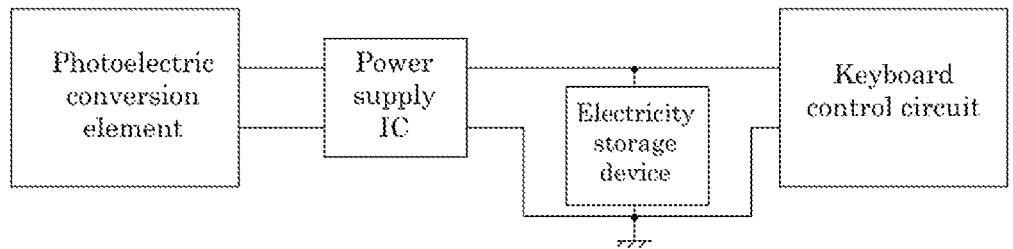
[Fig. 11]
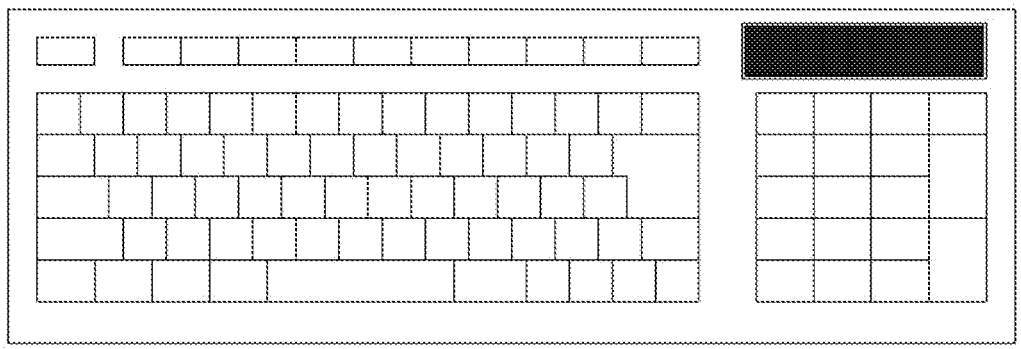
[Fig. 12]
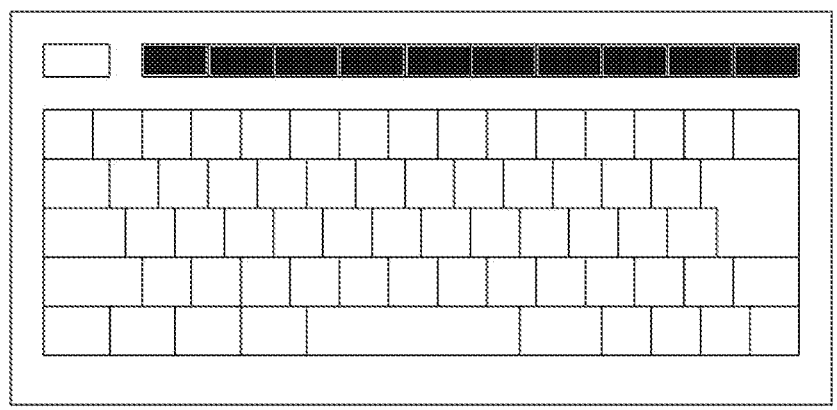

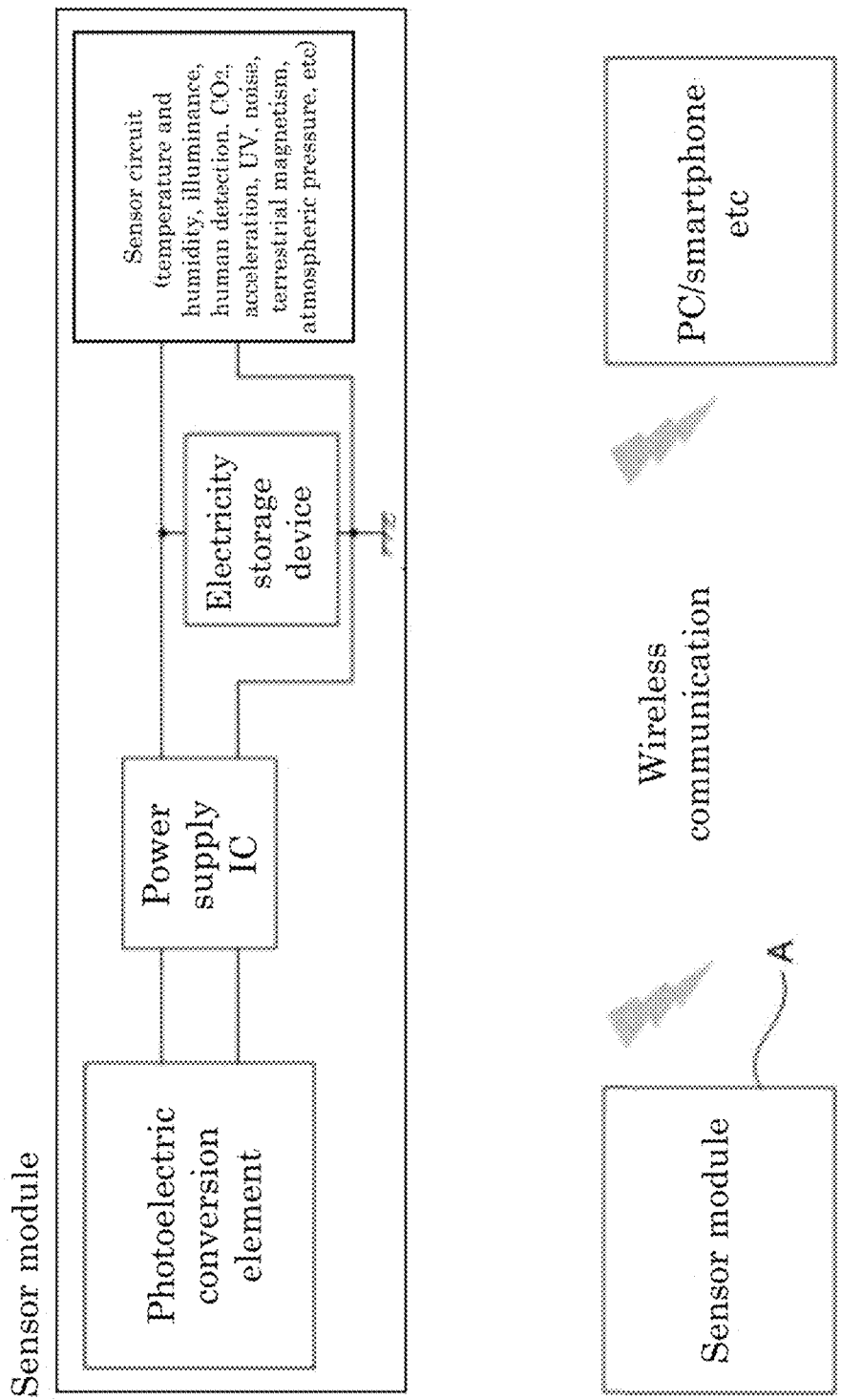
[Fig. 13]

[Fig. 14]
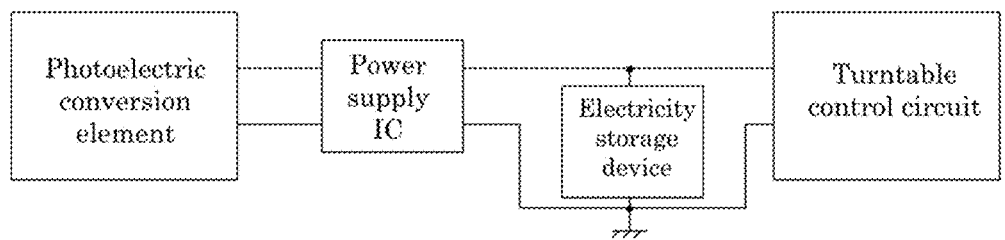

[Fig. 15]
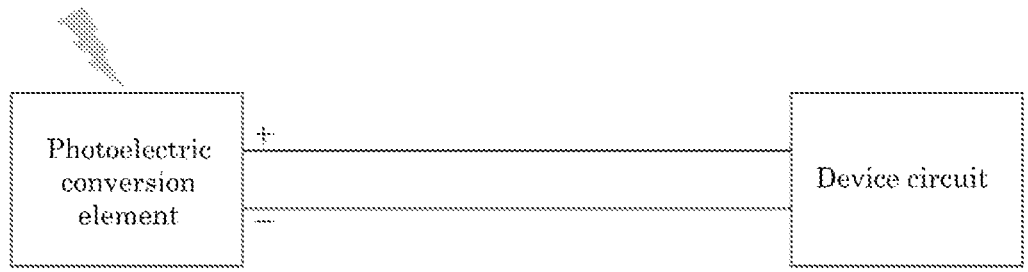
[Fig. 16]
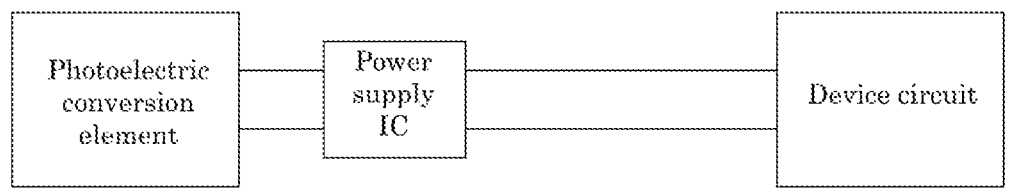
[Fig. 17]
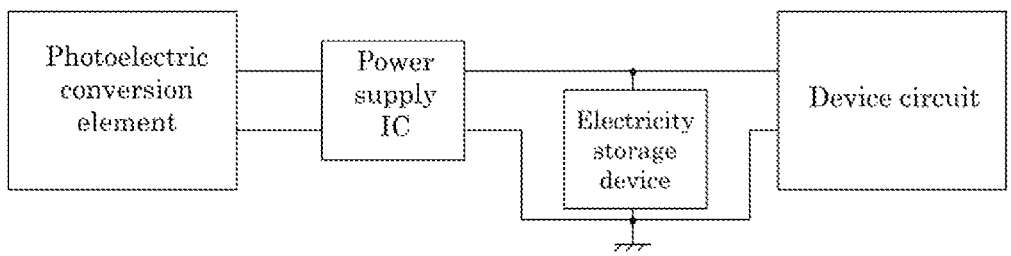
[Fig. 18]
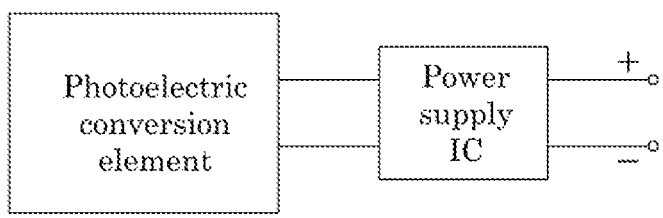
[Fig. 19]
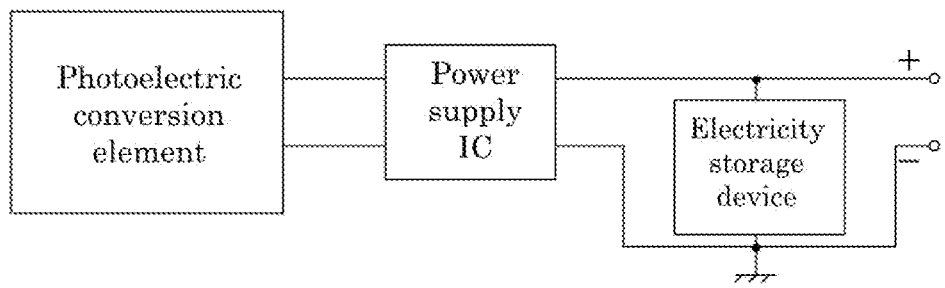

[Fig. 20]
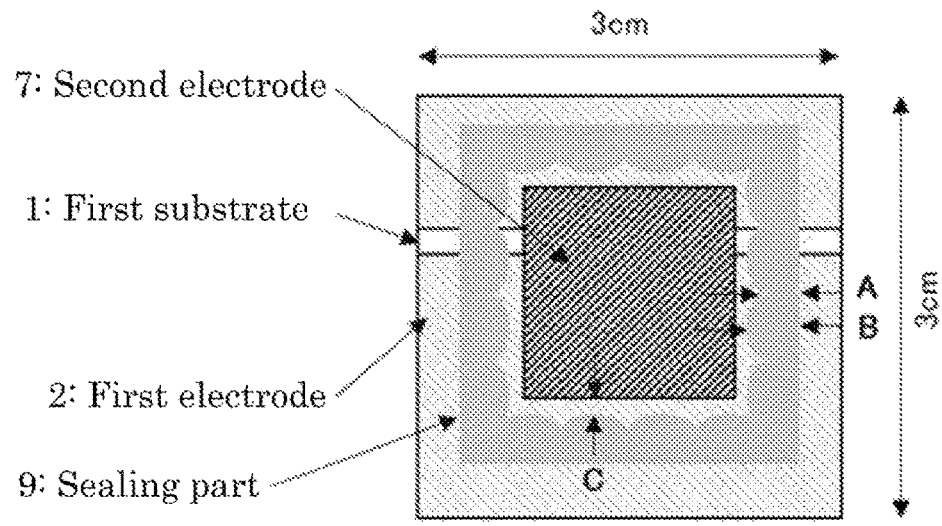
[Fig. 21]
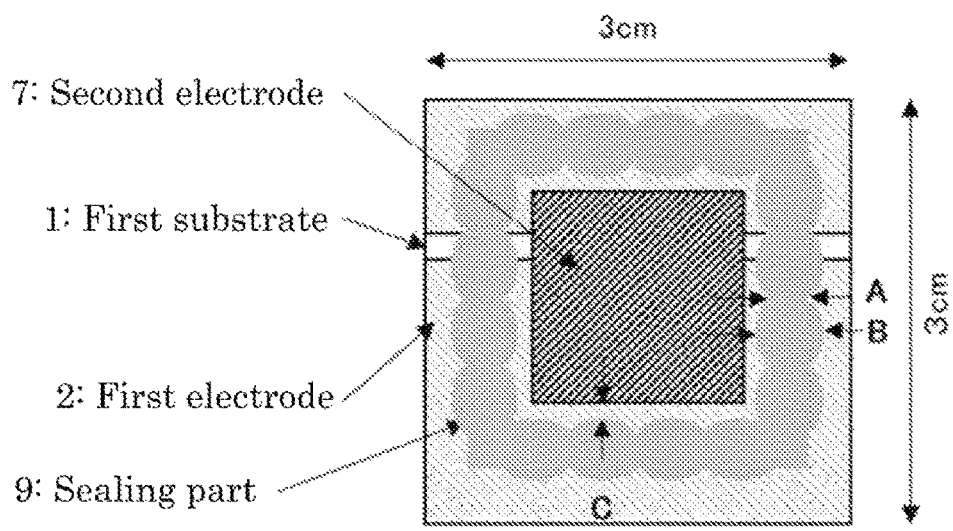
[Fig. 22]
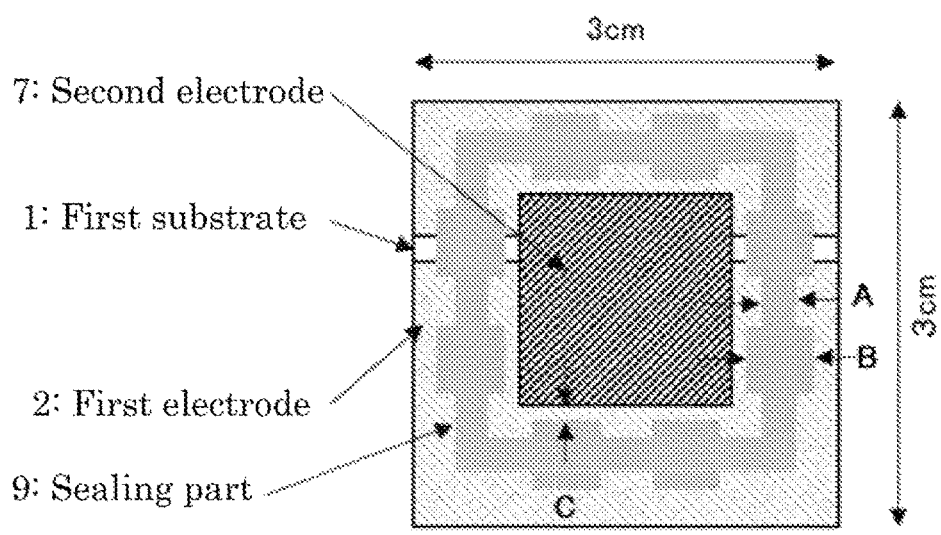

[Fig. 23]
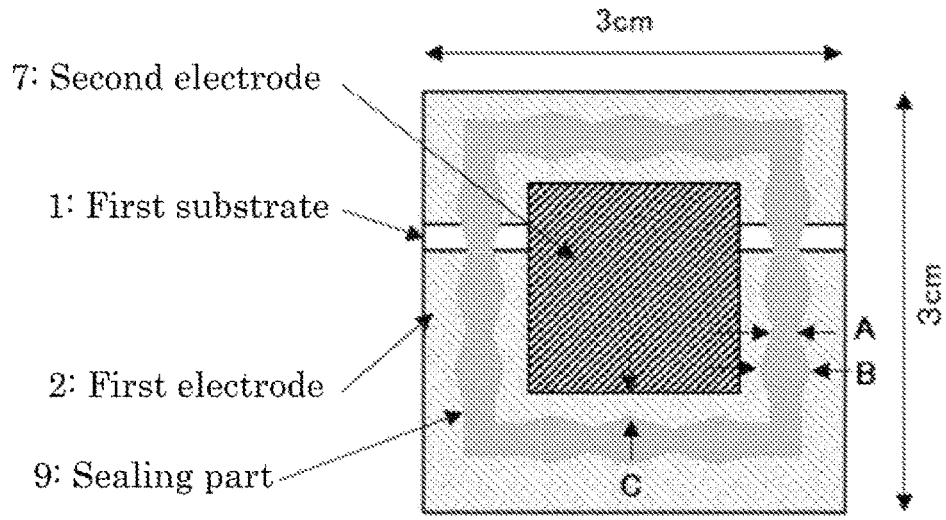
[Fig. 24]
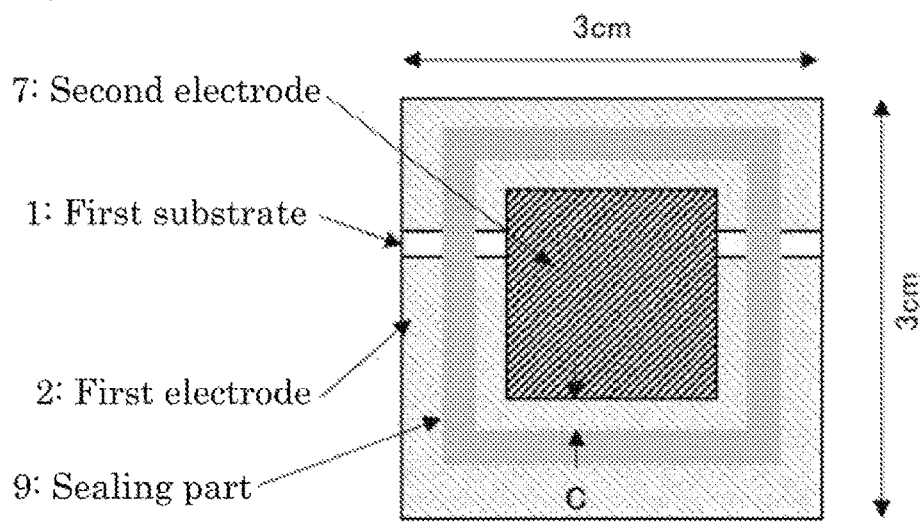
[Fig. 25]
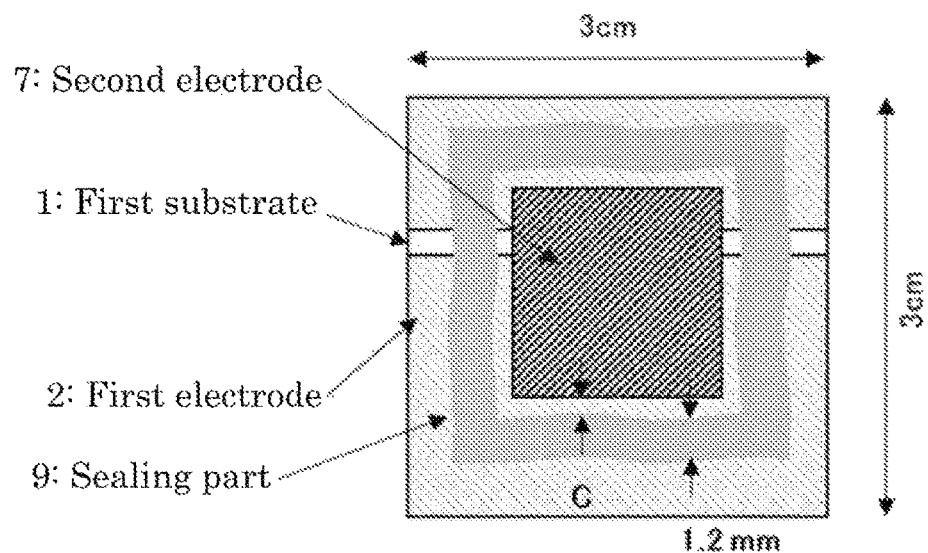

[FIG. 26]
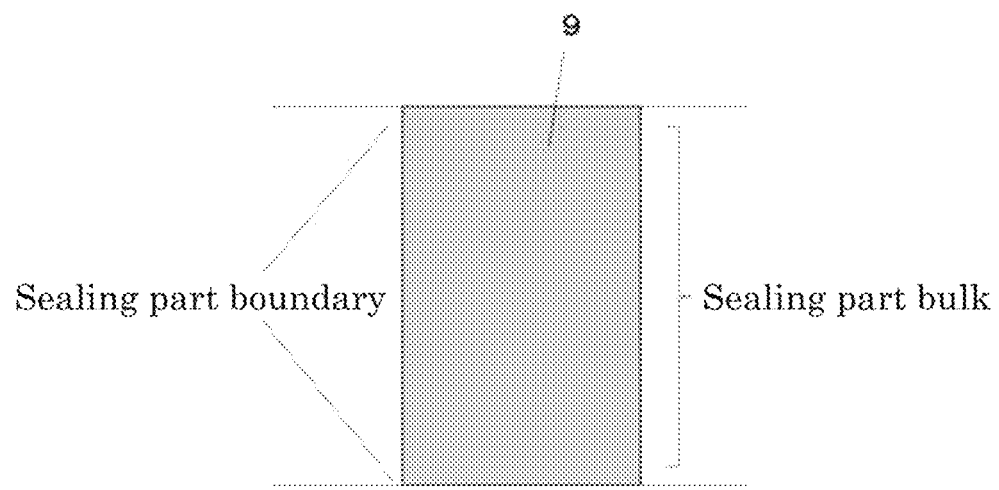

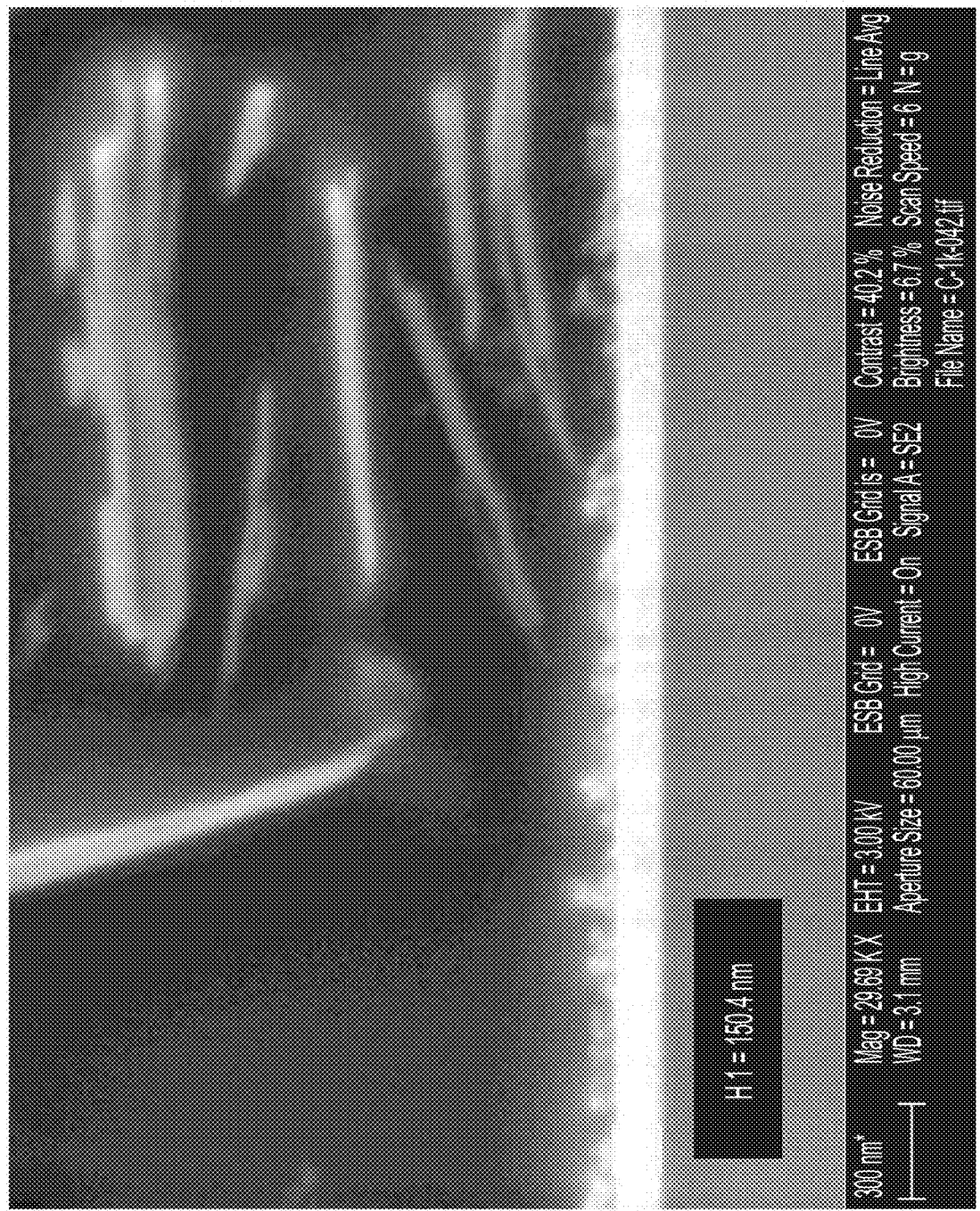
[FIG. 27]

PHOTOELECTRIC CONVERSION ELEMENT, PHOTOELECTRIC CONVERSION MODULE, ELECTRONIC DEVICE, AND POWER SUPPLY MODULE

CROSS-REFERENCE TO RELATED APPLICATIONS

The present application is based on PCT filing PCT/JP2020/044414, filed Nov. 30, 2020, which claims priority to JP 2019-215219, filed Nov. 28, 2019, JP 2020-031165, filed Feb. 27, 2020 and JP 2020-196723, filed Nov. 27, 2020, the entire contents of each are incorporated herein by reference.

TECHNICAL FIELD

The present disclosure relates to a photoelectric conversion element, a photoelectric conversion module, an electronic device, and a power supply module.

BACKGROUND ART

In recent years, solar cells increasingly become important as alternative energies to fossil fuels or as measures against global warming. Solar cells and photodiodes are obtained by applying photoelectric conversion elements that can convert light energy into electric energy.

In recent years, indoor-type photoelectric conversion elements, which have a high power generation performance not only under sunlight (illuminance under direct light: about 100,000 lux), but also under light of a low illuminance (illuminance: 20 lux or more but 1,000 lux or less) such as a light emitting diode (LED) or a fluorescent lamp, have attracted attention.

For example, an organic thin film solar call provided with a sealing part so as to surround a photoelectric conversion element has been proposed (see, for example, PTL 1).

CITATION LIST

Patent Literature

PTL 1: Japanese Unexamined Patent Application Publication No. 2016-174086

SUMMARY OF INVENTION

Technical Problem

An object of the present disclosure is to provide a photoelectric conversion element that has a good photoelectric conversion property even under light of a low illuminance and is excellent in durability to mechanical stress.

Solution to Problem

According to one aspect of the present disclosure, a photoelectric conversion element includes: a first substrate; a first electrode; a photoelectric conversion layer; a second electrode; and a second substrate. The photoelectric conversion element includes a sealing part sealing at least the photoelectric conversion layer. The sealing part is disposed so as to surround periphery of the photoelectric conversion layer. A width of the sealing part disposed at each side has a minimum width A and a maximum width B in a width direction. A ratio (B/A) of the maximum width B to the minimum width A is 1.02 or more but 5.0 or less.

Advantageous Effects of Invention

According to the present disclosure, it is possible to provide a photoelectric conversion element that has a good photoelectric conversion property even under light of a low illuminance and is excellent in durability to mechanical stress.

BRIEF DESCRIPTION OF DRAWINGS

FIG. 1 is a schematic view presenting one example of a cross section of a photoelectric conversion element of the first embodiment.

FIG. 2 is a schematic plan view presenting one example of a sealing part in the photoelectric conversion element of the first embodiment.

FIG. 3 is a schematic view presenting another example of a photoelectric conversion element of the second embodiment.

FIG. 4 is a schematic view presenting another example of a photoelectric conversion element of the third embodiment of the present disclosure.

FIG. 5 is a schematic view presenting another example of a photoelectric conversion element of the fourth embodiment of the present disclosure.

FIG. 6 is a schematic view presenting another example of a photoelectric conversion element of the fifth embodiment.

FIG. 7 is a schematic view presenting one example of a photoelectric conversion module of the present disclosure.

FIG. 8 is a block diagram of a mouse for a personal computer as one example of an electronic device of the present disclosure.

FIG. 9 is a schematic external view presenting one example of the mouse presented in FIG. 8.

FIG. 10 is a block diagram of a keyboard for a personal computer as one example of an electronic device of the present disclosure.

FIG. 11 is a schematic external view presenting one example of the keyboard presented in FIG. 10.

FIG. 12 is a schematic external view presenting another example of the keyboard presented in FIG. 10.

FIG. 13 is a block diagram of a sensor as one example of an electronic device of the present disclosure.

FIG. 14 is a block diagram of a turntable as one example of an electronic device of the present disclosure.

FIG. 15 is a block diagram presenting one example of an electronic device of the present disclosure.

FIG. 16 is a block diagram presenting one example where a power supply IC is further incorporated into the electronic device presented in FIG. 15.

FIG. 17 is a block diagram presenting one example where an electricity storage device is further incorporated into the electronic device presented in FIG. 16.

FIG. 18 is a block diagram presenting one example of a power supply module of the present disclosure.

FIG. 19 is a block diagram presenting one example where an electricity storage device is further incorporated into the power supply module presented in FIG. 18.

FIG. 20 is a schematic view presenting a sealing structure having a curved shape in a sealing part of the photoelectric conversion element of Example 1.

FIG. 21 is a schematic view presenting a sealing structure having a curved shape in a sealing part of the photoelectric conversion elements of Examples 2 to 9.

FIG. 22 is a schematic view presenting a sealing structure having a curved shape in a sealing part of the photoelectric conversion element of Example 19.

FIG. 23 is a schematic view presenting a wedge-shaped sealing structure in a sealing part of the photoelectric conversion element of Example 23.

FIG. 24 is a schematic view presenting a sealing structure of a linear sealing part of the photoelectric conversion element of Comparative Example 1.

FIG. 25 is a schematic view presenting a sealing structure of a tortuous sealing part of the photoelectric conversion element of Comparative Example 2.

FIG. 26 is a schematic view presenting one example of a sealing part.

FIG. 27 is a cross-sectional SEM photograph presenting a region including a deletion layer in a deletion part.

DESCRIPTION OF EMBODIMENTS (Photoelectric Conversion Element)

A photoelectric conversion element of the present disclosure includes: a first substrate; a first electrode; a photoelectric conversion layer; a second electrode; and a second substrate. The photoelectric conversion element includes a sealing part sealing at least the photoelectric conversion layer. The sealing part is disposed so as to surround periphery of the photoelectric conversion layer. A width of the sealing part disposed at each side has a minimum width A and a maximum width B in a width direction. A ratio (B/A) of the maximum width B to the minimum width A is 1.02 or more but 5.0 or less.

As a result of diligent studies, the present inventors found the following.

In order to exhibit a good photoelectric conversion property under light of a low illuminance and good stability over time, provision of a sealing part is required to prevent entry of oxygen or humidity.

Meanwhile, in the conventional techniques, a sealing part having the same width is formed as seen from a drawing. Therefore, it has been confirmed that when mechanical stress (e.g., torsion, load, or falling) is applied thereto, a sealing part, a substrate, or a photoelectric conversion layer is broken to considerably decrease the photoelectric conversion property and the stability over time. There are problems that the conventional sealing techniques make it difficult to achieve good stability over time and good durability to mechanical stress.

Therefore, in the present disclosure, good durability to mechanical stress can be satisfied when a photoelectric conversion element includes: a first substrate; a first electrode; a photoelectric conversion layer; a second electrode; and a second substrate, wherein the photoelectric conversion element includes a sealing part sealing at least the photoelectric conversion layer, the sealing part is disposed so as to surround periphery of the photoelectric conversion layer, and a width of the sealing part disposed at each side has a minimum width A and a maximum width B in a width direction, and a ratio (B/A) of the maximum width B to the minimum width A is 1.02 or more but 5.0 or less.

<First Electrode>

A shape and a size of the first electrode are not particularly limited and may be appropriately selected depending on the intended purpose.

A structure of the first electrode is not particularly limited and may be appropriately selected depending on the intended purpose. The first electrode may be a single layer structure or may be such a structure that a plurality of materials are laminated.

A material of the first electrode is not particularly limited and may be appropriately selected depending on the intended purpose, so long as it has electric conductivity and transparency with respect to visible light. Examples of the material include transparent conductive metal oxides, carbon, and metals.

Examples of the transparent conductive metal oxide include indium-tin oxide (referred to as "ITO" hereinafter), fluorine-doped tin oxide (referred to as "FTO" hereinafter), antimony-doped tin oxide (referred to as "ATO" hereinafter), niobiumdoped tin oxide (referred to as "NTO" hereinafter), aluminum-doped zinc oxide, indium-zinc oxide, and niobium-titanium oxide.

Examples of the carbon include carbon black, carbon nanotube, graphene, and fullerene.

Examples of the metal include gold, silver, aluminum, nickel, indium, tantalum, and titanium.

These may be used alone or in combination. Among them, a transparent conductive metal oxide having high transparency is preferable, ITO, FTO, ATO, and NTO are more preferable.

An average thickness of the first electrode is not particularly limited and may be appropriately selected depending on the intended purpose. The average thickness of the first electrode is preferably 5 nm or more but 100 micrometers or less, more preferably 50 nm or more but 10 micrometers or less. When a material of the first electrode is carbon or a metal, the average thickness of the first electrode is preferably an enough average thickness to obtain translucency.

The first electrode can be formed by known methods such as the sputtering method, the vapor deposition method, and the spraying method.

The first electrode is preferably formed on a first substrate. An integrated commercially available product where the first electrode is formed on the first substrate in advance can be used.

Examples of the integrated commercially available product include FTO-coated glass, ITO-coated glass, zinc oxide, aluminum-coated glass, FTO-coated transparent plastic films, and ITO-coated transparent plastic films. Examples of other integrated commercially available product include a glass substrate provided with a transparent electrode where tin oxide or indium oxide is doped with a cation or an anion having a different atomic value and a glass substrate provided with a metal electrode having such a structure that allows light in the form of a mesh or stripes to pass.

These may be used alone, or two or more products may be used in combination as a mixed product or a laminate. Moreover, a metal lead wire may be used in combination in order to decrease an electric resistance value.

A material of the metal lead wire is, for example, aluminum, copper, silver, gold, platinum, and nickel.

The metal lead wire can be used in combination by forming it on the substrate through, for example, vapor deposition, sputtering, or pressure bonding, and disposing a layer of ITO or FTO thereon.

<Photoelectric Conversion Layer>

The photoelectric conversion layer may include at least an electron-transporting layer and a hole-transporting layer, and may be a single layer or may be a multilayer in which a plurality of layers are laminated.

The photoelectric conversion layer may include a photosensitization compound between the electron-transporting layer and the hole-transporting layer.

<Electron-Transporting Layer>

The photoelectric conversion element includes an electron-transporting layer including a photosensitization compound.

An ionization potential of the photosensitization compound exceeds an ionization potential of the hole-transporting layer. When the ionization potential of the photosensitization compound exceeds the ionization potential of the hole-transporting layer, the hole conducting efficiency to the hole-transporting layer is excellent.

The electron-transporting layer is formed for the purpose of transporting electrons generated in the photosensitization compound to the first electrode or the hole blocking layer. Therefore, the electron-transporting layer is preferably disposed adjacent to the first electrode or the hole blocking layer.

A structure of the electron-transporting layer is not particularly limited and may be appropriately selected depending on the intended purpose. In at least two photoelectric conversion elements that are adjacent to each other, the electron-transporting layers may be extended to each other, but are not preferably extended to each other. A structure of the electron-transporting layer may be a single layer or may be a multilayer in which a plurality of layers are laminated.

The electron-transporting layer includes an electron-transporting material, and includes other materials if necessary.

The electron-transporting material is not particularly limited and may be appropriately selected depending on the intended purpose. The electron-transporting material is preferably a semiconductor material.

Preferably, the semiconductor material has a particulate shape, and these particles are joined to be formed on a porous film. On the surface of the semiconductor particles constituting the porous electron-transporting layer, the photosensitization compound is chemically or physically adsorbed.

The semiconductor material is not particularly limited and known materials can be used. Examples of the semiconductor material include simple substance semiconductors, compound semiconductors, and compounds having a Perovskite structure.

Examples of the simple substance semiconductor include silicon and germanium.

Examples of the compound semiconductor include chalcogenides of metal. Specific examples thereof include: oxides of titanium, tin, zinc, iron, tungsten, zirconium, hafnium, strontium, indium, cerium, yttrium, lanthanum, vanadium, niobium, and tantalum; sulfides of cadmium, zinc, lead, silver, antimony, and bismuth; selenides of cadmium and lead; and tellurium compounds of cadmium. Examples of the other compound semiconductors include: phosphides of zinc, gallium, indium, and cadmium; gallium arsenide; copper-indium-selenide, and copper-indium-sulfide.

Examples of the compound having a Perovskite structure include strontium titanate, calcium titanate, sodium titanate, barium titanate, and potassium niobate.

Among them, an oxide semiconductor is preferable. Particularly, titanium oxide, zinc oxide, tin oxide, and niobium oxide are more preferable. When the electron-transporting material of the electron-transporting layer is titanium oxide, the conduction band level is high, high open circuit voltage can be obtained, and high photoelectric conversion characteristics can be obtained, which is advantageous.

These may be used alone or in combination. A crystal type of the semiconductor material is not particularly limited and may be appropriately selected depending on the intended purpose. The crystal type of the semiconductor material may be a single crystal, polycrystalline, or amorphous.

An average particle diameter of primary particles of the semiconductor material is not particularly limited and may be appropriately selected depending on the intended purpose. The average particle diameter is preferably 1 nm or more but 100 nm or less, more preferably 5 nm or more but 50 nm or less. Moreover, a semiconductor material having a larger average particle diameter may be mixed or laminated, and an effect of diffusing incident light may improve conversion efficiency in some cases. In this case, the average particle diameter is preferably 50 nm or more but 500 nm or less.

An average thickness of the electron-transporting layer is not particularly limited and may be appropriately selected depending on the intended purpose. The average thickness is preferably 50 nm or more but 100 micrometers or less, more preferably 100 nm or more but 50 micrometers or less, and even more preferably 120 nm or more but 10 micrometers or less. When the average thickness of the electron-transporting layer falls within the aforementioned preferable range, an amount of the photosensitization compound per unit projection area can be sufficiently secured, and a high light-trapping rate can be maintained. Moreover, a diffusion distance of injected electrons is hardly increased, and loss due to recombination of charges can be low. Therefore, the electron-transporting layer having the average thickness falling within the preferable range is advantageous.

A production method of the electron-transporting layer is not particularly limited and may be appropriately selected depending on the intended purpose. Examples of the production method include a method where a thin film is formed in vacuum, such as the sputtering method, and a wet film formation method. Among them, in terms of production cost, a wet film formation method is preferable, and a method where paste dispersing powder or sol of a semiconductor material is prepared, and then the paste is coated onto a first electrode as an electron collecting electrode substrate or onto a hole blocking layer is more preferable.

The wet film formation method is not particularly limited and may be appropriately selected depending on the intended purpose. Examples of the wet film formation method include the dipping method, the spraying method, the wire-bar coating method, the spin coating method, the roller coating method, the blade coating method, the gravure coating method, and the die coating method.

As a wet printing method, for example, various methods such as relief printing, offset printing, gravure printing, intaglio printing, rubber plate printing, and screen printing can be used.

A method for preparing a dispersion liquid of the semiconductor material is, for example, a method where the semiconductor material is mechanically pulverized using a milling device known in the art. According to the method, a dispersion liquid of the semiconductor material can be prepared by dispersing, in water or a solvent, a particulate semiconductor material alone or a mixture of the semiconductor material and a resin.

Examples of the resin include polymers or copolymers of vinyl compounds (e.g., styrene, vinyl acetate, acrylic acid ester, and methacrylic acid ester), silicone resins, phenoxy resins, polysulfone resins, polyvinyl butyral resins, polyvinyl formal resins, polyester resins, cellulose ester resins, cellulose ether resins, urethane resins, phenol resins, epoxy resins, polycarbonate resins, polyarylate resins, polyamide resins, and polyimide resins. These may be used alone or in combination.

Examples of the solvent include water, alcohol solvents, ketone solvents, ester solvents, ether solvents, amide solvents, halogenated hydrocarbon solvents, and hydrocarbon solvents.

Examples of the alcohol solvent include methanol, ethanol, isopropyl alcohol, and α-terpineol.

Examples of the ketone solvent include acetone, methyl ethyl ketone, and methyl isobutyl ketone.

Examples of the ester solvent include ethyl formate, ethyl acetate, and n-butyl acetate.

Examples of the ether solvent include diethyl ether, dimethoxy ethane, tetrahydrofuran, dioxolane, and dioxane.

Examples of the amide solvent include N,N-dimethylformamide, N,N-dimethylacetamide, and N-methyl-2-pyrrolidone.

Examples of the halogenated hydrocarbon solvent include dichloromethane, chloroform, bromoform, methyl iodide, dichloroethane, trichloroethane, trichloroethylene, chlorobenzene, o-dichlorobenzene, fluorobenzene, bromobenzene, iodobenzene, and 1-chloronaphthalene.

Examples of the hydrocarbon solvent include n-pentane, n-hexane, n-octane, 1,5-hexadiene, cyclohexane, methylcyclohexane, cyclohexadiene, benzene, toluene, o-xylene, m-xylene, p-xylene, ethylbenzene, and cumene.

These may be used alone or in combination.

To the dispersion liquid including the semiconductor material or the paste including the semiconductor material obtained by, for example, the sol-gel method, acid, a surfactant, or a chelating agent may be added in order to prevent re-aggregation of the particles.

Examples of the acid include hydrochloric acid, nitric acid, and acetic acid.

Examples of the surfactant include polyoxyethylene octylphenyl ether.

Examples of the chelating agent include acetyl acetone, 2-aminoethanol, and ethylene diamine.

Moreover, addition of a thickener is also an effective means for the purpose of improving film formation ability.

Examples of the thickener include polyethylene glycol, polyvinyl alcohol, and ethyl cellulose.

After the semiconductor material is coated, firing, irradiation of microwave or electron beams, or irradiation of electron beams can be performed in order to electronically contact particles of the semiconductor material or in order to improve the film strength or adhesiveness to the substrate. These treatments may be performed alone or in combination.

In the case where the electron-transporting layer formed of the semiconductor material is fired, a firing temperature thereof is not particularly limited and may be appropriately selected depending on the intended purpose. However, when the temperature is too high, resistance of the substrate may be high or the substrate may be melted. Therefore, the firing temperature thereof is preferably 30 degrees Celsius or more but 700 degrees Celsius or less, more preferably 100 degrees Celsius or more but 600 degrees Celsius or less. Moreover, the firing time is not particularly limited and may be appropriately selected depending on the intended purpose. The firing time is preferably 10 minutes or longer but 10 hours or shorter.

In the case where the electron-transporting layer formed of the semiconductor material is irradiated with microwaves, the irradiation time is not particularly limited and may be appropriately selected depending on the intended purpose. The irradiation time is preferably 1 hour or shorter. In this case, the irradiation may be performed from the side where the electron-transporting layer is formed or from the side where the electron-transporting layer is not formed.

After the electron-transporting layer formed of the semiconductor material is fired, for example, chemical plating using an aqueous solution of titanium tetrachloride or a mixed solution with an organic solvent, or electrochemical plating using an aqueous solution of titanium trichloride may be performed in order to increase a surface area of the electron-transporting layer or enhance an electron injection efficiency to the semiconductor material from a photosensitization compound that will be described hereinafter.

The film obtained by firing the semiconductor material having a diameter of several tens of nanometers can form a porous structure. Such a nanoporous structure has an extremely high surface area and the surface area can be represented by using a roughness factor. The roughness factor is a numerical value representing an actual area of the inner sides of pores relative to an area of the semiconductor particles coated onto the first substrate. Accordingly, a larger value of the roughness factor is preferable. In terms of a relationship with the average thickness of the electron-transporting layer, the roughness factor is preferably 20 or more.

<<Photosensitization Compound>>

The photosensitization compound is adsorbed on the surface of the semiconductor material constituting the electron-transporting layer in order to further improve the output or the photoelectric conversion efficiency.

The photosensitization compound is not particularly limited and may be appropriately selected depending on the intended purpose, so long as it is a compound photoexcited by light emitted to the photoelectric conversion element. Examples of the photosensitization compound include the following known compounds.

Specific examples thereof include metal complex compounds, cumarin compounds described in J. Phys. Chem. C, 7224, Vol. 111 (2007), polyene compounds described in Chem. Commun., 4887 (2007), indoline compounds described in J. Am. Chem. Soc., 12218, Vol. 126 (2004), Chem. Commun., 3036 (2003), and Angew. Chem. Int. Ed., 1923, Vol. 47 (2008), thiophene compounds described in J. Am. Chem. Soc., 16701, Vol. 128 (2006), and J. Am. Chem. Soc., 14256, Vol. 128 (2006), cyanine dyes, merocyanine dyes, 9-arylxanthene compounds, triaryl methane compounds, and phthalocyanine compounds and porphyrin compounds described in J. Phys. Chem., 2342, Vol. 91 (1987), J. Phys. Chem. B, 6272, Vol. 97 (1993), Electroanal. Chem., 31, Vol. 537 (2002) J. Porphyrins Phthalocyanines, 230, Vol. 3 (1999), Angew. Chem. Int. Ed., 373, Vol. 46 (2007), and Langmuir, 5436, Vol. 24 (2008).

Among them, metal complex compounds, cumarin compounds, polyene compounds, indoline compounds, and thiophene compounds are preferable. The compounds expressed by Structural Formulas (1), (2), and (3) below available from MITSUBISHI PAPER MILLS LIMITED, and moreover a compound represented by General Formula (3) below are more preferable. These photosensitization compounds may be used alone or in combination.

[Chem. 1]

Structural Formula (1)

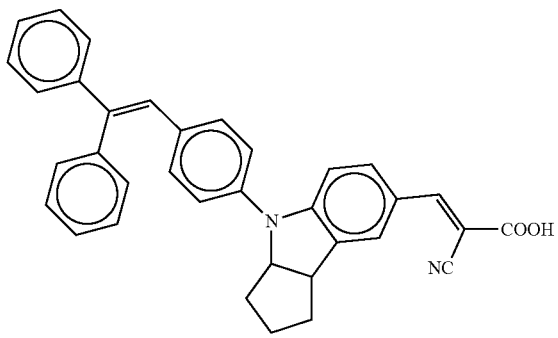

[Chem. 2]

Structural Formula (2)

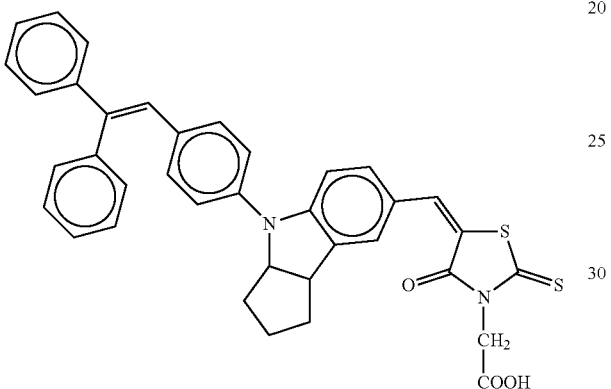

[Chem. 3]

Structural Formula (3)

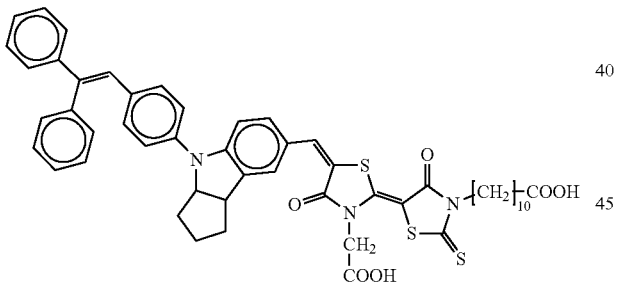

[Chem. 4]

General Formula (3)

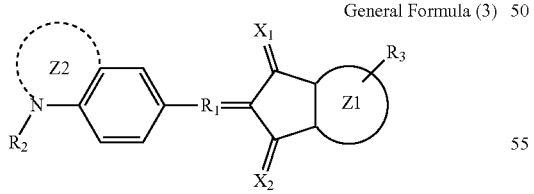

In General Formula (3), $X_1$ and $X_2$ each represent an oxygen atom, a sulfur atom, or a selenium atom, and $R_1$ represents a methine group that may have a substituent. Specific examples of the substituent include an aryl group (e.g., a phenyl group and a naphthyl group) and a heterocycle (e.g., a thienyl group and a furyl group).

$R_2$ represents an alkyl group that may have a substituent, an aryl group that may have a substituent, or a heterocyclic group that may have a substituent. Examples of the alkyl group include a methyl group, an ethyl group, a 2-propyl group, and a 2-ethylhexyl group. Examples of the aryl group and the heterocyclic group include the groups exemplified above.

$R_3$ represents an acid group such as carboxylic acid, sulfonic acid, phosphonic acid, boronic acid, or phenols, and Z1 and Z2 each represent a substituent that forms a cyclic structure.

Examples of Z1 include condensed hydrocarbon-based compounds (e.g., a benzene ring and a naphthalene ring) and heterocycles (e.g., a thiophene ring and a furan ring) each of which may have a substituent. Specific examples of the substituent include the alkyl groups and the alkoxy groups (e.g., a methoxy group, an ethoxy group, and a 2-isopropoxy group) described above.

Examples of Z2 include the following (A-1) to (A-22).

[Chem. 5]

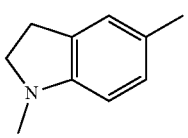 (A-1)

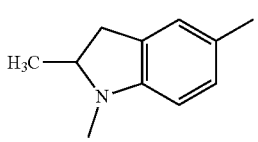 (A-2)

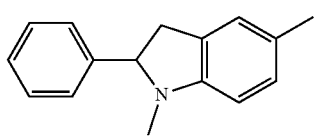 (A-3)

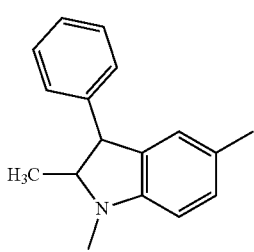 (A-4)

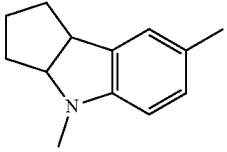 (A-5)

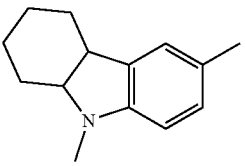 (A-6)

(A-7) 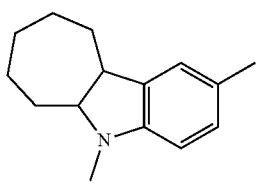
(A-8) 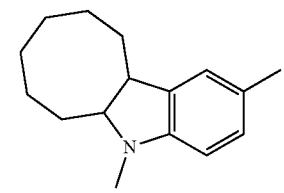
(A-9) 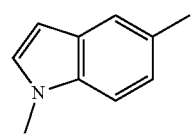
(A-10) 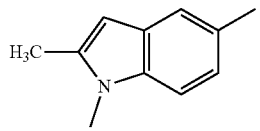
(A-11) 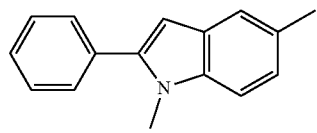
(A-12) 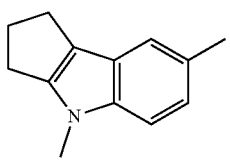
(A-13) 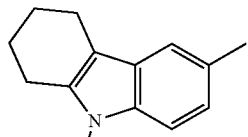
(A-14) 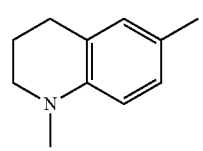
(A-15) 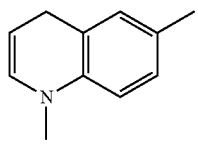
(A-16) 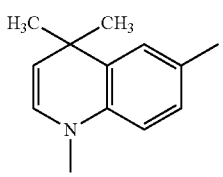
(A-17) 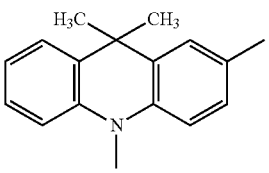
(A-18) 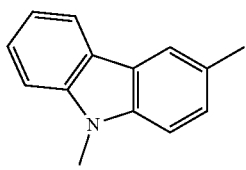
(A-19) 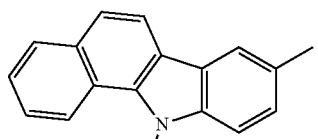
(A-20) 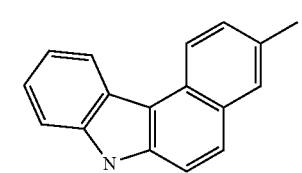
(A-21) 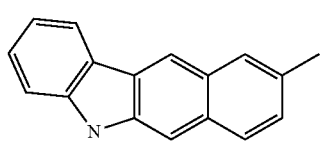
(A-22) 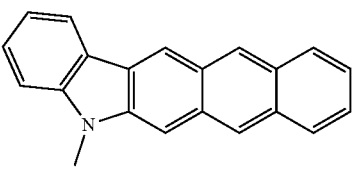
Specific examples of the photo sensitization compound including the General Formula (3) include, but are not limited to, the following (B-1) to (B-36).

[Chem. 6]
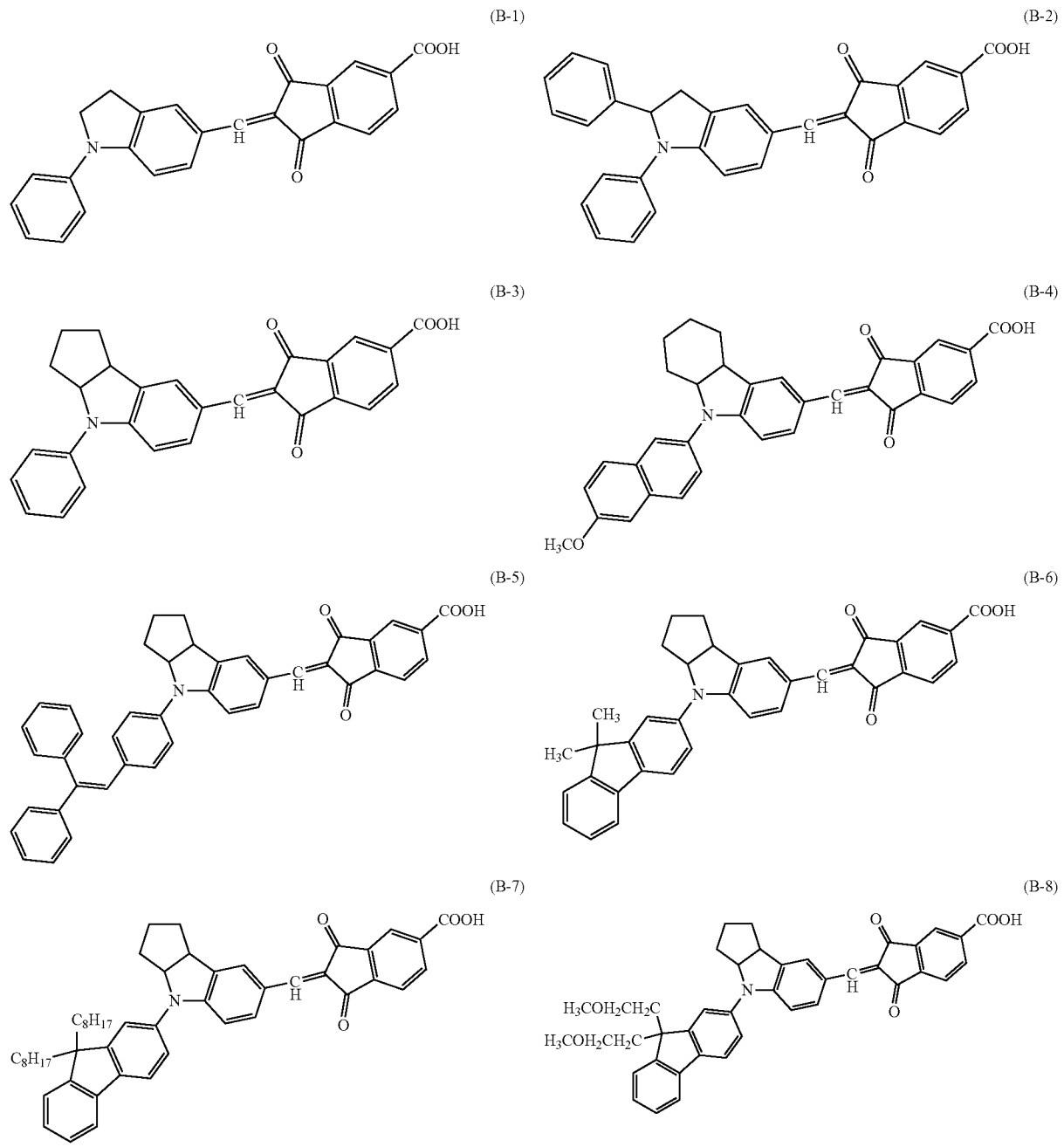
[Chem. 7]
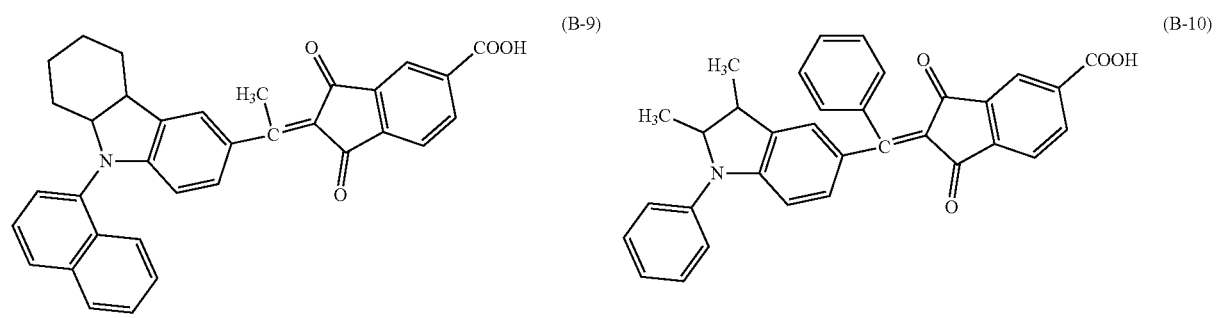

-continued
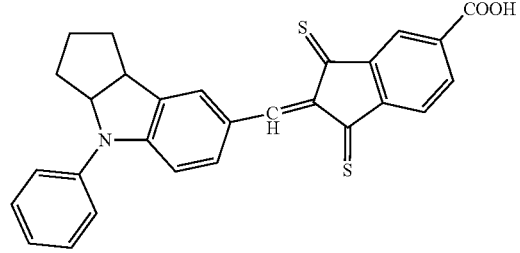
(B-11)
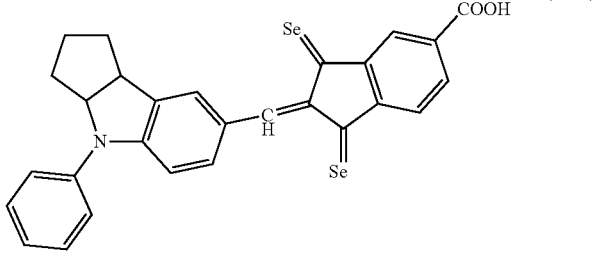
(B-12)
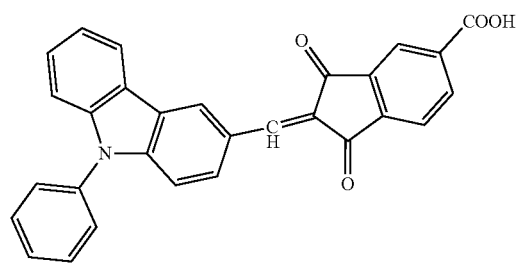
(B-13)
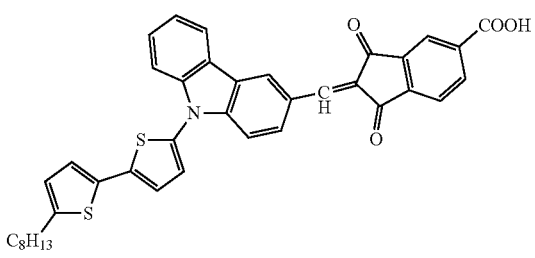
(B-14)
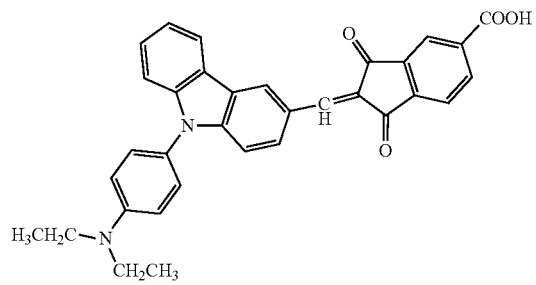
(B-15)
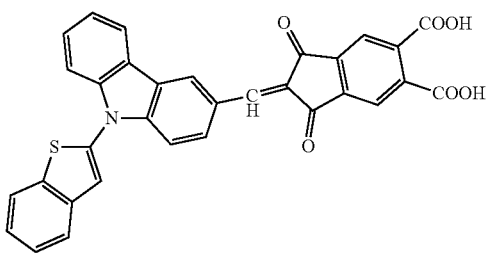
(B-16)
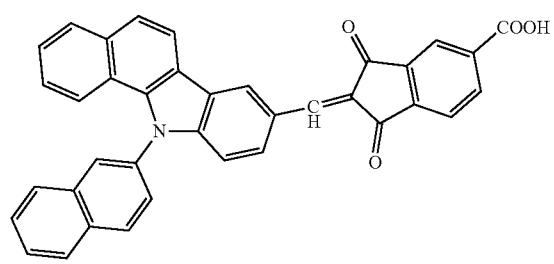
(B-17)
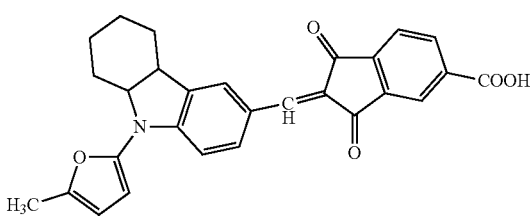
(B-18)
[Chem. 8]
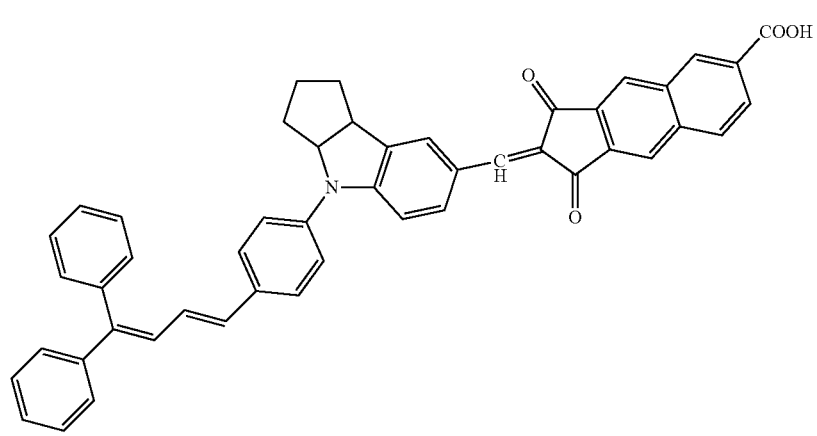
(B-19)

-continued
(B-20)
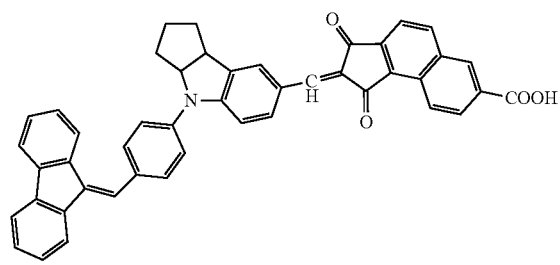
(B-21)
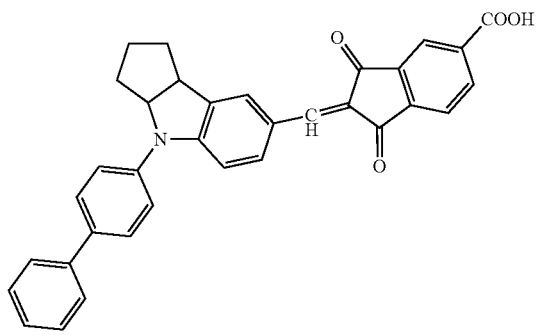
(B-22)
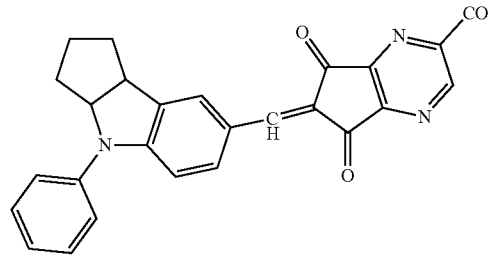
(B-23)
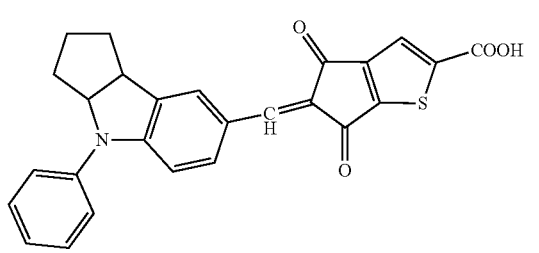
(B-24)
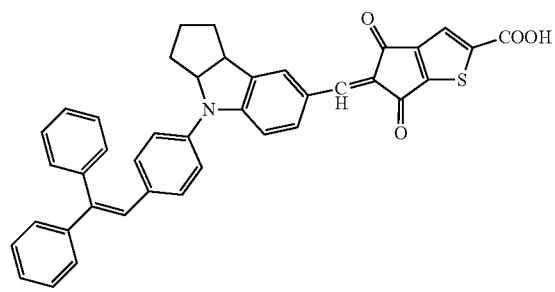
(B-25)
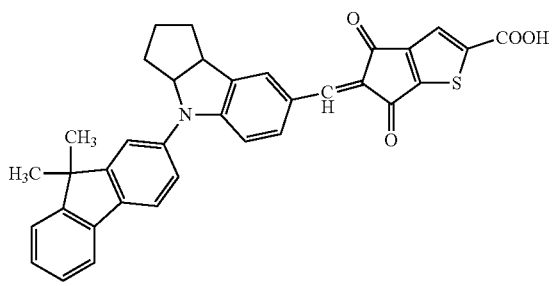
(B-26)
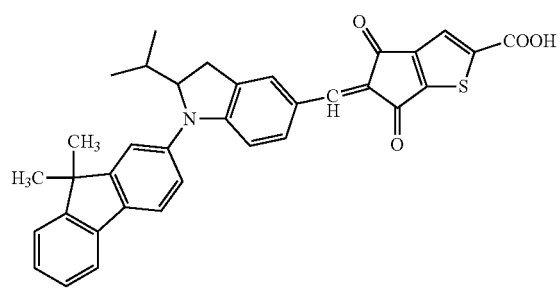
(B-27)
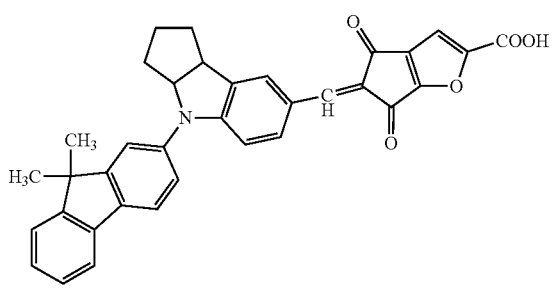
(B-28)
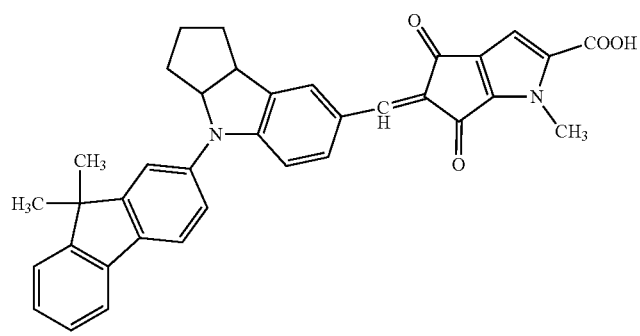

[Chem. 9]

(B-29)
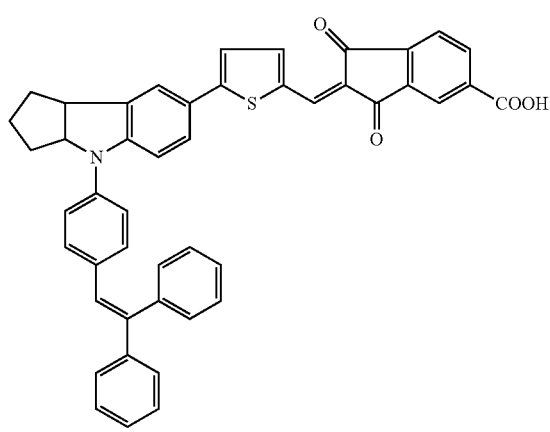

(B-30)
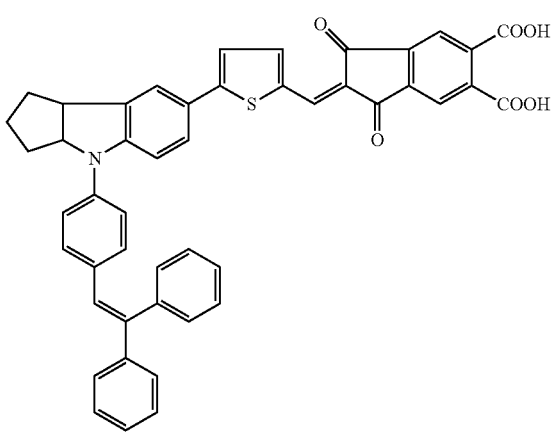

(B-31)
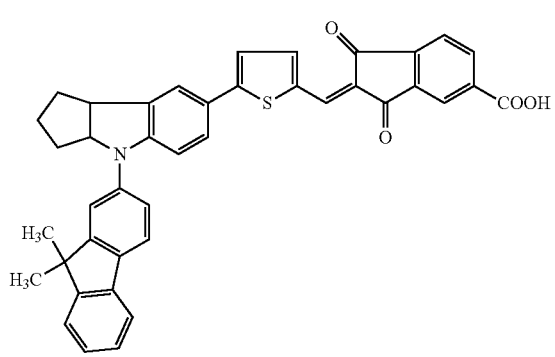

(B-32)
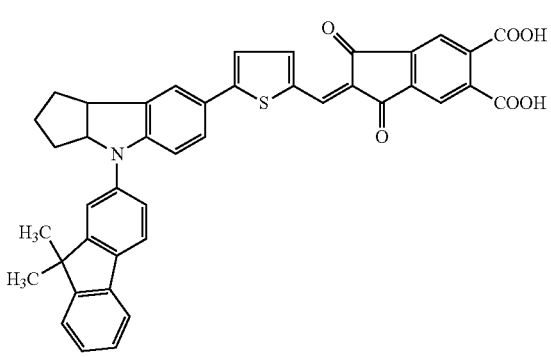

(B-33)
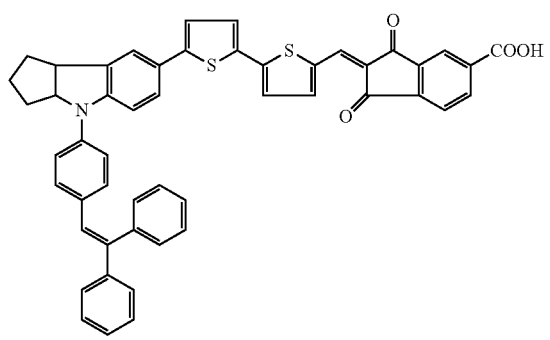

(B-34)
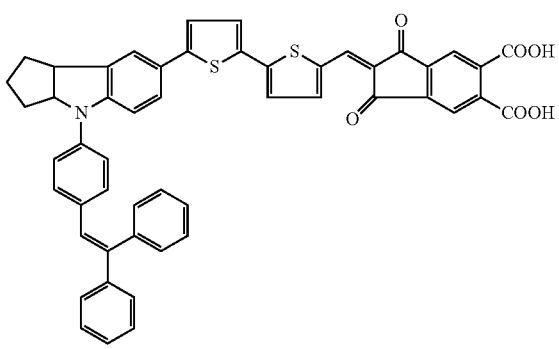

(B-35)
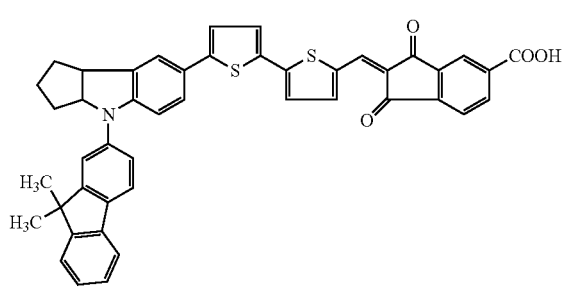

(B-36)
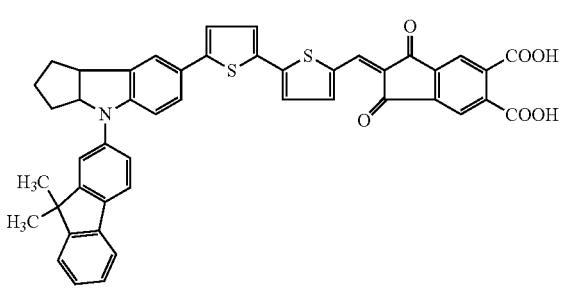

As a method for adsorbing the photo sensitization compound on a surface of the semiconductor material of the electron-transporting layer, for example, it is possible to use a method where the electron-transporting layer including the semiconductor material is immersed in a solution of the photo sensitization compound or a dispersion liquid of the photo sensitization compound, and a method where a solution of the photo sensitization compound or a dispersion liquid of the photo sensitization compound is coated and adsorbed on the electron-transporting layer. In the case of the method where the electron-transporting layer on which the semiconductor material is formed is immersed in a solution of the photo sensitization compound or a dispersion liquid of the photosensitization compound, the immersion method, the dipping method, the roller method, or the air knife method can be used. In the case of the method where a solution of the photosensitization compound or a dispersion liquid of the photosensitization compound is coated and adsorbed on the electron-transporting layer, the wire bar coating method, the slide hopper coating method, the extrusion coating method, the curtain coating method, the spin coating method, or the spray coating method can be used. Moreover, it is also possible to adsorb the photosensitization compound in a supercritical fluid using, for example, carbon dioxide.

When the photosensitization compound is adsorbed on the semiconductor material, a condensing agent may be used in combination.

The condensing agent may be an agent exhibiting such a catalytic function that a photosensitization compound is physically or chemically bound to a surface of a semiconductor material, or may be an agent that stoichiometrically acts and advantageously moves a chemical equilibrium. Moreover, thiol or a hydroxyl compound may be added thereto as a condensation auxiliary.

Examples of the solvent that dissolves or disperses the photosensitization compound include water, alcohol solvents, ketone solvents, ester solvents, ether solvents, amide solvents, halogenated hydrocarbon solvents, and hydrocarbon solvents.

Examples of the alcohol solvent include methanol, ethanol, and isopropyl alcohol.

Examples of the ketone solvent include acetone, methyl ethyl ketone, and methyl isobutyl ketone.

Examples of the ester solvent include ethyl formate, ethyl acetate, and n-butyl acetate.

Examples of the ether solvent include diethyl ether, dimethoxy ethane, tetrahydrofuran, dioxolane, and dioxane.

Examples of the amide solvent include N,N-dimethylformamide, N,N-dimethylacetamide, and N-methyl-2-pyrrolidone.

Examples of the halogenated hydrocarbon solvent include dichloromethane, chloroform, bromoform, methyl iodide, dichloroethane, trichloroethane, trichloroethylene, chlorobenzene, o-dichlorobenzene, fluorobenzene, bromobenzene, iodobenzene, and 1-chloronaphthalene.

Examples of the hydrocarbon solvent include n-pentane, n-hexane, n-octane, 1,5-hexadiene, cyclohexane, methylcyclohexane, cyclohexadiene, benzene, toluene, o-xylene, m-xylene, p-xylene, ethylbenzene, and cumene.

These may be used alone or in combination.

Depending on kinds of photosensitization compounds, there is a photosensitization compound that functions more effectively when aggregation between compounds is prevented. Therefore, an aggregation dissociating agent may be used in combination. The aggregation dissociating agent is not particularly limited and may be appropriately selected depending on a dye to be used. Preferable examples of the aggregation dissociating agent include steroid compounds (e.g., cholic acid and chenodexycholic acid), long-chain alkyl carboxylic acid, or long-chain alkyl phosphonic acid. An amount of the aggregation dissociating agent is preferably 0.01 parts by mass or more but 500 parts by mass or less, more preferably 0.1 parts by mass or more but 100 parts by mass or less, relative to 1 part by mass of the photosensitization compound.

A temperature at the time when the photosensitization compound, or the photosensitization compound and the aggregation dissociating agent are adsorbed on a surface of the semiconductor material constituting the electron-transporting layer is preferably −50 degrees Celsius or more but 200 degrees Celsius or less. The adsorption time is preferably 5 seconds or longer but 1,000 hours or shorter, more preferably 10 seconds or longer but 500 hours or shorter, even more preferably 1 minute or longer but 150 hours or shorter. The adsorption step is preferably performed in the dark. Moreover, the adsorption step may be performed with still standing or under stirring.

A stirring method is not particularly limited and may be appropriately selected depending on the intended purpose. Examples of the stirring method include methods using, for example, a stirrer, a ball mill, a paint conditioner, a sand mill, Attritor, a disperser, and ultrasonic dispersion.

<Hole-Transporting Layer>

The photoelectric conversion element includes a hole-transporting layer.

The hole-transporting layer preferably includes a p-type semiconductor material and a basic compound.

The hole-transporting layer includes a p-type semiconductor material in order to obtain the function of transporting holes.

The ionization potential of the hole-transporting layer exceeds an ionization potential of the p-type semiconductor material, and is less than 1.07 times the ionization potential of the p-type semiconductor material. When the ionization potential of the hole-transporting layer exceeds the ionization potential of the p-type semiconductor material and is less than 1.07 times the ionization potential of the p-type semiconductor material, stability over time and high photoelectric conversion property even under light of a low illuminance can be achieved.

<<p-Type Semiconductor Material>>

The p-type semiconductor material is not particularly limited and may be appropriately selected depending on the intended purpose. Examples of the p-type semiconductor material include inorganic p-type semiconductor materials and organic p-type semiconductor materials.

The inorganic p-type semiconductor material is not particularly limited and may be appropriately selected depending on the intended purpose. Examples of the inorganic p-type semiconductor material include CuSCN, CuI, CuBr, NiO, $V_2O_5$, and graphene oxide. Among them, organic p-type semiconductor materials are preferable.

The organic p-type semiconductor material is not particularly limited and may be appropriately selected depending on the intended purpose. For example, known organic p-type semiconductor materials can be used.

Examples of the known organic p-type semiconductor materials include oxadiazole compounds, triphenylmethane compounds, pyrazoline compounds, hydrazone compounds, oxadiazole compounds, tetraarylbenzidine compounds, stilbene compounds, and spiro-type compounds. These may be used alone or in combination. Among them, spiro-type compounds are preferable.

Examples of the spiro-type compound include compounds including the following General Formula (4).

[Chem. 10]

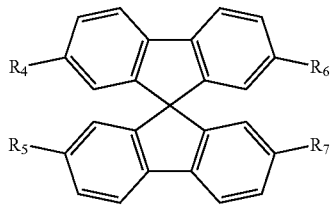

General Formula (4)

In the General Formula (4), $R_4$ to $R_7$ represent a substituted amino group such as a dimethylamino group, a diphenylamino group, or a naphthyl-4-tolylamino group.

The spiro-type compound is not particularly limited and may be appropriately selected depending on the intended purpose. Examples of the spiro-type compound include, but are not limited to, exemplified compounds (D-1) to (D-20). These may be used alone or in combination.

[Chem. 11]

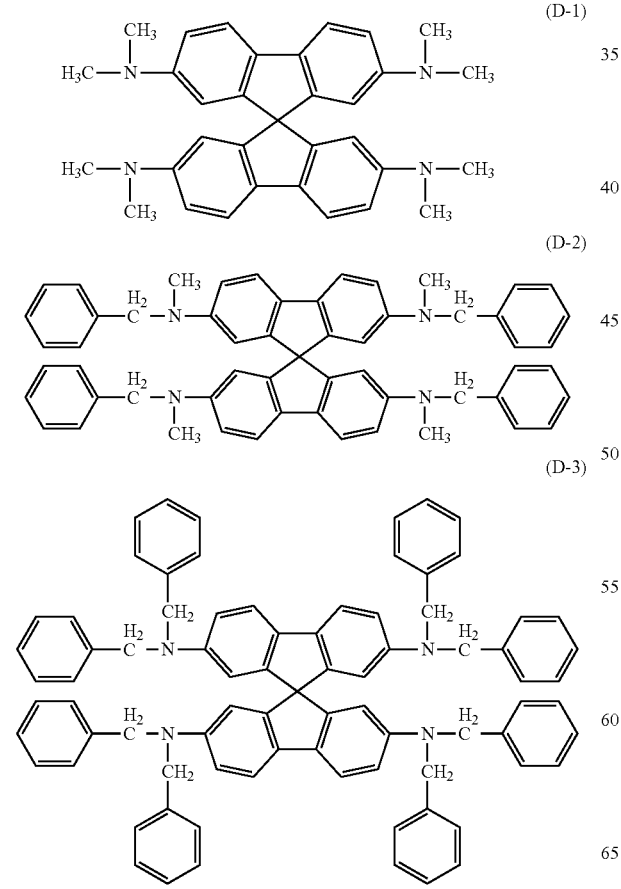

(D-1)

(D-2)

(D-3)

-continued

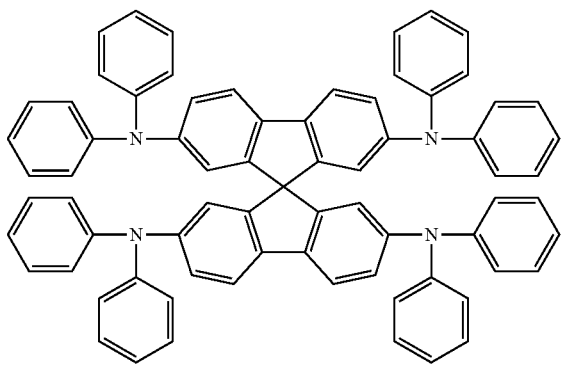

(D-4)

[Chem. 12]

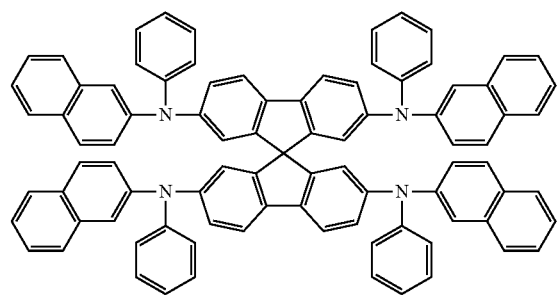

(D-5)

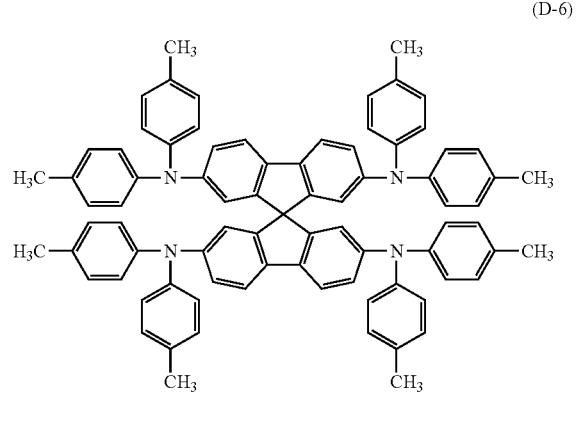

(D-6)

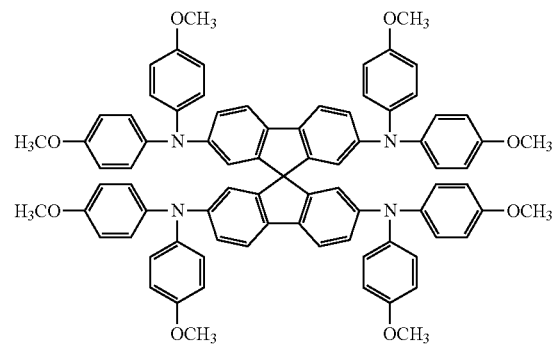

(D-7)

-continued
(D-8)
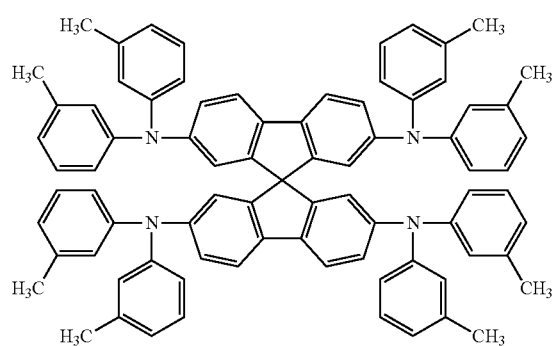
[Chem. 13]
(D-9)
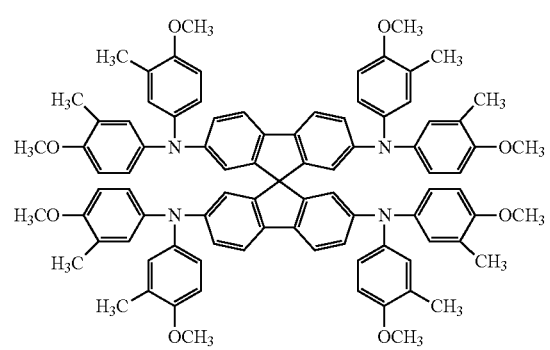
(D-10)
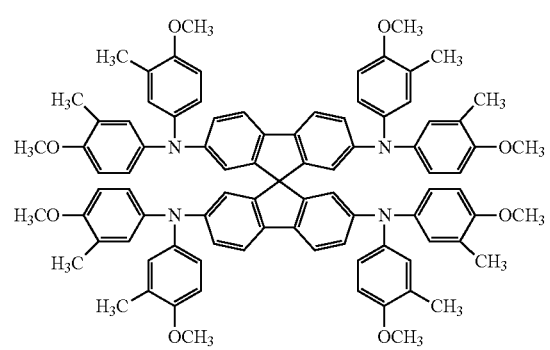
[Chem. 14]
(D-11)
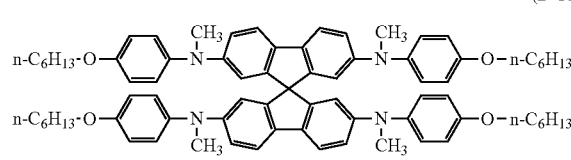
-continued
(D-12)
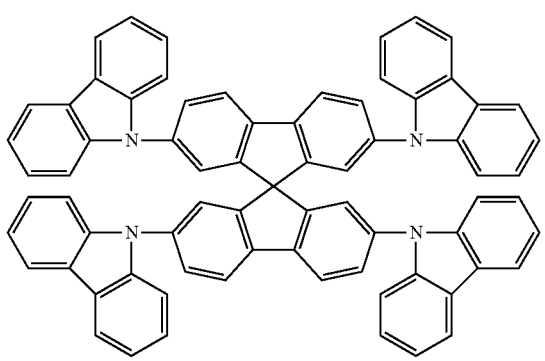
[Chem. 15]
(D-13)
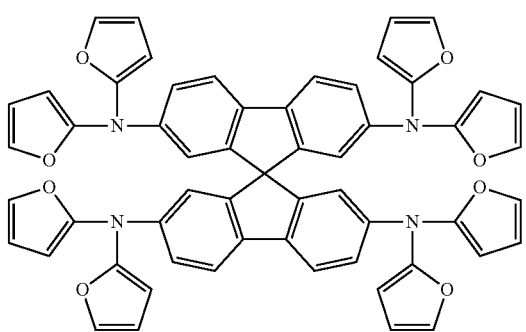
(D-14)
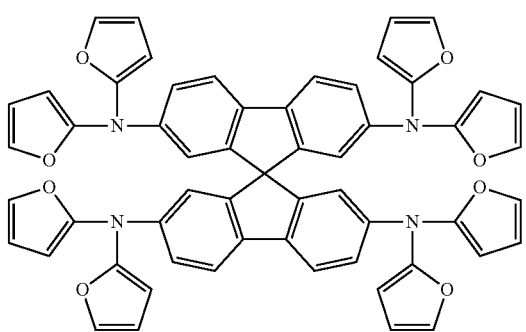
[Chem. 16]
(D-15)
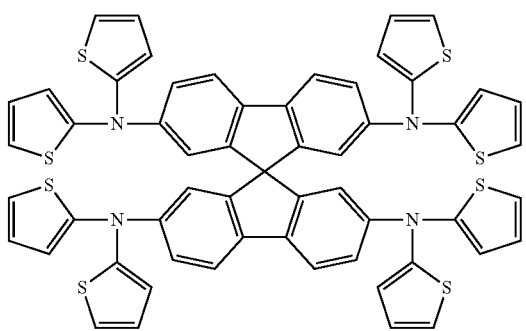

-continued (D-16)

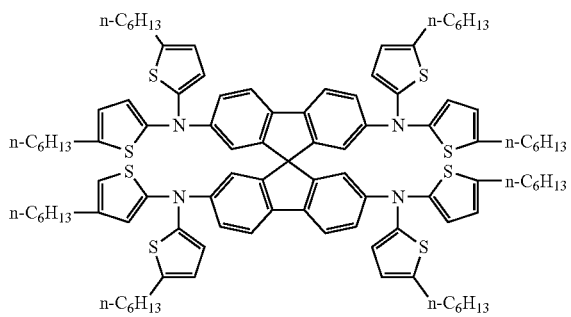

(D-17)

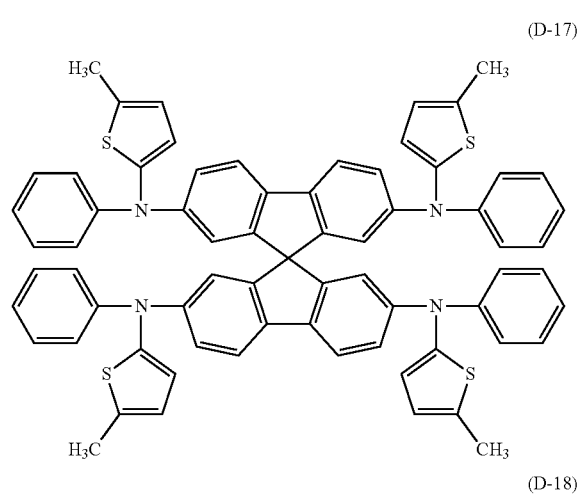

(D-18)

[Chem. 17]

(D-19)

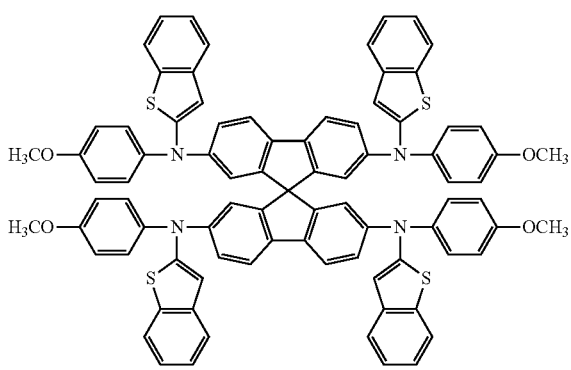

-continued (D-20)

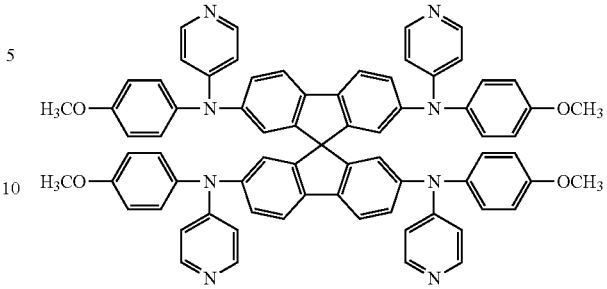

Because two benzidine skeleton molecules are spirally bound in the spiro-type compound, a nearly spherical electron cloud is formed and hopping conductivity between molecules is excellent. Therefore, the spiro-type compounds exhibit excellent photoelectric conversion characteristics. Moreover, the spiro-type compounds are dissolved in various organic solvents because of high solubility. Because the spiro-type compounds are amorphous (amorphous substances that do not have a crystal structure), the spiro-type compounds tend to be densely filled in a porous electron-transporting layer. Because the spiro-type compounds do not absorb light of 450 nm or longer, light absorption of the photosensitization compound can be effectively performed, which is particularly preferable for a solid dye-sensitized solar cell.

<<Basic Compound>>

The hole-transporting layer includes a basic compound.

It is believed that the basic compound exists at a boundary near the electron-layer to prevent the reverse electron transfer (i.e., electron transfer from the electron-transporting layer to the hole-transporting layer) from the electron-transporting layer.

The basic compound is preferably a basic compound represented by the following General Formula (A) or General Formula (B), more preferably a tertiary amine compound represented by the following General Formula (1) and General Formula (2). Inclusion of a basic compound represented by the following General Formula (A) or General Formula (B) in the hole-transporting layer is advantageous because high open circuit voltage and high photoelectric conversion characteristics can be obtained. When the hole-transporting layer includes at least one selected from the group consisting of a tertiary amine compound represented by General Formula (1) and a tertiary amine compound represented by General Formula (2), high photoelectric conversion property even under light of a low illuminance and stability over time can be achieved.

[Chem. 18]

General Formula (A)

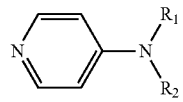

(In the General Formula (A), $R_1$ and $R_2$ each independently represent an alkyl group or an aromatic hydrocarbon group and represent an identical or different group, or $R_1$ and $R_2$ are joined with each other to represent a heterocyclic group containing a nitrogen atom.)

[Chem. 19]

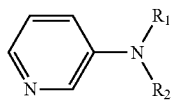

General Formula (B)

(In the General Formula (B), $R_1$ and $R_2$ each independently represent an alkyl group or an aromatic hydrocarbon group and represent an identical or different group, or $R_1$ and $R_2$ are joined with each other to represent a heterocyclic group containing a nitrogen atom.)

[Chem. 20]

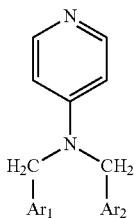

General Formula (1)

[Chem. 21]

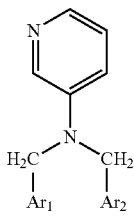

General Formula (2)

Here, in the General Formula (1) and the General Formula (2), $Ar_1$ and $Ar_2$ represent an aryl group that may have a substituent, and the $Ar_1$ and the $Ar_2$ may be identical or different and may be joined with each other.

Specific exemplified compounds of the basic compounds represented by the General Formula (A) and the General Formula (B) are presented below, but the present disclosure is not limited thereto.

[Chem. 22]

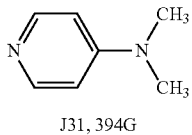

J31, 394G

Compound No. 1

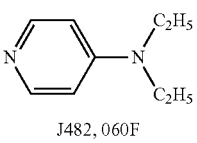

J482, 060F

Compound No. 2

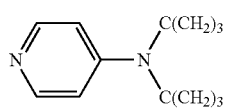

Compound No. 3

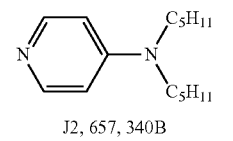

J2, 657, 340B

Compound No. 4

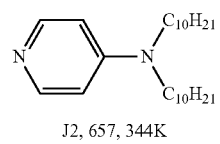

J2, 657, 344K

Compound No. 5

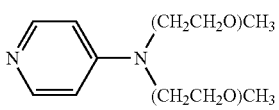

Compound No. 6

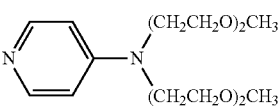

Compound No. 7

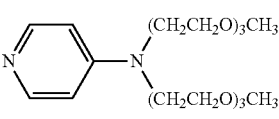

Compound No. 8

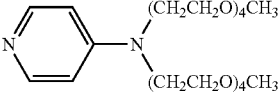

Compound No. 9

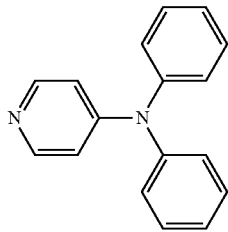

J2, 748, 250C

Compound No. 10

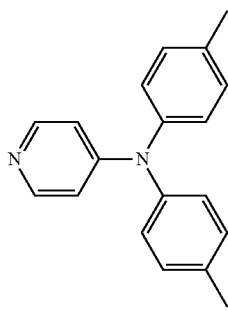

Compound No. 11

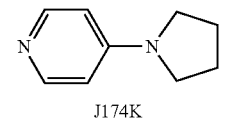

J174K

Compound No. 12

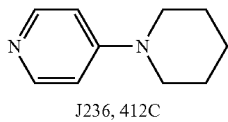

J236, 412C

Compound No. 13

-continued
Compound No. 14
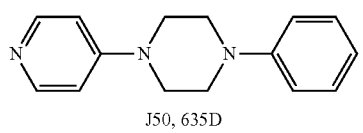
J50, 635D
Compound No. 15
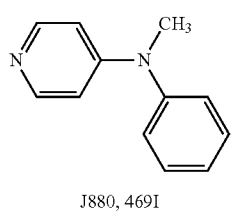
J880, 469I
Compound No. 16
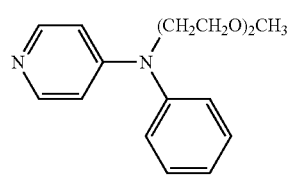
Compound No. 17
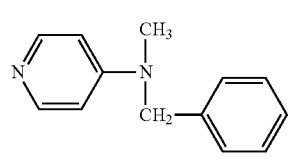
J1, 983, 963J
[Chem. 23]
Compound No. 18
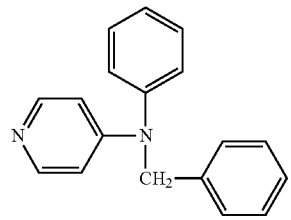
Compound No. 19
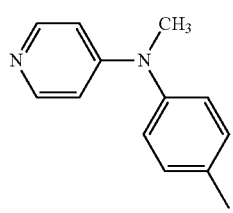
Compound No. 20
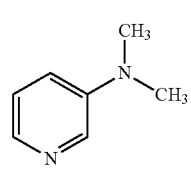
Compound No. 21
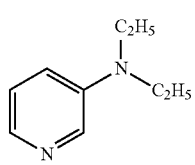
-continued
Compound No. 22
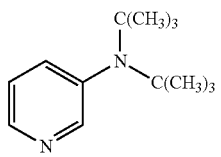
Compound No. 23
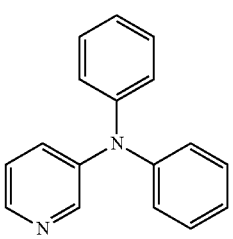
Compound No. 24
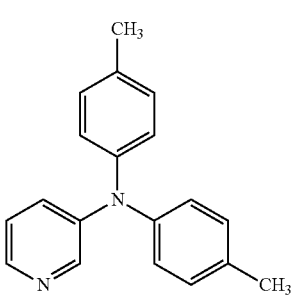
Compound No. 25
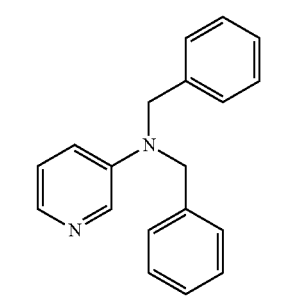
Compound No. 26
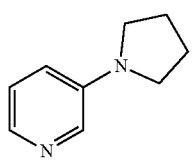
Compound No. 27
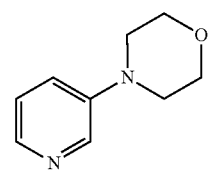
Compound No. 28
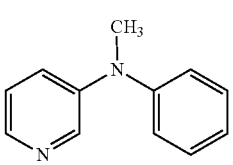

Compound No. 29
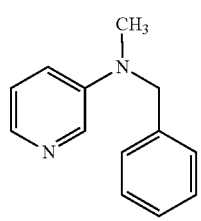
Compound No. 30
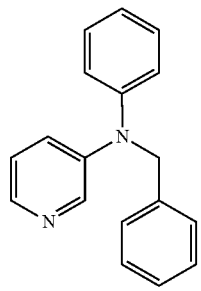
Specific examples of the tertiary amine compounds represented by the General Formula (1) and the General Formula (2) include, but are not limited to, the following exemplified compounds C-1 to C-20. These may be used alone or in combination.
[Chem. 24]
C-1
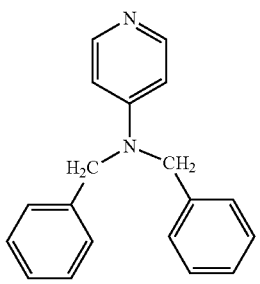
C-2
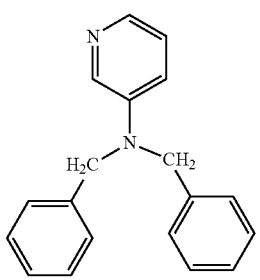
C-3
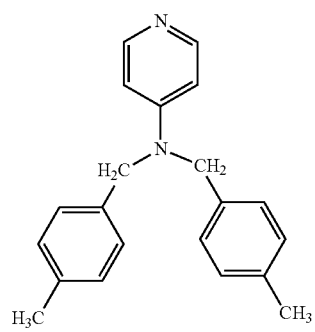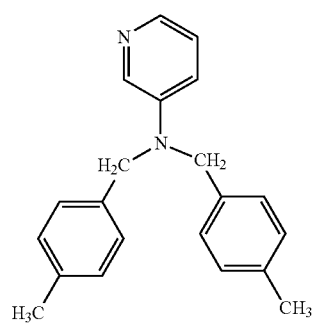
C-4
C-5
C-6

[Chem. 25]
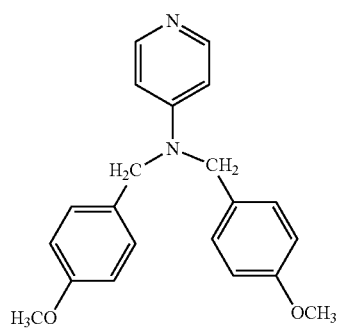
C-7
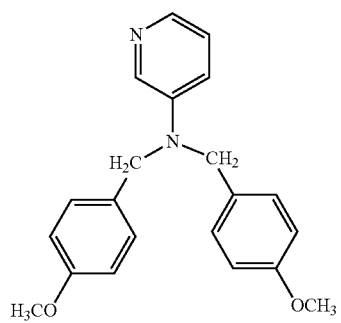
C-8
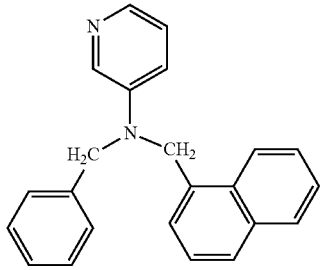
C-12
[Chem. 26]
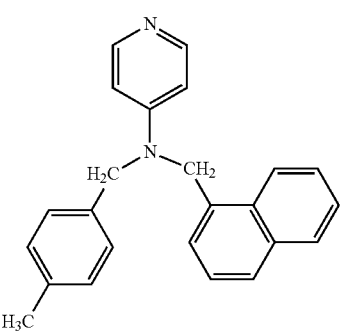
C-13
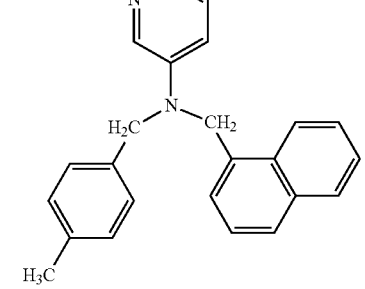
C-14
C-9
C-10
C-11
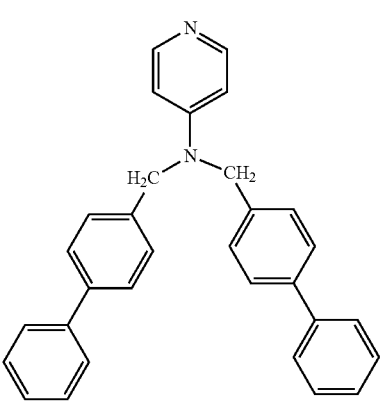
C-15

C-16 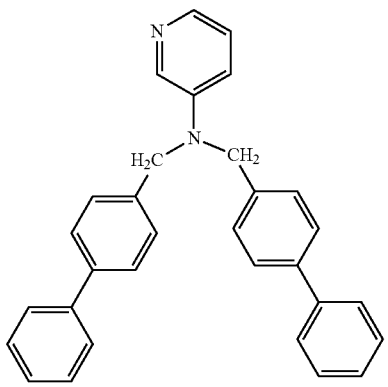

C-17

C-18

[Chem. 27]

C-19 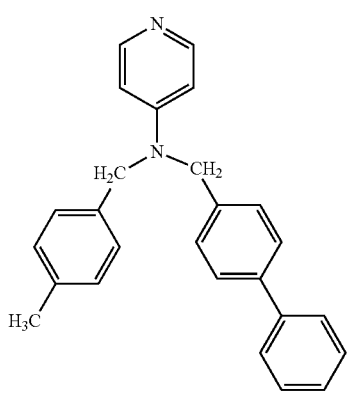

C-20 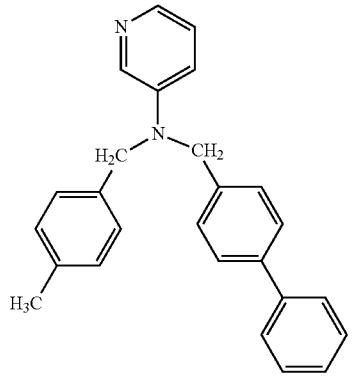

An amount of the basic compound in the hole-transporting layer is preferably 1 part by mass or more but 50 parts by mass or less, more preferably 10 parts by mass or more but 30 parts by mass or less, relative to the total amount of the hole-transporting material. When the amount of the basic compound falls within the preferable range, high open circuit voltage can be maintained, high output can be obtained, and high stability and durability can be obtained even when it is used for a long period of time under various environments.

A molecular weight of the basic compound is preferably 140 g/mol or more. When the molecular weight of the basic compound is 140 g/mol or more, because the basic compound exists at a boundary near the electron-transporting layer, the electron-transporting layer and the hole-transporting layer can be prevented from chemically and physically contacting with each other, and the reverse electron transfer can be further decreased. Therefore, high photoelectric conversion characteristics can be exhibited even under light of a low illuminance.

A form of the hole-transporting layer is not particularly limited and may be appropriately selected depending on the intended purpose, so long as it has a function of transporting holes. Examples of the form of the hole-transporting layer include: an electrolytic solution obtained by dissolving redox couples in an organic solvent; a gel electrolyte that is obtained by immersing, in a polymer matrix, liquid obtained by dissolving redox couples in an organic solvent; a molten salt containing redox couples; and a solid electrolyte. These may be used alone or in combination.

<<<Oxidizing Agent>>

The hole-transporting layer preferably includes an oxidizing agent. When the hole-transporting layer includes the oxidizing agent, a part of the organic hole-transporting material becomes radical cation. Therefore, conductivity can be improved, and stability or durability of output characteristics can be enhanced.

When the oxidizing agent oxidizes the organic hole-transporting material, good hole conductivity is exhibited, and cancellation (reduction) of the oxidation state influenced by an ambient environment of the photoelectric conversion layer can be prevented, exhibiting good stability over time.

The oxidizing agent is not particularly limited and may be appropriately selected depending on the intended purpose. Examples of the oxidizing agent include tris(4-bromophenyl)aminium hexachloroantimonate, silver hexafluoroantimonate, nitrosonium tetrafluoroborate, silver nitrate, and metal complexes. These may be used alone or in combination. Among them, metal complexes are preferable.

Examples of the metal complex include compositions including, for example, a metal cation, a ligand, and an anion.

The metal cation is not particularly limited and may be appropriately selected depending on the intended purpose. Examples of the metal cation include cations of, for example, chromium, manganese, zinc, iron, cobalt, nickel, copper, molybdenum, ruthenium, rhodium, palladium, silver, tungsten, rhenium, osmium, iridium, vanadium, gold, and platinum. Among them, cations of manganese, zinc, iron, cobalt, nickel, copper, ruthenium, silver, and vanadium are preferable, and a cobalt complex is more preferable.

The ligand preferably includes a 5-membered heterocycle and/or a 6-membered heterocycle including at least one nitrogen, and may include a substituent. Specific examples thereof include, but are not limited to, the following.

[Chem. 28]

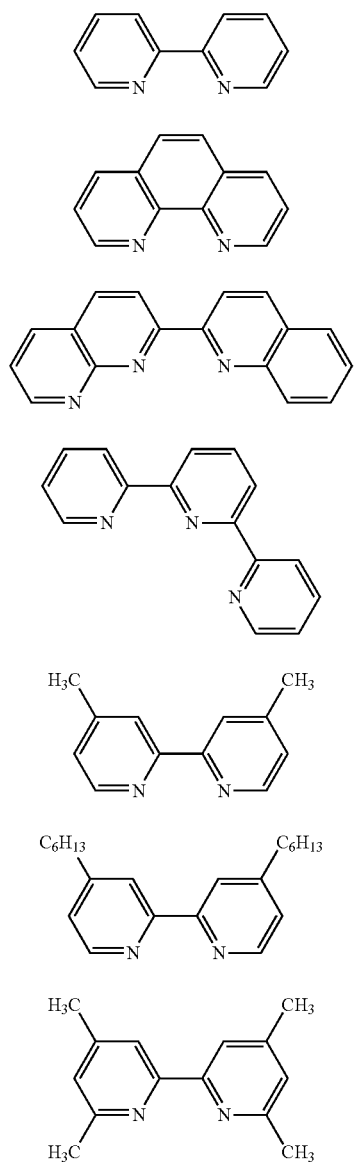

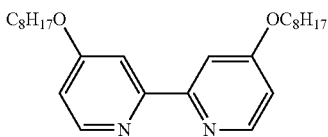

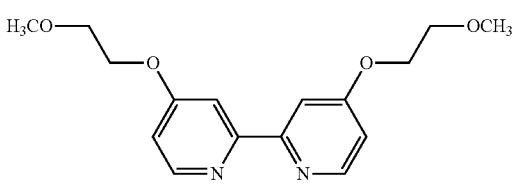

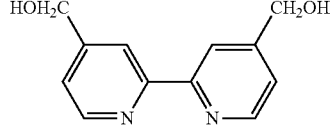

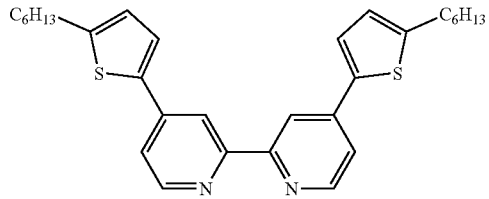

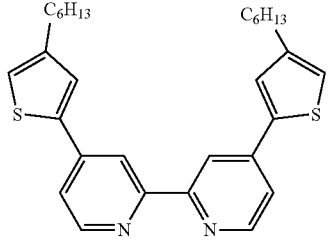

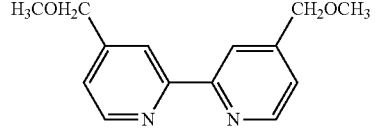

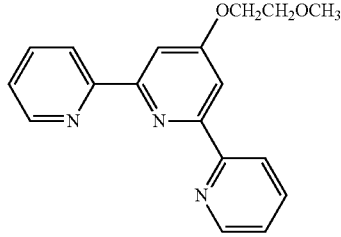

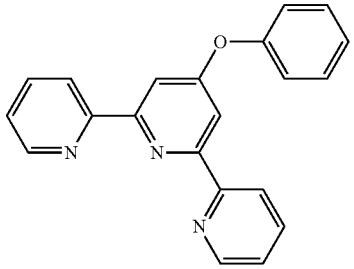

-continued
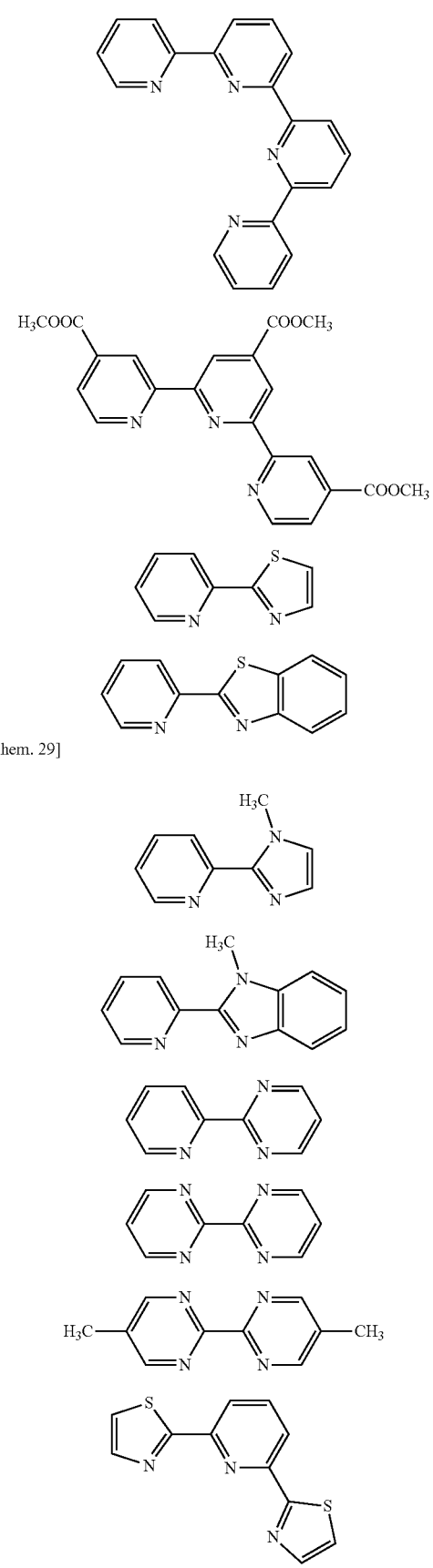
[Chem. 29]
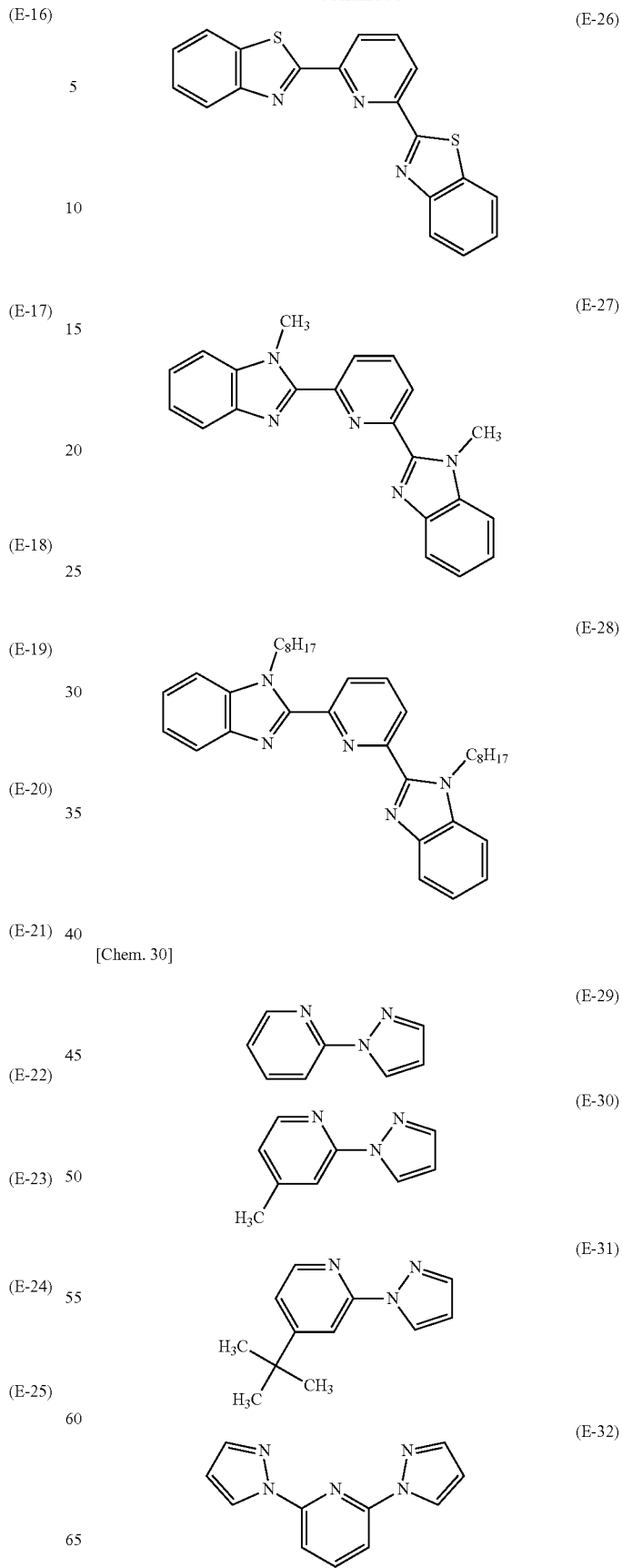
[Chem. 30]

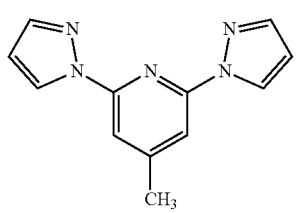

(E-33)

Examples of the anion include a hydride ion (H⁻), a fluoride ion (F⁻), a chloride ion (Cl⁻), a bromide ion (Br⁻), an iodide ion (I⁻), a hydroxide ion (OH⁻), a cyanide ion (CN⁻), a nitric acid ion ($NO_3^-$), a nitrous acid ion ($NO_2^-$), a hypochlorous acid ion (ClO⁻), a chlorous acid ion ($ClO_2^-$), a chloric acid ion ($ClO_3^-$), a perchloric acid ion ($ClO_4^-$), a permanganic acid ion ($MnO_4^-$), an acetic acid ion ($CH_3COO^-$), a hydrogen carbonate ion ($HCO_3^-$), a dihydrogen phosphate ion ($H_2PO_4^-$), a hydrogen sulfate ion ($HSO_4^-$), a hydrogen sulfide ion (HS⁻), a thiocyanic acid ion (SCN⁻), a tetrafluoroboric acid ion ($BF_4^-$), a hexafluorophosphate ion ($PF_6^-$), a tetracyanoborate ion ($B(CN)_4^-$), a dicyanoamine ion ($N(CN)_2^-$), a n-toluenesulfonic acid ion (TsO⁻), a trifluoromethyl sulfonate ion ($CF_3SO_2^-$), a bis(trifluoromethylsulfonyl)amine ion ($N(SO_2 CF_3)^{2-}$), a tetrahydroxoaluminate ion ($[Al(OH)_4]^-$ or $[Al(OH)_4(H_2O)_2]^-$), a dicyanoargentate(I) ion ($[Ag(CN)_2]^-$), a tetrahydroxochromate(III) ion ($[Cr(OH)_4]^-$), a tetrachloroaurate(III) ion ($[AuCl_4]^-$), an oxide ion ($O_2^-$), a sulfide ion ($S^{2-}$), a peroxide ion ($O_2^{2-}$), a sulfuric acid ion ($SO_4^{2-}$), a sulfurous acid ion ($SO_3^{2-}$), a thiosulfuric acid ($S_2O_3^{2-}$), a carbonic acid ion ($CO_3^{2-}$), a chromic acid ion ($CrO_4^{2-}$), a dichromic acid ion ($Cr_2O_7^{2-}$), a monohydrogen phosphate ion ($HPO_4^{2-}$), a tetrahydroxozincate(II) ion ($[Zn(OH)_4]^{2-}$), a tetracyanozincate(II) ion ($[Zn(CN)_4]^{2-}$), a tetrachlorocuprate(II) ion ($[CuCl_4]^{2-}$), a phosphoric acid ion ($PO_4^{3-}$), a hexacyanoferrate(III) ion ($[Fe(CN)_6]^{3-}$), a bis(thiosulfate) argentate(I) ion ($[Ag(S_2O_3)_2]^{3-}$) and a hexacyanoferrate(II) ion ($[Fe(CN)_6]^{4-}$). Among them, a tetrafluoroboric acid ion, a hexafluorophosphate ion, a tetracyanoborate ion, a bis(trifluoromethylsulfonyl)amine ion, and a perchloric acid ion are preferable.

The metal complex is particularly preferably a trivalent cobalt complex represented by the following General Formula (5). When the metal complex is a trivalent cobalt complex, the function as the oxidizing agent is excellent, which is advantageous.

[Chem. 31]

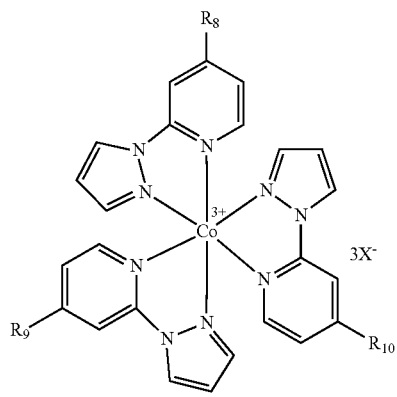

General Formula (5)

In the General Formula (5), $R_8$ to $R_{10}$ represent a hydrogen atom, a methyl group, an ethyl group, a tert-butyl group, or a trifluoromethyl group. X represents one selected from the group consisting of the above anions.

Specific examples of the cobalt complex represented by the General Formula (5) are described below. However, the present disclosure is not limited thereto. These may be used alone or in combination.

[Chem. 32]

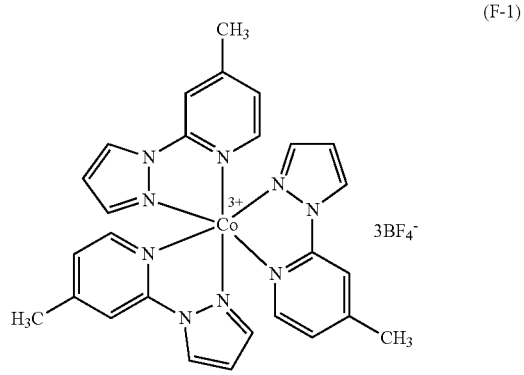

(F-1)

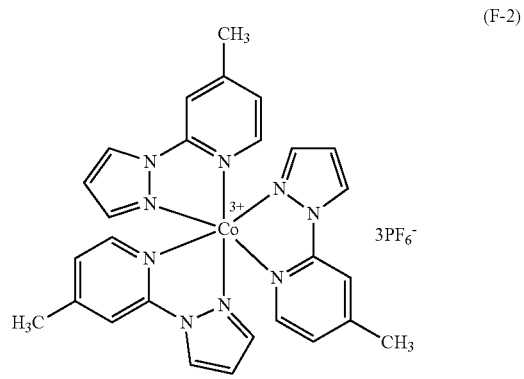

(F-2)

(F-3)
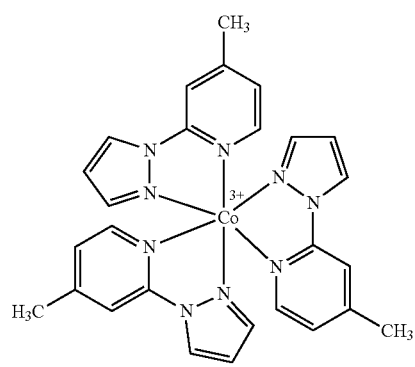
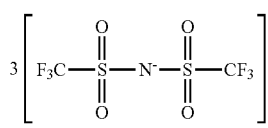
(F-4)
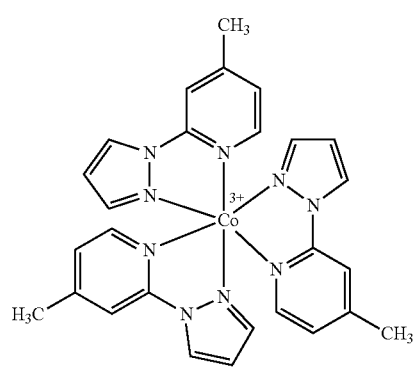
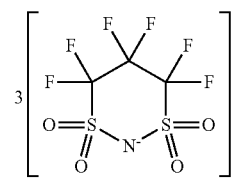
(F-5)
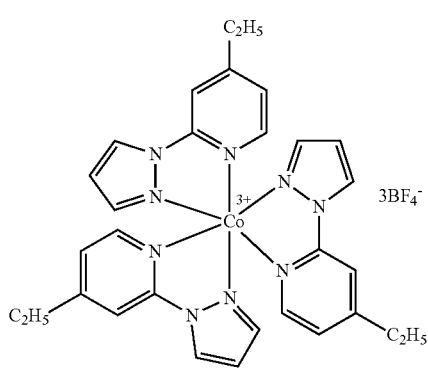
(F-6)
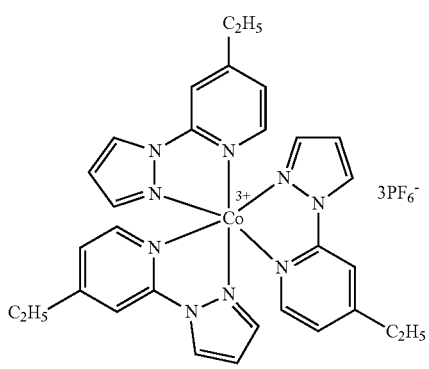
(F-7)
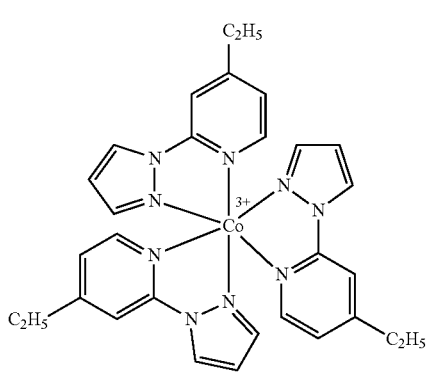
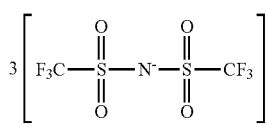
(F-8)
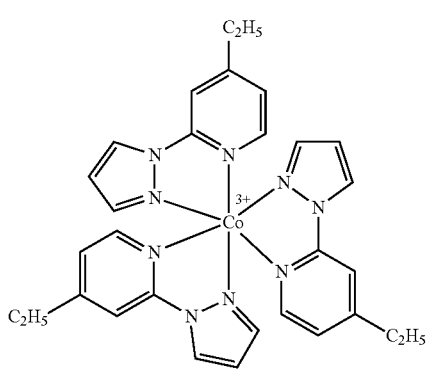
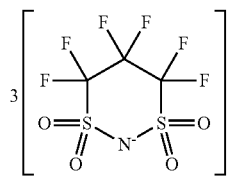

(F-9)
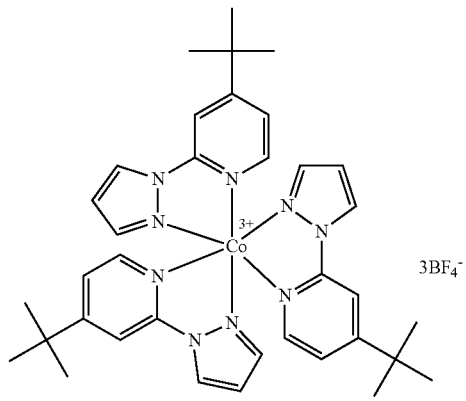
3BF$_4^-$
(F-10)
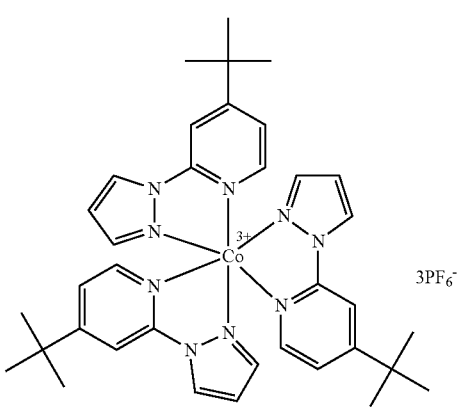
3PF$_6^-$
[Chem. 33]
(F-11)
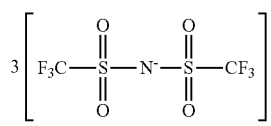
$3\left[ F_3C-\underset{\underset{O}{\|}}{\overset{\overset{O}{\|}}{S}}-N^--\underset{\underset{O}{\|}}{\overset{\overset{O}{\|}}{S}}-CF_3 \right]$
(F-12)
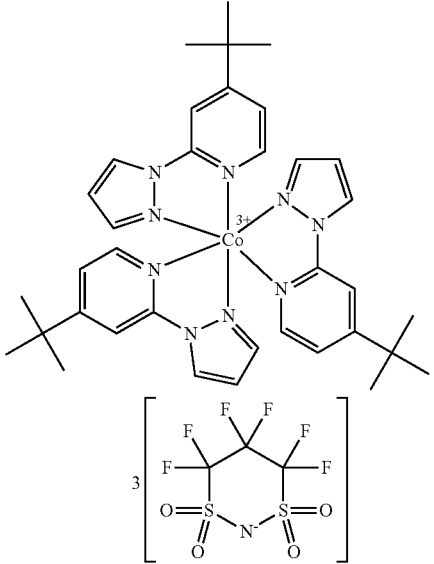
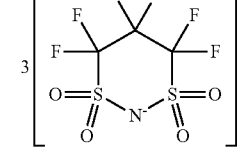
(F-13)
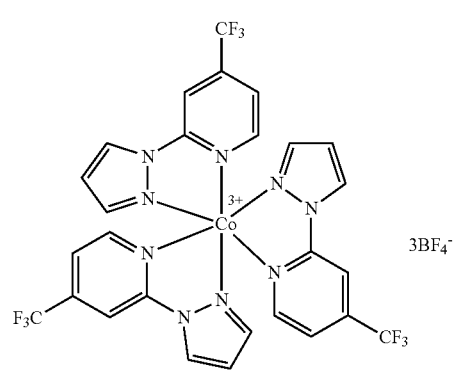
3BF$_4^-$
(F-14)
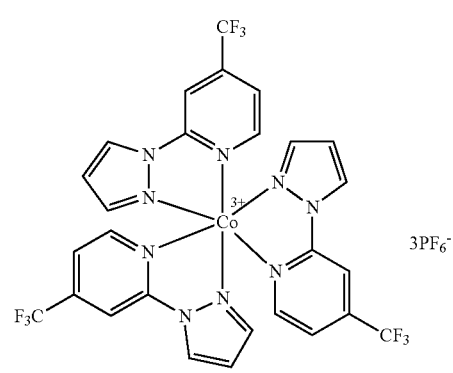
3PF$_6^-$
(F-15)
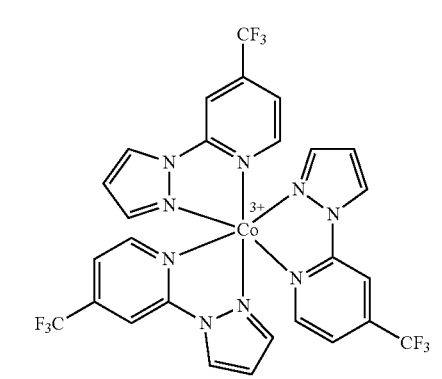

-continued

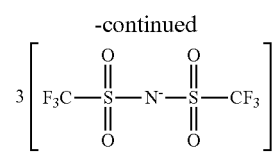
(F-16)

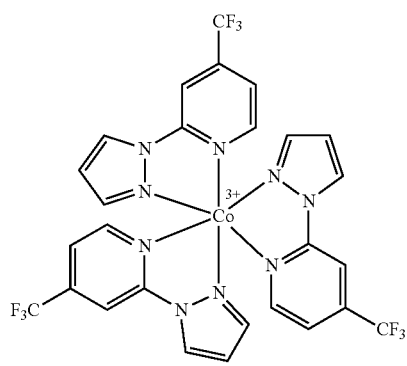
(F-17)

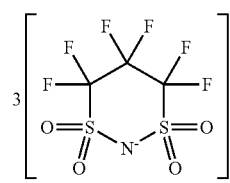
(F-18)

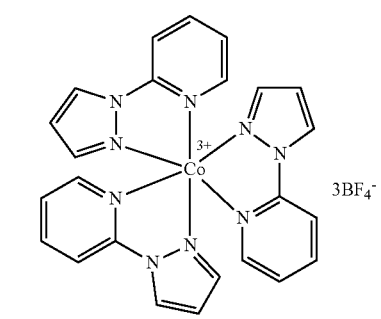
3BF$_4^-$

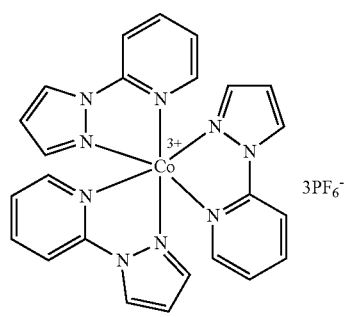
3PF$_6^-$

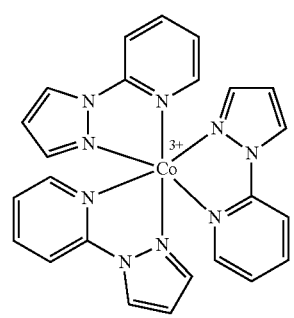

-continued

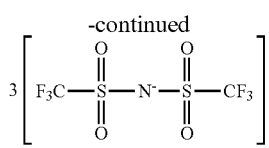
(F-20)

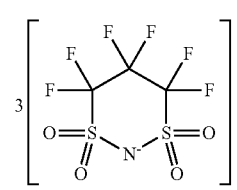

As the metal complex, a trivalent cobalt complex represented by the following General Formula (6) is also effectively used.

[Chem. 34]

General Formula (6)

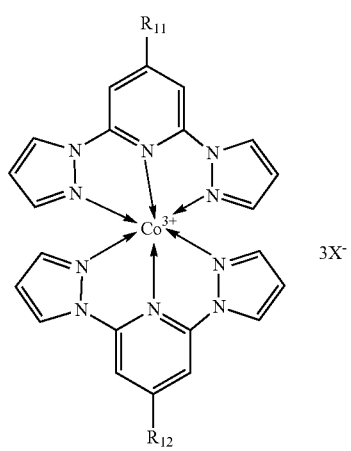

3X$^-$

In the General Formula (6), $R_{11}$ and $R_{12}$ represent a hydrogen atom, a methyl group, an ethyl group, a tert-butyl group, or a trifluoromethyl group. X represents one selected from the group consisting of the above anions.

Specific examples of the cobalt complex represented by the General Formula (6) are described below. However, the present disclosure is not limited thereto. These may be used alone or in combination.

(F-19)

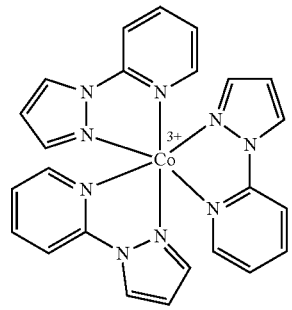

[Chem. 35]

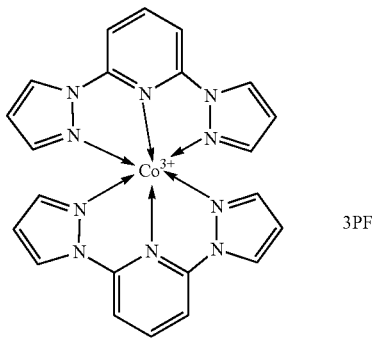
(F-21)

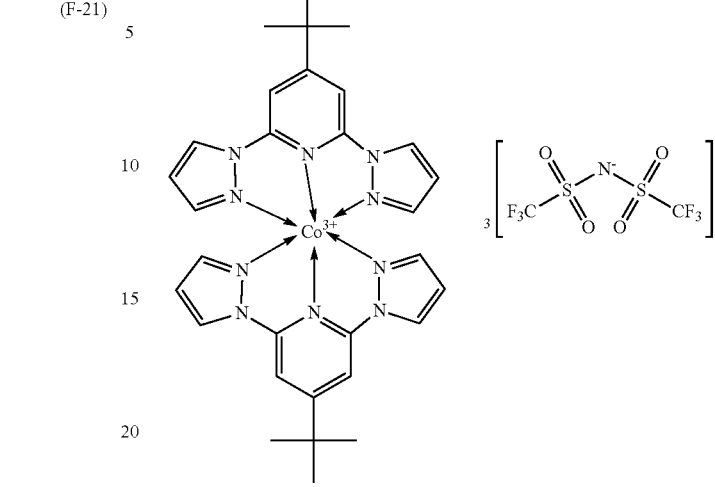
(F-24)

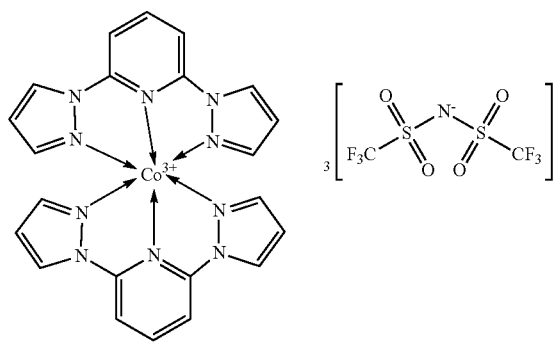
(F-22)

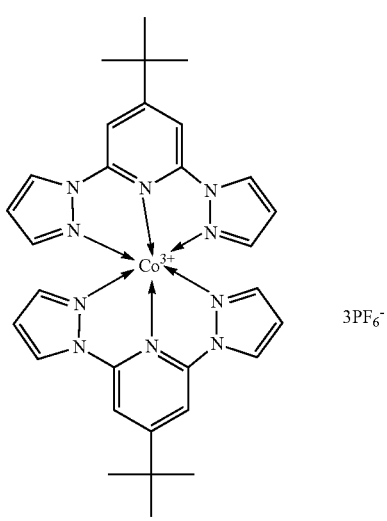
(F-23)

An amount of the oxidizing agent is preferably 0.5 parts by mass or more but 50 parts by mass or less, more preferably 5 parts by mass or more but 30 parts by mass or less, relative to 100 parts by mass of the hole-transporting material. It is not necessary to oxidize all the hole-transporting materials by addition of the oxidizing agent, and it is effective so long as only part of the hole-transporting materials is oxidized.

<<Alkali Metal Salt>>

The hole-transporting layer preferably includes an alkali metal salt as an additive. This is advantageous because transfer of charges can be smooth and good photoelectric conversion characteristics can be obtained.

It is believed that cations of the alkali metal salt exist at a boundary near the electron-transporting layer, and anions of the alkali metal salt are doped in the hole-transporting layer.

Examples of the alkali metal salt include: lithium salts such as lithium chloride, lithium bromide, lithium iodide, lithium perchlorate, lithium bis(trifluoromethanesulfonyl) diimide, lithium diisopropylimide, lithium acetate, lithium tetrafluoroborate, lithium pentafluorophosphate, and lithium tetracyanoborate; sodium salts such as sodium chloride, sodium bromide, sodium iodide, sodium perchlorate, sodium bis(trifluoromethanesulfonyl)diimide, sodium acetate, sodium tetrafluoroborate, sodium pentafluorophosphate, and sodium tetrafluoroborate; and potassium salts such as potassium chloride, potassium bromide, potassium iodide, and potassium perchlorate. Among them, lithium bis(trifluoromethanesulfonyl)diimide and lithium diisopropylimide are preferable.

An amount of the alkali metal salt is preferably 1 part by mass or more but 50 parts by mass or less, more preferably 5 parts by mass or more but 30 parts by mass or less, relative to 100 parts by mass of the hole-transporting material.

The hole-transporting layer may have a single layer structure formed of a single material or may have a laminate structure including a plurality of compounds. When the hole-transporting layer has a laminate structure, it is preferable to use a polymer material in the hole-transporting layer near the second electrode. Use of the polymer material excellent in a film formation property is advantageous because it is possible to make the surface of the porous electron-transporting layer smoother and to improve the photoelectric conversion characteristics. In addition, the polymer material is not easily permeated into the inside of the porous electron-transporting layer. Therefore, the polymer material has an excellent property of covering the surface of the porous electron-transporting layer, and may achieve an effect of preventing short circuit when electrodes are provided.

The polymer material used in the hole-transporting layer is not particularly limited. Examples of the polymer material include known hole-transporting polymer materials.

Examples of the hole-transporting polymer material include polythiophene compounds, polyphenylene vinylene compounds, polyfluorene compounds, polyphenylene compounds, polyarylamine compounds, and polythiadiazole compounds.

Examples of the polythiophene compound include poly(3-n-hexylthiophene), poly(3-n-octyloxythiophene), poly(9,9'-dioctyl-fluorene-co-bithiophene), poly(3,3'''-didodecyl-quarter thiophene), poly(3,6-dioctylthieno[3,2-b]thiophene), poly(2,5-bis(3-decylthiophen-2-yl)thieno[3,2-b]thiophene), poly(3,4-didecylthiophene-co-thieno[3,2-b]thiophene), poly(3,6-dioctylthieno[3,2-b]thiophene-co-thieno[3,2-b]thiophene), poly(3,6-dioctylthieno[3,2-b]thiophene-co-thiophene), and poly(3,6-dioctylthieno[3,2-b]thiophene-co-bithiophene).

Examples of the polyphenylene vinylene compound include poly[2-methoxy-5-(2-ethylhexyloxy)-1,4-phenylenevinylene], poly[2-methoxy-5-(3,7-dimethyloctyloxy)-1,4-phenylenevinylene], and poly[(2-methoxy-5-(2-ethylhexyloxy)-1,4-phenylenevinylene)-co-(4,4'-biphenylenevinylene)].

Examples of the polyfluorene compound include poly(9,9'-didodecylfluorenyl-2,7-diyl), poly[(9,9-dioctyl-2,7-divinylenefluorene)-alt-co-(9,10-anthracene)], poly[(9,9-dioctyl-2,7-divinylenefluorene)-alt-co-(4,4'-biphenylene)], poly[(9,9-dioctyl-2,7-divinylenefluorene)-alt-co-(2-methoxy-5-(2-ethylhexyloxy)-1,4-phenylene)], and poly[(9,9-dioctyl-2,7-diyl)-co-(1,4-(2,5-dihexyloxy)benzene)].

Examples of the polyphenylene compound include poly[2,5-dioctyloxy-1,4-phenylene] and poly[2,5-di(2-ethylhexyloxy-1,4-phenylene].

Examples of the polyarylamine compound include poly[(9,9-dioctylfluorenyl-2,7-diyl)-alt-co-(N,N'-diphenyl)-N,N'-di(p-hexylphenyl)-1, 4-diaminobenzene], poly[(9,9-dioctylfluorenyl-2,7-diyl)-alt-co-(N,N'-bis(4-octyloxyphenyl) benzidine-N,N'-(1,4-diphenylene)], poly[(N,N'-bis(4-octyloxyphenyl)benzidine-N,N'-(1,4-diphenylene)], poly[(N,N'-bis(4-(2-ethylhexyloxy)phenyl)benzidine-N,N'-(1,4-diphenylene)], poly[phenylimino-1,4-phenylenevinylene-2,5-dioctyloxy-1,4-phenylenevinylene-1,4-phenylene], poly[p-tolylimino-1,4-phenylenevinylene-2,5-di(2-ethylhexyloxy)-1,4-phenylenevinylene-1,4-phenylene], and poly[4-(2-ethylhexyloxy)phenylimino-1,4-biphenylene].

Examples of the polythiadiazole compound include poly[(9, 9-dioctylfluorenyl-2,7-diyl)-alt-co-(1,4-benzo(2,1',3)thiadiazole] and poly(3,4-didecylthiophene-co-(1,4-benzo(2,1',3) thiadiazole).

Among them, polythiophene compounds and polyarylamine compounds are preferable in terms of carrier mobility and ionization potential.

Various additives may be added to the hole-transporting material.

Examples of the additive include basic compounds and alkali metal salts such as metal iodides (e.g., iodine, lithium iodide, sodium iodide, potassium iodide, cesium iodide, calcium iodide, copper iodide, iron iodide, and silver iodide), quarternary ammonium salts (e.g., tetraalkylammonium iodide and pyridinium iodide), metal bromides (e.g., lithium bromide, sodium bromide, potassium bromide, cesium bromide, and calcium bromide), bromine salts of quaternary ammonium compounds (e.g., tetraalkylammonium bromide and pyridinium bromide), metal chlorides (e.g., copper chloride and silver chloride), metal acetates (e.g., copper acetate, silver acetate, and palladium acetate), metal sulfates (e.g., copper sulfate and zinc sulfate), metal complexes (e.g., ferrocyanate-ferricyanate and ferrocene-ferrocinium ion), sulfur compounds (e.g., sodium polysulfide and alkylthiol-alkyl disulfide), viologen dyes, hydroquinone, ionic liquids described in Inorg. Chem. 35 (1996) 1168 (e.g., 1,2-dimethyl-3-n-propylimidazolium iodide, 1-methyl-3-n-hexylimidazolium iodide, 1,2-dimethyl-3-ethylimidazolium trifluoromethanesulfonate, 1-methyl-3-butyl-limidazolium nonafluorobutylsulfonate, and 1-methyl-3-ethylimidazolium bis(trifluoromethyl)sulfonyl imide), pyridine, 4-t-butylpyridine, benzimidazole, and derivatives thereof.

An average thickness of the hole-transporting layer is not particularly limited and may be appropriately selected depending on the intended purpose. The hole-transporting layer preferably has such a structure that the hole-transporting layer enters pores of the porous electron-transporting layer. The hole-transporting layer having an average thickness of 0.01 micrometers or more but 20 micrometers or less is preferably disposed on the electron-transporting layer, the hole-transporting layer having an average thickness of 0.1 micrometers or more but 10 micrometers or less is more preferably disposed on the electron-transporting layer, the hole-transporting layer having an average thickness of 0.2 micrometers or more but 2 micrometers or less is still more preferably disposed on the electron-transporting layer.

The hole-transporting layer can be directly formed on the electron-transporting layer to which a photosensitization compound has been adsorbed. A method for producing the hole-transporting layer is not particularly limited and may be appropriately selected depending on the intended purpose. Examples of the method include a method for forming a thin film under vacuum such as the vacuum deposition method and the wet film formation method. Among them, particularly, the wet film formation method is preferable, a method for performing coating on an electron-transporting layer is preferable in terms of production cost.

When the wet film formation method is used, the coating method is not particularly limited and can be performed according to the methods known in the art. Examples thereof include the dip method, the spray method, the wire bar method, the spin-coating method, the roller coating method, the blade coating method, the gravure coating method, and the die coating method. Examples of the wet printing method include various methods such as relief printing, offset printing, gravure printing, intaglio printing, rubber plate printing, and screen printing.

The film may be formed in a supercritical fluid or a subcritical fluid having lower temperature and pressure than a critical point. The supercritical fluid is not particularly limited and may be appropriately selected depending on the intended purpose, so long as it exists as a non-condensable high-density fluid in a temperature and pressure region exceeding the limit (critical point) at which gas and liquid can coexist, does not condense even when compressed, and is fluid in a state of being equal to or more than the critical temperature and the critical pressure. The supercritical fluid is preferably a supercritical fluid having a low critical temperature.

Examples of the supercritical fluid include carbon monoxide, carbon dioxide, ammonia, nitrogen, water, alcohol solvents, hydrocarbon solvents, halogen solvents, and ether solvents.

Examples of the alcohol solvent include methanol, ethanol, and n-butanol.

Examples of the hydrocarbon solvent include ethane, propane, 2,3-dimethylbutane, benzene, and toluene. Examples of the halogen solvent include methylene chloride and chlorotrifluoromethane.

Examples of the ether solvent include dimethyl ether.

These may be used alone or in combination.

Among them, since carbon dioxide has a critical pressure of 7.3 MPa and a critical temperature of 31 degrees Celsius, it can easily generate a supercritical state, has incombustibility, and is easily handled, which is preferable.

The subcritical fluid is not particularly limited and may be appropriately selected depending on the intended purpose so long as it exists as high-pressure liquid in a temperature and pressure region near the critical point. The compounds exemplified as the supercritical fluid can be suitably used as the subcritical fluid.

A critical temperature and a critical pressure of the supercritical fluid are not particularly limited and may be appropriately selected depending on the intended purpose. The critical temperature thereof is preferably −273 degrees Celsius or more but 300 degrees Celsius or less, more preferably 0 degrees Celsius or more but 200 degrees Celsius or less.

In addition to the supercritical fluid and the subcritical fluid, an organic solvent or an entrainer may be used in combination. The solubility in the supercritical fluid can be more easily adjusted by addition of the organic solvent or the entrainer.

The organic solvent is not particularly limited and may be appropriately selected depending on the intended purpose. Examples thereof include ketone solvents, ester solvents, ether solvents, amide solvents, halogenated hydrocarbon solvents, and hydrocarbon solvents.

Examples of the ketone solvent include acetone, methyl ethyl ketone, and methyl isobutyl ketone.

Examples of the ester solvent include ethyl formate, ethyl acetate, and n-butyl acetate.

Examples of the ether solvent include diisopropyl ether, dimethoxy ethane, tetrahydrofuran, dioxolane, and dioxane. Examples of the amide solvent include N,N-dimethylformamide, N,N-dimethylacetamide, and N-methyl-2-pyrrolidone.

Examples of the halogenated hydrocarbon solvent include dichloromethane, chloroform, bromoform, methyl iodide, dichloroethane, trichloroethane, trichloroethylene, chlorobenzene, o-dichlorobenzene, fluorobenzene, bromobenzene, iodobenzene, and 1-chloronaphthalene.

Examples of the hydrocarbon solvent include n-pentane, n-hexane, n-octane, 1,5-hexadiene, cyclohexane, methylcyclohexane, cyclohexadiene, benzene, toluene, o-xylene, m-xylene, p-xylene, ethylbenzene, and cumene.

These may be used alone or in combination.

After the hole-transporting material is laminated on the electron-transporting layer to which the photosensitization compound has been adsorbed, a press treatment step may be performed. The press treatment allows the hole-transporting material to further adhere to the electron-transporting layer that is a porous electrode, which may improve efficiency.

A method of the press treatment is not particularly limited and may be appropriately selected depending on the intended purpose. Examples of the method include a press molding method using a plate that is represented by an IR tablet molding device and a roll press method using a roller.

The pressure is preferably 10 $kgf/cm^2$ or more, more preferably 30 $kgf/cm^2$ or more.

The time of the press treatment is not particularly limited and may be appropriately selected depending on the intended purpose. The time thereof is preferably 1 hour or shorter. Moreover, heat may be applied at the time of the press treatment. At the time of the press treatment, a release agent may be disposed between a pressing machine and electrodes.

Examples the release agent include fluororesins, such as polyethylene tetrafluoride, polychloroethylene trifluoride, ethylene tetrafluoride-propylene hexafluoride copolymers, perfluoroalkoxy fluoride resins, polyvinylidene fluoride, ethylene-ethylene tetrafluoride copolymers, ethylene-chloroethylene trifluoride copolymers, and polyvinyl fluoride. These may be used alone or in combination.

A metal oxide may be disposed between the hole-transporting material and a second electrode after the press treatment step but before disposition of the second electrode.

Examples of the metal oxide include molybdenum oxide, tungsten oxide, vanadium oxide, and nickel oxide. These may be used alone or in combination. Among them, molybdenum oxide is preferable.

A method for disposing the metal oxide on the hole-transporting layer is not particularly limited and may be appropriately selected depending on the intended purpose. Examples of the method include a method where a thin film is formed in vacuum (e.g., sputtering method and vacuum vapor deposition method), and the wet film formation method.

The wet film formation method is preferably a method where a paste obtained by dispersing powder or sol of the metal oxide is prepared and is coated on the hole-transporting layer. In the case where the wet film formation method is used, a coating method is not particularly limited and may be performed according to the methods known in the art. Examples of the coating method include the dip method, the spraying method, the wire bar method, the spin coating method, the roller coating method, the blade coating method, the gravure coating method, and the die coating method. As the wet printing method, various methods such as relief printing, offset printing, gravure printing, intaglio printing, rubber plate printing, and screen printing can be used.

An average thickness of the metal oxide coated is preferably 0.1 nm or more but 50 nm or less, more preferably 1 nm or more but 10 nm or less.

<Second Electrode>

The photoelectric conversion element includes a second electrode.

The second electrode can be formed on the hole-transporting layer or on a metal oxide on the hole-transporting layer. The same as the first electrode can be used in the second electrode. When strength can be sufficiently maintained, a support is not always necessary.

Examples of a material of the second electrode include metals, carbon compounds, conductive metal oxides, and conductive polymers.

Examples of the metal include platinum, gold, silver, copper, and aluminum.

Examples of the carbon compound include graphite, fullerene, carbon nanotube, and graphene.

Examples of the conductive metal oxide include ITO, FTO, and ATO.

Examples of the conductive polymer include polythiophene and polyaniline.

These may be used alone or in combination.

A method for providing these metal oxides on the hole-transporting material is not particularly limited and may be appropriately selected depending on the intended purpose. Examples of the method include: a method for forming a thin film under vacuum such as the sputtering method or the vacuum deposition method; and the wet film formation method.

The wet film formation method is preferably a method where paste dispersing powder or sol of a metal oxide is prepared, and then the paste is coated onto the hole-transporting layer.

When the wet film formation method is used, a coating method is not particularly limited and may be performed according to methods known in the art.

Examples thereof include the dip method, the spray method, the wire bar method, the spin-coating method, the roller coating method, the blade coating method, the gravure coating method, and the die coating method. Examples of the wet printing method include various methods such as relief printing, offset printing, gravure printing, intaglio printing, rubber plate printing, and screen printing. A film thickness is preferably 0.1 nm or more but 50 nm or less, more preferably 1 nm or more but 10 nm or less.

The second electrode is newly provided after formation of the hole-transporting layer or on the aforementioned metal oxide.

The same as the first electrode can be generally used in the second electrode. A support is not always required in such a configuration that strength or a sealing property is sufficiently secured.

The second electrode can appropriately be formed on the hole-transporting layer by methods such as the coating method, the lamination method, the deposition method, the CVD method, and the pasting method, depending on kinds of materials to be used and kinds of the hole-transporting layer.

In the photoelectric conversion element, it is preferable that at least one of the first electrode and the second electrode be substantially transparent. Preferably, a side of the first electrode is transparent, and a method for receiving incident light from the side of the first electrode is used. In this case, a material that reflects light is preferably used at a side of the second electrode, and glass, plastic, or a metal thin film on which a metal or a conductive oxide is deposited is preferably used. In addition, provision of an antireflection layer at a side where the incident light is to be received is an effective means.

<Sealing Part>

It is preferable to include a sealing part configured to shield at least the photoelectric conversion layer from an external environment.

The sealing part is sandwiched by a pair of substrates, at least the electron-transporting layer and the hole-transporting layer may be shielded from an external environment, and the sealing part of the photoelectric conversion element may include a hollow section.

A position of the sealing member is not particularly limited and may be appropriately selected depending on the intended purpose, so long as the sealing member is disposed at a position at which at least the electron-transporting layer and the hole-transporting layer are shielded from an external environment. For example, the sealing member may be provided on the whole surface so as to cover the electron-transporting layer, the hole-transporting layer, and the second electrode. Alternatively, a substrate may be provided above a second electrode, and the sealing member may be provided at external edges of the substrate so as to attach the sealing member to at least one of the first substrate, the first electrode, and the hole blocking layer.

In such a configuration that a substrate is provided and the sealing member is provided at external edges of the substrate as described in the latter, a hollow section can be provided inside the photoelectric conversion element or the photoelectric conversion module. The hollow section can control oxygen and humidity, and is effective in improving output or durability.

In the case where the sealing part and the photoelectric conversion layer are in contact with each other, when the photoelectric conversion element is deformed by mechanical stress, the photoelectric conversion layer may be broken (exfoliation, crack) due to stretch of the sealing part. In terms of durability over time, uncured monomer components etc. may flow out from the sealing part over time to erode the photoelectric conversion layer.

Therefore, in the present disclosure, the sealing part is disposed so as to surround the periphery of the photoelectric conversion layer. As described in FIG. 26, the width of the sealing part 9 disposed in each side has a minimum width A and a maximum width B in a width direction. The minimum width A and the maximum width B are given at a boundary of the sealing part or at bulk of the sealing part. A ratio (B/A) of the maximum width B to the minimum width A is preferably 1.02 or more but 5.0 or less, more preferably 1.09 or more but 3.0 or less. When the ratio (B/A) is 1.02 or more but 5.0 or less, a displacement amount becomes large in accordance with the deformation of the photoelectric conversion element due to mechanical stress, and durability to mechanical stress can be improved while high durability to high temperature and high humidity is maintained.

A distance C between the sealing part and the second electrode is preferably 30 micrometers or more, more preferably 50 micrometers or more, still more preferably 100 micrometers or more. The distance C satisfying 30 micrometers or more is advantageous because monomer components hardly reach a power generation layer even when oozed from the sealing resin.

The minimum width A, the maximum width B, and the distance C can be measured by, for example, an optical microscope and a microscope.

A shape of the sealing part in the width direction is not particularly limited, so long as the ranges of the ratio (B/A) and the distance C are satisfied. Examples of the shape include curved shapes, rectangular shapes, and wedge-shapes. These may be used alone or a plurality of shapes may be mixed. The periodicity of the shape is not particularly limited. The periodicity of the shape may be random or may be periodic.

In the present disclosure, preferably, at least part of the peripheral part of the photoelectric conversion layer includes a deletion part, and the sealing part is disposed between the deletion part and the second substrate.

Because fine concave-convex parts is formed by the deletion part, adhesiveness to the sealing part is improved by the anchor effect, and durability to mechanical stress can be improved while high durability to high temperature and high humidity is maintained.

The sealing member is not particularly limited and may be appropriately selected depending on the intended purpose, so long as it inhibits entry of water vapor of the air. Examples of the sealing member include low melting point fritted glass, ultraviolet ray curable resins such as epoxy resins and acrylic resins, and thermosetting resins. These may be used alone or in combination. In addition to the aforementioned constitution materials, a drying agent may be mixed to further inhibit entry of water vapor.

In the present disclosure, an epoxy resin is preferably used as the sealing member.

In the case where the epoxy resin is used as the sealing member and the hole-transporting layer includes at least one selected from the group consisting of a tertiary amine compound represented by the General Formula (1) and a tertiary amine compound represented by the General Formula (2), even when the photoelectric conversion element is stored under high temperature and high humidity conditions, it can maintain high output obtained before the storage.

In addition, because flexibility of a cured product and adhesiveness to the substrate can be favorably maintained, good mechanical durability can also be obtained.

The epoxy resin is not particularly limited and may be appropriately selected depending on the intended purpose, so long as it is a resin obtained by curing a monomer or an oligomer including an epoxy group in a molecule thereof. Examples of the epoxy resin include water-dispersing epoxy resins, non-solvent epoxy resins, solid-type epoxy resins, thermosetting epoxy resins, curing agent-mixed epoxy resins, and ultraviolet ray-curable epoxy resins. Among them, thermosetting epoxy resins and ultraviolet ray-curable epoxy resins are preferable, ultraviolet ray-curable epoxy resins are more preferable. Note that, ultraviolet ray-curable epoxy resins may be heated.

Examples of the epoxy resin include bisphenol A-based epoxy resins, bisphenol F-based epoxy resins, novolac-based epoxy resins, alicyclic epoxy resins, long-chain aliphatic epoxy resins, glycidyl amine-based epoxy resins, glycidyl ether-based epoxy resins, and glycidyl ester-based epoxy resins. These may be used alone or in combination.

The epoxy resin may include a curing agent and various additives if necessary.

Examples of the curing agent include amine-based curing agents, acid anhydride-based curing agents, polyamide-based curing agents, and other curing agents.

Examples of the amine-based curing agent include: aliphatic polyamine such as diethylenetriamine and triethylenetetramine; and aromatic polyamine such as meth-phenylenediamine, diaminodiphenylmethane, and diaminodiphenylsulfone.

Examples of the acid anhydride-based curing agent include phthalic anhydride, tetrahydrophthalic anhydride, hexahydrophthalic anhydride, methyltetrahydrophthalic anhydride, methylnadic anhydride, pyromellitic anhydride, HET anhydride, and dodecenylsuccinic anhydride.

Examples of other curing agents include imidazoles and polymercaptan. These may be used alone or in combination.

Examples of the additive include fillers, spacers, polymerization initiators, drying agents (moisture absorbents), curing accelerators, coupling agents, flexibilizers, colorants, flame retardant auxiliaries, antioxidants, and organic solvents. These may be used alone or in combination. Among them, fillers, gap agents, curing accelerators, polymerization initiators, and drying agents (moisture absorbents) are preferable, and fillers and polymerization initiators are particularly preferable.

—Filler—

The filler is effective in preventing entry of moisture or oxygen under an external environment. In addition, the filler can obtain effects such as a decrease in volumetric shrinkage at the time of curing, a decrease in an amount of gas generated at the time of curing or heating, improvement of mechanical strength, and control of thermal conductivity or fluidity, and is considerably effective in maintaining a stable output under various environments in the present disclosure.

Regarding the output characteristics or the durability of the photoelectric conversion element, not only an influence by moisture or oxygen entering into the photoelectric conversion element from an external environment but also an influence by gas generated at the time of heating and curing the sealing member cannot be ignored. Particularly, an influence by the gas generated at the time of heating greatly affects the output characteristics when the photoelectric conversion element is stored under a high temperature environment.

In this case, when the filler, the gap agent, and the drying agent are included in the sealing member, they can prevent entry of moisture or oxygen, and can decrease an amount of the sealing member used, which makes it possible to obtain an effect of decreasing generation of gas. This is effective not only at the time of curing but also when the photoelectric conversion element is stored under a high temperature environment.

The filler is not particularly limited and known products may be used. Preferable examples of the filler include inorganic fillers such as crystalline or amorphous silica, talc, alumina, aluminum nitride, silicon nitride, calcium silicate, and calcium carbonate. These may be used alone or in combination.

An average primary particle diameter of the filler is preferably 0.1 micrometers or more but 10 micrometers or less, more preferably 1 micrometer or more but 5 micrometers or less. The average primary particle diameter of the filler satisfying 0.1 micrometers or more but 10 micrometers or less is effective, because an effect of preventing entry of moisture or oxygen can be sufficiently achieved, the viscosity becomes appropriate, adhesiveness to a substrate or a defoaming property is improved, and control of the width of the sealing part and workability are achieved.

It is preferable that the filler be uniformly disposed in the sealing part. This makes it possible to sufficiently obtain an effect of inhibiting entry of moisture or oxygen. When a gap agent or a spacer is used, a layer in which the density of the filler is low may be formed near its boundary. In this case, an effect of inhibiting entry of moisture or oxygen can be sufficiently obtained by lengthening, in the width direction of the sealing part, a distance of the layer in which the density of the filler is low. The density of the filler can be measured by, for example, a scanning electron microscope (SEM).

An amount of the filler is preferably 10 parts by mass or more but 90 parts by mass or less, more preferably 20 parts by mass or more but 70 parts by mass or less, relative to the total amount of the sealing member. When the amount of the filler is 10 parts by mass or more but 90 parts by mass or less, an effect of preventing entry of moisture or oxygen can be sufficiently obtained, the viscosity becomes appropriate, and adhesiveness and workability are good.

—Gap Agent—

The gap agent is called a gap controlling agent or a spacer agent, and can control gap of the sealing part. For example, when a sealing member is provided on a first substrate or a first electrode and a second substrate is provided thereon for sealing, a gap of the sealing part is matched with a size of the gap agent because the gap agent is mixed in an epoxy resin. As a result, it is possible to easily control the gap of the sealing part.

As the gap agent, known materials in the art can be used so long as it has a particulate shape and a uniform particle diameter, and has high solvent resistance and high heat resistance. Those having a high affinity with the epoxy resin and having a spherical particulate shape are preferable. Specific examples thereof include glass beads, silica particles, and organic resin particles. These may be used alone or in combination.

A particle diameter of the gap agent can be selected depending on a gap of the sealing part to be set. The particle diameter of the gap agent is preferably 1 micrometer or more but 100 micrometers or less, more preferably 5 micrometers or more but 50 micrometers or less.

As another method for controlling gap of the sealing part, a spacer may be disposed.

The spacer may be disposed at any place so long as it is positioned at a peripheral part of the photoelectric conversion layer. For example, the spacer may be disposed, for example, on the first substrate, on the first electrode, on the hole blocking layer, on the deletion layer, on the second electrode, or on the second substrate. The spacer may be disposed on a combination of the foregoing.

The spacer may be disposed outside the sealing part or may be incorporated inside the sealing part.

A material of the spacer is not particularly limited and may be appropriately selected depending on the intended purpose so long as it inhibits entry of water vapor of the air. Examples of the material include glass materials, metal materials, metal oxide materials, ultraviolet ray curable resins such as an epoxy resin or an acrylic resin, and thermosetting resins. These may be used alone or in combination.

—Polymerization Initiator—

The polymerization initiator is a material that is added for the purpose of initiating polymerization using heat or light.

The thermal polymerization initiator is a compound that generates active species such as radicals or cations through heating. Specific examples of the thermal polymerization initiator include azo compounds such as 2,2'-azobisbutyronitrile (AIBN) and peroxides such as benzoyl peroxide (BPO). Examples of the thermal cationic polymerization initiator include benzenesulfonic acid esters and alkyl sulfonium salts.

Meanwhile, as the photopolymerization initiator, a photocationic polymerization initiator is preferably used in the case of the epoxy resin. When the photocationic polymerization initiator is mixed with the epoxy resin and light is emitted, the photocationic polymerization initiator is decomposed to generate strong acid, and the acid induces polymerization of the epoxy resin. Then, curing reaction proceeds. The photocationic polymerization initiator has such effects that volumetric shrinkage during curing is low, oxygen inhibition does not occur, and storage stability is high.

Examples of the photocationic polymerization initiator include aromatic diazonium salts, aromatic iodonium salts, aromatic sulfonium salts, metallocene compounds, and silanol-aluminum complexes. Moreover, a photoacid generator having a function of generating an acid upon irradiation of light can also be used.

The photoacid generator functions as an acid for initiating cationic polymerization. Examples of the photoacid generator include onium salts such as ionic sulfonium salt-based onium salts and ionic iodonium salt-based onium salts including a cation part and an anionic part. These may be used alone or in combination.

An amount of the polymerization initiator is preferably 0.5 parts by mass or more but 10 parts by mass or less, more preferably 1 part by mass or more but 5 parts by mass or less relative to the total amount of the sealing member. The amount of the polymerization initiator satisfying 0.5 parts by mass or more but 10 parts by mass or less allows curing to proceed appropriately, can decrease the remaining uncured products, and can prevent the amount of generated gas from being excessive, which is effective.

—Drying Agent—

The drying agent is also called a moisture absorbent and is a material having a function of physically or chemically adsorbing or absorbing moisture. Inclusion of the drying agent in the sealing member is effective because moisture resistance may be further improved and influence of outgas can be decreased in some cases.

The drying agent is preferably particulate. Examples of the drying agent include inorganic water-absorbing materials such as calcium oxide, barium oxide, magnesium oxide, magnesium sulfate, sodium sulfate, calcium chloride, silica gel, molecular sieve, and zeolite. These may be used alone or in combination. Among them, zeolite is preferable because zeolite absorbs a large amount of moisture.

—Curing Accelerator—

The curing accelerator is also called a curing catalyst and is used for the purpose of accelerating a curing speed. The curing accelerator is mainly used for a thermosetting epoxy resin.

Examples of the curing accelerator include: tertiary amine or tertiary amine salts such as DBU (1,8-diazabicyclo(5,4,0)-undecene-7) and DBN (1,5-diazabicyclo(4,3,0)-nonene-5); imidazole-based compounds such as 1-cyanoethyl-2-ethyl-4-methylimidazole and 2-ethyl-4-methylimidazole; and phosphine or phosphonium salts such as triphenylphosphine and tetraphenylphosphonium•tetraphenyl borate. These may be used alone or in combination.

—Coupling Agent—

The coupling agent has an effect of enhancing a bonding force between molecules, and examples of the coupling agent include silane coupling agents. Specific examples thereof include: silane coupling agents such as 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-phenyl-γ-aminopropyltrimethoxysilane, N-(2-aminoethyl)3-aminopropylmethyldimethoxysilane, N-(2-aminoethyl)3-aminopropylmethyltrimethoxysilane, 3-aminopropyltriethoxysilane, 3-mercaptopropyltrimethoxysilane, vinyltrimethoxysilane, N-(2-(vinylbenzylamino)ethyl)3-aminopropyltrimethoxysilane hydrochloride, and 3-methacryloxypropyltrimethoxysilane. These may be used alone or in combination.

As the sealing member, epoxy resin compositions that are commercially available as sealing materials, seal materials, or adhesives have been known, and can be effectively used in the present disclosure. Among them, there are epoxy resin compositions that are developed and are commercially available to be used in solar cells or organic EL elements, and can be particularly effectively used in the present disclosure.

Examples of the commercially available products include product names: TB3118, TB3114, TB3124, and TB3125F (all of which are available from ThreeBond), World Rock 5910, World Rock 5920, and World Rock 8723 (all of which are available from Kyoritsu Chemical & Co., Ltd.), and WB90US(P) (available from MORESCO).

The epoxy resin compositions are disclosed in, for example, Japanese Patent No. 4918975, Japanese Patent No. 5812275, Japanese Patent No. 5835664, Japanese Patent No. 5930248, and Japanese Unexamined Patent Application Publication No. 2012-136614, and these epoxy resin compositions may also be used.

In the present disclosure, a sheet-shaped sealing material may also be effectively used.

The sheet-shaped sealing material is a sheet on which an epoxy resin layer has been formed on the sheet in advance. As the sheet, for example, glass or a film having high gas barrier properties may be used, and the sheet-shaped sealing material corresponds to a substrate in the present disclosure. When the sheet-shaped sealing material is pasted on the second electrode of the photoelectric conversion element or the photoelectric conversion module, followed by curing, the sealing member and the substrate can be formed at one time. Depending on formation patterns of the epoxy resin layer formed on the sheet, a hollow section can be provided in the photoelectric conversion element, which is effective.

Preferably, the hollow section includes particularly oxygen. Inclusion of oxygen makes it possible to stably maintain a function of transporting holes of the hole-transporting layer for a long period of time, and to improve durability of the photoelectric conversion element or the photoelectric conversion module. An oxygen concentration of the hollow section inside the photoelectric conversion element disposed through sealing can achieve effects so long as oxygen is included. The oxygen concentration is preferably 1.0% by volume or more but 21.0% by volume or less, more preferably 3.0% by volume or more but 15.0% by volume or less.

The oxygen concentration of the hollow section can be controlled by performing the sealing in a glove box in which the oxygen concentration has been set. The oxygen concentration can be set by a method using a gas cylinder having a specific oxygen concentration or by a method using a nitrogen gas generator. The oxygen concentration in a glove box is measured using a commercially available oxygen concentration meter or oxygen monitor.

The oxygen concentration inside the hollow section formed through the sealing can be measured through, for example, an atmospheric pressure ionization mass spectrometer (API-MS). Specifically, the photoelectric conversion element or photoelectric conversion module is placed in a chamber filled with inert gas, and the sealed part is opened in the chamber. Then, the gas in the chamber is subjected to quantitative analysis through API-MS, and all the components in the gas contained in the hollow section are quantified. A ratio of oxygen to a total of the all components can be calculated to determine an oxygen concentration.

Gas other than oxygen is preferably inert gas. Examples of the inert gas include nitrogen and argon.

When the sealing is performed, the oxygen concentration and the dew point in a glove box are preferably controlled, and such a control is effective in improving the output and the durability.

The dew point is defined as a temperature at which condensation starts when water vapor-containing gas is cooled.

The dew point is preferably 0 degrees Celsius or less, more preferably −20 degrees Celsius or less. The lower limit thereof is preferably −50 degrees Celsius or more.

Moreover, a passivation layer may be disposed between the second electrode and the sealing member. The passivation layer is not particularly limited and may be appropriately selected depending on the intended purpose. For example, aluminum oxide, silicon nitride, and silicon oxide are preferable.

A method for forming the sealing member is not particularly limited and may be appropriately selected depending on the intended purpose. Examples of the method include the dispensing method, the wire bar method, the spin-coating method, the roller coating method, the blade coating method, the gravure coating method, the relief printing, the offset printing, the intaglio printing, the rubber plate printing, and the screen printing.

<Deletion Part>

The deletion part is preferably disposed on at least part of a peripheral part of the photoelectric conversion layer.

The deletion part in the present disclosure preferably includes a deletion layer.

The deletion layer may be formed on the first substrate, may be formed on the first electrode, may be formed on the hole blocking layer, or may be formed on a combination of the foregoing.

The deletion part preferably has concave-convex parts.

A maximum thickness of the deletion layer included in the deletion part is preferably 5 nm or more but 1,000 nm or less, more preferably 10 nm or more but 300 nm or less.

The minimum thickness is preferably 1/10 or less as large as the maximum thickness, and is more preferably 0 nm.

When the minimum thickness is 0 nm, a percentage of a region including the deletion layer in the deletion part is preferably 30% or more but 95% or less, more preferably 40% or more but 80% or less.

A shape of the convex part may be a periodic structure, or may be a random structure. The shape of the convex part may be such a structure that particles are bound.

The concave part may be sufficiently filled with the sealing member.

The filling state can be confirmed by a scanning electron microscope (SEM).

When the maximum thickness and the minimum thickness fall within the preferable ranges, the anchor effect utilizing fine concave-convex parts improves adhesiveness to the sealing part. Moreover, the deletion layer functions as a filler at a boundary between the substrate and the sealing part, to delay entry of humidity. Furthermore, while high durability to high temperature and high humidity is maintained, durability to mechanical stress can be improved.

The deletion layer preferably includes the same material as the hole blocking layer. When the deletion layer includes the same material as the hole blocking layer, the deletion layer and the hole blocking layer strongly adhere to each other. As a result, while high durability to high temperature and high humidity is maintained, durability to mechanical stress can be improved.

The deletion layer preferably includes one or more kinds of constituent materials of the photoelectric conversion layer, and more preferably includes at least the same material as the material of the electron-transporting layer.

The deletion layer preferably includes an oxide semiconductor, more preferably includes titanium oxide, zinc oxide, tin oxide, and niobium oxide, particularly preferably includes titanium oxide. The deletion layer may further include a photosensitization compound and a hole-transporting layer. In order to prevent curing failure of the sealing member, the deletion layer more preferably includes no hole-transporting layer.

The deletion layer is formed by residues obtained when each layer is removed.

The residues can be confirmed by elementary analysis of the surface in addition to the thickness measurement. The confirmation can be performed by detecting elements constituting the electron-transporting layer or the hole-transporting layer by measurement using, for example, an energy-dispersive X-ray spectroscopy SEM-EDX. A method for confirming the maximum thickness and the minimum thickness is not particularly limited. The maximum thickness and the minimum thickness can be confirmed by known means. The maximum thickness and the minimum thickness can be measured by, for example, a scanning electron microscope (SEM).

A method for forming a cross section for confirming the thickness is not particularly limited and conventionally existing means may be used. The cross section can be formed by known means such as a diamond cut saw, a diamond wire saw, an ion milling, and focused ion beam processing (FIB).

The deletion layer has a thickness in nanometer. Therefore, when the deletion layer is measured using, for example, a scanning electron microscope (SEM), the measurement is performed within a discriminable range of vision. For example, the measurement conditions (acceleration voltage: 3 kV, aperture size: 60 micrometers) described in FIG. 27 are preferable. Here, regarding a minimum thickness of 0 nm, a place where the deletion layer cannot be confirmed under the measurement conditions (acceleration voltage: 3 kV, aperture size: 60 micrometers) described in FIG. 27 is considered as 0 mm.

The region including the deletion layer in the deletion part can be evaluated using a scanning electron microscope (SEM). As presented in FIG. 27, the region including the deletion can be calculated by the following equation within a width of about 3.8 micrometers.

Width including the deletion layer/entire width=region including the deletion layer (%)

The fine concave-convex parts can be formed by the deletion layer even when concave-convex parts are not formed on the first substrate or the first electrode. For example, the binding region with the sealing part has a plurality of boundaries between the first substrate and the first electrode, wettability of the sealing member changes and a difference in adhesiveness may occur. Meanwhile, for example, when the deletion layer covers the first substrate and the first electrode, the binding region with the sealing part becomes the same boundary by the deletion layer, and the wettability does not change and adhesiveness becomes uniform. Because a difference in adhesiveness affects resistance to stress, the same boundary is more preferable.

A method for forming the deletion layer is not particularly limited and may be performed according to known methods. Examples of the method include the sand blasting method, the water blasting method, the polishing method, the chemical etching method, and the laser processing method. Among them, the laser processing method is preferable.

When the laser processing method is used, laser may be emitted from a side of the first electrode or from a side of the second electrode. However, the laser is preferably emitted from a side of the first electrode.

In addition, performing defocus is useful to decrease damage to the electrode. The defocus is preferably from −1 mm through −10 mm.

Regarding the timing of the processing, after a film of the hole-transporting layer is formed, not only the electron-transporting layer but also the hole-transporting layer is preferably subjected to the processing at the same time.

The power of the laser is preferably 5.0 microjoules or more but 9.5 microjoules or less, more preferably from 7.0 microjoules through 9.0 microjoules. When the power of the laser is 10 microjoules or more, photoelectric conversion characteristics are possibly decreased due to damage to the electrode.

The pitch of the laser is preferably 1 micrometer or more but 80 micrometers or less, more preferably 10 micrometers or more but 30 micrometers or less. Controlling the pitch can obtain a periodic laser mark. The laser mark can be confirmed by, for example, a microscope.

When the pitch of the laser falls within the preferable range, the deletion layer can be formed in a compact manner while damage to the electrode is prevented, and durability to mechanical stress can be improved while high durability to high temperature and high humidity is maintained.

<First Substrate>

A shape, a structure, and a size of the first substrate are not particularly limited and may be appropriately selected depending on the intended purpose.

A material of the first substrate is not particularly limited and may be appropriately selected depending on the intended purpose, so long as it has transparency and an insulation property. Examples of the material include substrates such as glass, plastic plates, plastic films, plastic membranes, ceramics, and inorganic transparent crystal substances. Among them, a substrate having heat resistance against a firing temperature is preferable when the firing step is performed to form the electron-transporting layer as described below. Moreover, the first substrate is preferably a substrate having flexibility.

<Second Substrate>

The second substrate is not particularly limited and known products may be used. Examples of the second substrate include substrates such as glass, transparent plastic plates, transparent plastic membranes, inorganic transparent crystal substances, plastic films, and ceramics. The joint portion between the second substrate and the sealing member may form concave-convex parts in order to increase adhesiveness.

A formation method of the concave-convex parts is not particularly limited and may be appropriately selected depending on the intended purpose. Examples of the formation method include the sand blasting method, the water blasting method, abrasive paper, the chemical etching method, and the laser processing method.

As a means for increasing adhesiveness between the second substrate and the sealing member, for example, an organic matter on the surface may be removed, or hydrophilicity may be improved. The means for removing an organic matter on the surface of the second substrate is not particularly limited and may be appropriately selected depending on the intended purpose. Examples of the means include UV ozone washing and an oxygen plasma treatment.

<Hole Blocking Layer>

The photoelectric conversion element may include a hole blocking layer.

The hole blocking layer is preferably formed between the first electrode and the electron-transporting layer.

The hole blocking layer transports, to the first electrode, electrons generated in the photosensitization compound and transported to the electron-transporting layer, and also prevents contact with the hole-transporting layer. Therefore, the hole blocking layer does not easily allow holes to flow into the first electrode and can prevent the output from being decreased due to recombination of electrons and holes. A solid photoelectric conversion element provided with the hole-transporting layer has a rapid recombination speed of holes in the hole-transporting material and electrons on the surface of the electrodes, compared to a wet-type photoelectric conversion element using an electrolytic solution. Therefore, an effect obtained by forming the hole blocking layer is considerably large.

A material of the hole blocking layer is not particularly limited and may be appropriately selected depending on the intended purpose, so long as the material is transparent to visible light and has an electron-transporting property. Examples of the material include: simple substance semiconductors such as silicon and germanium; compound semiconductors such as chalcogenides of metal; and compounds having a Perovskite structure.

Examples of the chalcogenide of metal include: oxides of titanium, tin, zinc, iron, tungsten, zirconium, hafnium, strontium, indium, cerium, yttrium, lanthanum, vanadium, niobium, and tantalum; sulfides of cadmium, zinc, lead, silver, antimony, and bismuth; selenides of cadmium and lead; and tellurides of cadmium. Other examples of the compound semiconductor include: phosphides of zinc, gallium, indium, and cadmium; gallium arsenide; copper-indium-selenide; and copper-indium-sulfide.

Examples of the compound having a Perovskite structure include strontium titanate, calcium titanate, sodium titanate, barium titanate, and potassium niobate.

Among them, oxide semiconductor is preferable, titanium oxide, niobium oxide, magnesium oxide, aluminum oxide, zinc oxide, tungsten oxide, and tin oxide are more preferable, titanium oxide is still more preferable.

These may be used alone or in combination. These may be a single layer or a laminated layer. A crystal type of these semiconductors is not particularly limited and may be appropriately selected depending on the intended purpose. The crystal type may be a single crystal, polycrystalline, or amorphous.

A film formation method of the hole-blocking layer is not particularly limited and may be appropriately selected depending on the intended purpose. Examples of the method include: the wet film formation such as a sol-gel method and a hydrolysis method using titanium tetrachloride; and the dry film formation such as sputtering. Among them, the sputtering method is preferable. When the film formation method of the hole-blocking layer is the sputtering method, the film density can be sufficiently high and electric current loss can be prevented.

An average thickness of the hole blocking layer is not particularly limited and may be appropriately selected depending on the intended purpose. The average thickness of the hole blocking layer is preferably 5 nm or more but 1 micrometer or less. In the wet film formation, the average thickness of the hole blocking layer is more preferably 500 nm or more but 700 nm or less. In the dry film formation, the average thickness of the hole blocking layer is more preferably 5 nm or more but 30 nm or less.

Embodiments of the photoelectric conversion element of the present disclosure will be described in detail with reference to the drawings.

In each drawing, the same component may be denoted by the same reference numeral, and the redundant description may be omitted. The number, position, shape, and the like of the following component are not limited to the embodiments of the present disclosure, and a preferable number, position, shape, and the like of the component may be used to perform the present disclosure.

First Embodiment

FIG. 1 is a schematic view presenting one example of a photoelectric conversion element of the first embodiment. In the photoelectric conversion element of FIG. 1, a first electrode 2 is formed on a first substrate 1, and a hole blocking layer 3 is formed on the first electrode 2. An electron-transporting layer 4 is formed on the hole blocking layer 3, and a photosensitization compound 5 is adsorbed on the surface of an electron-transporting material constituting the electron-transporting layer 4. A hole-transporting layer 6 is formed above and inside the electron-transporting layer 4, and a second electrode 7 is formed on the hole-transporting layer 6. A second substrate 8 is disposed above the second electrode 7, and the second substrate 8 is fixed by a sealing member 9 between the second substrate 8 and the first electrode 2.

Note that, each of the first electrode 2 and the second electrode 7 may include a path configured to allow electric current to pass to each electrode extraction terminal (not presented).

FIG. 2 is a schematic plan view of the photoelectric conversion element of the first embodiment of FIG. 1. As presented in FIG. 2, a sealing part 9 is disposed at a peripheral part of the second electrode. The sealing part 9 includes a minimum width A and a maximum width B, and includes a distance C between the second electrode and the sealing part 9.

This configuration makes it possible to improve a sealing effect of preventing excess entry of moisture or oxygen and to improve durability to mechanical stress such as torsion.

Second Embodiment

FIG. 3 is a schematic view presenting one example of a photoelectric conversion element of the second embodiment. The photoelectric conversion element of FIG. 3 has the same configuration as that of the photoelectric conversion element of the first embodiment, except that the hole blocking layer 3 disposed on the first electrode 2 has the same size as the first electrode 2, and the second substrate 8 is fixed by the sealing member 9 between the second substrate 8 and the hole blocking layer 3.

In the second embodiment, the same components as those in the first embodiment described above are denoted by the same reference numerals, and the redundant description will be omitted.

Third Embodiment

FIG. 4 is a schematic view presenting one example of a photoelectric conversion element of the third embodiment. The photoelectric conversion element of FIG. 4 has the same configuration as that of the photoelectric conversion element of the first embodiment, except that a deletion part 10 including a deletion layer 11 is disposed on the first electrode 2, and the second substrate 8 is fixed by the sealing member 9 between the second substrate 8 and the deletion layer 11.

In the third embodiment, the same components as those in the first embodiment described above are denoted by the same reference numerals, and the redundant description will be omitted.

Fourth Embodiment

FIG. 5 is a schematic view presenting one example of a photoelectric conversion element of the fourth embodiment. The photoelectric conversion element of FIG. 5 has the same configuration as that of the photoelectric conversion element of the first embodiment, except that the hole blocking layer 3 disposed on the first electrode 2 has the same size as the first electrode 2, the deletion part 10 including the deletion layer 11 is disposed on the hole blocking layer 3, and the second substrate 8 is fixed by the sealing member 9 between the second substrate 8 and the deletion layer 11.

In the fourth embodiment, the same components as those in the first embodiment described above are denoted by the same reference numerals, and the redundant description will be omitted.

Fifth Embodiment

FIG. 6 is a schematic view presenting one example of a photoelectric conversion element of the fifth embodiment. The photoelectric conversion element of FIG. 6 has the same configuration as that of the photoelectric conversion element of the first embodiment, except that the hole blocking layer 3 disposed on the first electrode 2 has the same size as the first electrode 2, the deletion part 10 including the deletion layer 11 is disposed on the hole blocking layer 3, and the second substrate 8 is fixed by the sealing member 9 including a spacer 12 between the second substrate 8 and the deletion layer 11.

In the fifth embodiment, the same components as those in the first embodiment described above are denoted by the same reference numerals, and the redundant description will be omitted.

(Photoelectric Conversion Module)

A photoelectric conversion module of the present disclosure includes a photoelectric conversion element-disposed region in which a plurality of photoelectric conversion elements are disposed adjacent to each other. The plurality of photoelectric conversion elements include at least a first electrode, an electron-transporting layer including a photo-sensitization compound, a hole-transporting layer, and a second electrode. The plurality of photoelectric conversion elements include a sealing part that is disposed at an edge of the photoelectric conversion element-disposed region and is configured to shield the electron-transporting layer from an external environment of the photoelectric conversion element, and further include other layers if necessary. Each layer may be a single layer structure or may be a laminated layer structure.

The photoelectric conversion module of the present disclosure may have such a configuration that includes a plurality of photoelectric conversion elements.

The configuration of each layer of the photoelectric conversion module may have the same configuration as the photoelectric conversion element.

Examples of the photoelectric conversion module include configurations in which the plurality of the photoelectric conversion elements are coupled in series or in parallel.

The photoelectric conversion module may be in the form of a continuous layer in which at least the hole-transporting layers are extended to each other in at least two photoelectric conversion elements adjacent to each other.

The photoelectric conversion module may have a configuration that includes a pair of substrates, the photoelectric conversion element-disposed region between the pair of substrates, and the sealing member sandwiched between the pair of substrates.

Hereinafter, one example of a photoelectric conversion module of the present disclosure will be described with reference to drawings. However, the present disclosure is not limited thereto, those that are not described in the embodiments of the present disclosure regarding the number, position, and shape of the following constituent components can be included in the scope of the present disclosure.

FIG. 7 is a schematic view presenting one example of a photoelectric conversion module of the present disclosure. FIG. 7 presents one example of a cross section of a part of the photoelectric conversion module that includes a plurality of photoelectric conversion elements coupled in series.

In FIG. 7, after the hole-transporting layer 6 is formed, a penetration part 13 is formed. Then, the second electrode 7 is formed thereon, to thereby introduce a material of the second electrode inside the penetration part 13, and this makes it possible to allow electric current to pass to the first electrode 2 of the adjacent cell. Note that, the first electrode 2 and the second electrode 7 each have an electrode of a further adjacent cell or a path configured to allow electric current to pass to an electrode extraction terminal, which is not presented in FIG. 7.

The penetration part 13 may penetrate through the first electrode 2 to reach the first substrate 1, or may not reach the first substrate 1 by stopping processing inside the first electrode 2.

In the case where a shape of the penetration part 13 is such a micropore that penetrates through the first electrode 2 and reaches the first substrate 1, when a total opening area of the micropore with respect to an area of the penetration part 13 is too large, a cross-sectional area of the film of the first electrode 2 is decreased to thereby increase the resistance value, which may cause a decrease of photoelectric conversion efficiency. Therefore, a ratio of the total opening area of the micropore to the area of the penetration part 13 is preferably 5/100 or more but 60/100 or less.

A method for forming the penetration part 13 is not particularly limited and may be appropriately selected depending on the intended purpose. Examples of the method include the sand blasting method, the water blasting method, the polishing method, the chemical etching method, and the laser processing method. Among them, the laser processing method is preferable. This makes it possible to form a minute hole without using, for example, sand, etching, or resist, and to perform processing with good cleanness and reproducibility. In addition, when the penetration part 13 is formed, at least one of the hole blocking layer 3, the electron-transporting layer 4, the hole-transporting layer 6, and the second electrode 7 can be removed through impact exfoliation using the laser processing method. As a result, it is not necessary to provide a mask at the time of laminating, and the aforementioned removal and formation of the minute penetration part 13 can be easily performed at one time.

(Electronic Device)

An electronic device of the present disclosure includes the photoelectric conversion element and/or the photoelectric conversion module of the present disclosure, and a device configured to be driven by electric power generated through photoelectric conversion of the photoelectric conversion element and/or the photoelectric conversion module, and further includes other devices if necessary.

(Power Supply Module)

A power supply module of the present disclosure includes the photoelectric conversion element and/or the photoelectric conversion module of the present disclosure and a power supply IC, and further includes other devices if necessary.

A specific embodiment of an electronic device including the photoelectric conversion element and/or the photoelectric conversion module of the present disclosure, and a device configured to be driven by electric power obtained through power generation of the photoelectric conversion element and/or the photoelectric conversion module will be described.

FIG. 8 presents one example where a mouse is used as the electronic device.

As presented in FIG. 8, a photoelectric conversion element and/or a photoelectric conversion module, a power supply IC, and an electricity storage device are combined and the supplied electric power is allowed to pass to a power supply of a control circuit of a mouse. As a result, the electricity storage device is charged when the mouse is not used, and the mouse can be driven by the electric power, and therefore such a mouse that does not require wiring or replacement of a cell can be obtained. Because a cell is not required, a weight thereof can be decreased, which is effective.

FIG. 9 presents a schematic view where a photoelectric conversion element is mounted in a mouse. A photoelectric conversion element, a power supply IC, and an electricity storage device are mounted inside a mouse, but an upper part of the photoelectric conversion element is covered with a transparent housing so that the photoelectric conversion element receives light. Moreover, the whole housing of the mouse can be formed by a transparent resin. The arrangement of the photoelectric conversion element is not limited to the above. For example, the photoelectric conversion element may be arranged in a position with which light is irradiated even when the mouse is covered with a hand, and such arrangement may be preferable.

Another embodiment of an electronic device including the photoelectric conversion element and/or the photoelectric conversion module of the present disclosure, and a device configured to be driven by electric power obtained through power generation of the photoelectric conversion element and/or the photoelectric conversion module will be described.

FIG. 10 presents one example where a keyboard used in a personal computer is used as the electronic device.

As presented in FIG. 10, a photoelectric conversion element, a power supply IC, and an electricity storage device are combined, and the supplied electric power is allowed to pass to a power supply of a control circuit of a keyboard. As a result, the electricity storage device is charged when the keyboard is not used, and the keyboard can be driven by the electric power. Therefore, such a keyboard that does not require wiring or replacement of a cell can be obtained. Because a cell is not required, a weight thereof can be decreased, which is effective.

FIG. 11 presents a schematic view in which a photoelectric conversion element is mounted in a keyboard. A photoelectric conversion element, a power supply IC, and an electricity storage device are mounted inside the keyboard, but an upper part of the photoelectric conversion element is covered with a transparent housing so that the photoelectric conversion element receives light. The whole housing of the keyboard can be formed by a transparent resin. The arrangement of the photoelectric conversion element is not limited to the above.

In the case of a small keyboard in which a space for incorporating the photoelectric conversion element is small, a small photoelectric conversion element may be embedded in some keys as presented in FIG. 12, and such arrangement is effective.

Another embodiment of an electronic device including the photoelectric conversion element and/or the photoelectric conversion module of the present disclosure, and a device configured to be driven by electric power obtained through power generation of the photoelectric conversion element and/or the photoelectric conversion module will be described.

FIG. 13 presents one example where a sensor is used as an electronic device.

As presented in FIG. 13, a photoelectric conversion element, a power supply IC, and an electricity storage device are combined, and the supplied electric power is allowed to pass to a power supply of a sensor circuit. As a result, a sensor module can be constituted without requiring connection to an external power supply and without requiring replacement of a cell. A sensing target is, for example, temperature and humidity, illuminance, human detection, $CO_2$, acceleration, UV, noise, terrestrial magnetism, and atmospheric pressure, and such an electronic device can be applied to various sensors, which is effective. As presented in A in FIG. 13, the sensor module is configured to sense a target to be measured on a regular basis and to transmit the read data to a personal computer (PC) or a smartphone through wireless communication.

It is expected that use of sensors is significantly increased as the internet of things (IoT) society approaches. Replacing batteries of numerous sensors one by one is time consuming and is not realistic. Moreover, the fact that a sensor is installed at a position such as a ceiling and a wall where a cell is not easily replaced also makes workability bad. Moreover, supplying electric power by the photoelectric conversion element is also a significantly large advantage. In addition, the photoelectric conversion element of the present disclosure has advantages that a high output can be obtained even with light of low illuminance and a high degree of freedom in installation can be achieved because dependence of light incident angle for the output is small.

Next, another embodiment of an electronic device including the photoelectric conversion element and/or the photoelectric conversion module of the present disclosure and a device configured to be driven by electric power obtained through power generation of the photoelectric conversion element and/or the photoelectric conversion module will be described.

FIG. 14 presents one example in which a turntable is used as the electronic device.

As presented in FIG. 14, the photoelectric conversion element, a power supply IC, and an electricity storage device are combined, and the supplied electric power is allowed to pass to a power supply of a turntable control circuit. As a result, a turntable can be constituted without requiring connection to an external power supply and without requiring replacement of a cell.

The turntable is used, for example, in a display case in which products are displayed. Wiring of a power supply degrades appearance of the display, and moreover displayed products need to be removed at the time of replacing a cell, which is time-consuming. Use of the photoelectric conversion element of the present disclosure is effective because the aforementioned problems can be solved.

<Use>

As described above, the electronic device including the photoelectric conversion element and/or the photoelectric conversion module of the present disclosure and the device configured to be driven by electric power obtained through power generation of the photoelectric conversion element and/or the photoelectric conversion module, and the power supply module have been described above. However, the embodiments described are only part of applicable embodiments, and use of the photoelectric conversion element or the photoelectric conversion module of the present disclosure is not limited to the above-described uses.

The photoelectric conversion element and/or the photoelectric conversion module can be applied for, for example, a power supply device by combining it with, for example, a circuit board configured to control generated electric current.

Examples of devices using the power supply device include electronic desk calculators, watches, mobile phones, electronic organizers, and electronic paper.

Moreover, a power supply device including the photoelectric conversion element can be used as an auxiliary power supply for prolonging a continuous operating time of a charge-type or dry cell-type electronic equipment.

The photoelectric conversion element and the photoelectric conversion module of the present disclosure can function as a self-sustaining power supply, and electric power generated through photoelectric conversion can be used to drive a device. Because the photoelectric conversion element and the photoelectric conversion module of the present disclosure can generate electricity by irradiation of light, it is not necessary to couple the electronic device to a power supply or to replace a cell. Therefore, the electronic device can be driven in a place where there is no power supply facility, the electronic device can be worn or carried, and the electronic device can be driven without replacement of a cell even in a place where a cell is not easily replaced. Moreover, when a dry cell is used, the electronic device becomes heavy by a weight of the dry cell, or the electronic device becomes large by a size of the dry cell. Therefore, there may be a problem in installing the electronic device on a wall or ceiling, or transporting the electronic device. Because the photoelectric conversion element and the photoelectric conversion module of the present disclosure are light and thin, they can be freely installed, and can be worn and carried, which is advantageous.

As described above, the photoelectric conversion element and the photoelectric conversion module of the present disclosure can be used as a self-sustaining power supply, and can be combined with various electronic devices. For example, the photoelectric conversion element and the photoelectric conversion module of the present disclosure can be used in combination with numerous electronic devices such as a display device (e.g., an electronic desk calculator, a watch, a mobile phone, an electronic organizer, and electronic paper), an accessory device of a personal computer (e.g., a mouse and a keyboard), various sensor devices (e.g., a temperature and humidity sensor and a human detection sensor), a transmitter (e.g., a beacon and a global positioning system (GPS)), an auxiliary lamp, and a remote controller.

The photoelectric conversion element and the photoelectric conversion module of the present disclosure are widely applied because they can generate electricity particularly with light of low illuminance and can generate electricity indoors and in further darker shade. Moreover, the photoelectric conversion element and the photoelectric conversion module are highly safe because liquid leakage found in the case of a dry cell does not occur and accidental ingestion found in the case of a button cell does not occur. Furthermore, the photoelectric conversion element and the photoelectric conversion module can be used as an auxiliary power supply for the purpose of prolonging a continuous operation time of a charge-type or dry cell-type electronic equipment. As described above, when the photoelectric conversion element and the photoelectric conversion module of the present disclosure are combined with a device configured to be driven by electric power generated through photoelectric conversion of the photoelectric conversion element and the photoelectric conversion module, it is possible to obtain an electronic device that is light and easy to use, has a high degree of freedom in installation, does not require replacement of a cell, is excellent in safety, and is effective in decreasing environmental loads.

FIG. 15 presents a basic configuration diagram of an electronic device obtained by combining the photoelectric conversion element and/or the photoelectric conversion module of the present disclosure with a device configured to be driven by electric power generated through photoelectric conversion of the photoelectric conversion element and/or the photoelectric conversion module. The electronic device can generate electricity when the photoelectric conversion element is irradiated with light, and can extract electric power. A circuit of the device can be driven by the generated electric power.

Because the output of the photoelectric conversion element varies depending on circumferential illuminance, the electronic device presented in FIG. 15 may not be stably driven in some cases. In this case, as presented in FIG. 16, a power supply IC for a photoelectric conversion element can be incorporated between the photoelectric conversion element and the circuit of the device in order to supply stable voltage to a side of the circuit, and such arrangement is effective.

The photoelectric conversion element can generate electricity so long as light of sufficient illuminance is emitted. However, when illuminance for generating electricity is not enough, desired electric power cannot be obtained, which is a disadvantage of the photoelectric conversion element. In this case, as presented in FIG. 17, when an electricity storage device such as a capacitor is mounted between a power supply IC and a device circuit, excess electric power from the photoelectric conversion element can be stored in the electricity storage device. In addition, the electric power stored in the electricity storage device can be supplied to a device circuit to thereby enable stable operation when the illuminance is too low or even when light is not applied to the photoelectric conversion element.

As described above, the electronic device obtained by combining the photoelectric conversion element and/or the photoelectric conversion module of the present disclosure with the device circuit can be driven even in an environment without a power supply, does not require replacement of a cell, and can be stably driven by combination with a power supply IC or an electricity storage device. Therefore, it is possible to make the most of advantages of the photoelectric conversion element.

Meanwhile, the photoelectric conversion element and/or the photoelectric conversion module of the present disclosure can also be used as a power supply module, and such use is effective. As presented in FIG. 18, for example, when the photoelectric conversion element and/or the photoelectric conversion module of the present disclosure are coupled to a power supply IC for a photoelectric conversion element, it is possible to constitute a DC power supply module capable of supplying electric power generated through photoelectric conversion of the photoelectric conversion element to the power supply IC at a predetermined voltage level.

Moreover, as presented in FIG. 19, when an electricity storage device is added to a power supply IC, electric power generated by the photoelectric conversion element can be stored in the electricity storage device. Therefore, a power supply module to which electric power can be supplied can be constituted when the illuminance is too low or even when light is not applied to the photoelectric conversion element. The power supply modules of the present disclosure presented in FIG. 18 and FIG. 19 can be used as a power supply module without replacement of a cell as in case of primary cells known in the art.

EXAMPLES

Hereinafter, Examples of the present disclosure will be described. However, the present disclosure should not be construed as being limited to these Examples.

Example 1

<Production of Photoelectric Conversion Element>

On a glass substrate as a first substrate, indium-doped tin oxide (ITO) and niobiumdoped tin oxide (NTO) were sequentially subjected to sputtering for film formation to obtain, as a first electrode, an ITO-coated glass, which was an ITO conductive film. On the ITO-coated glass, a compact layer formed of titanium oxide as a hole blocking layer was formed through reactive sputtering with oxygen gas.

Next, titanium oxide (product name: P90, obtained from NIPPON AEROSIL CO., LTD.) (3 g), acetyl acetone (0.2 g), and polyoxyethylene octylphenyl ether (obtained from Wako Pure Chemical Industries, Ltd.) (0.3 g) as a surfactant were subjected to a bead mill treatment for 12 hours together with water (5.5 g) and ethanol (1.0 g) to prepare a titanium oxide dispersion liquid. Polyethylene glycol (product name: polyethylene glycol 20,000, obtained from Wako Pure Chemical Industries, Ltd.) (1.2 g) was added to the prepared titanium oxide dispersion liquid to prepare a paste. The prepared paste was coated on the hole blocking layer (average thickness: 1.5 micrometers), dried at 50 degrees Celsius, and baked in the air at 500 degrees Celsius for 30 minutes to form a porous electron-transporting layer.

The glass substrate on which the electron-transporting layer had been formed was immersed in an acetonitrile/t-butanol (volume ratio of 1:1) solution of a photosensitization compound expressed by the following Structural Formula (A) (product name: DN455, obtained from Chemicrea Inc.) (0.2 mM) and chenodeoxycholic acid (CDCA, obtained from Tokyo Chemical Industry Co., Ltd.) (0.4 mM). The resultant was left to stand for 1 hour in the dark to adsorb the photosensitization compound on the surface of the electron-transporting layer.

To a chlorobenzene solution (1 mL) of a hole-transporting material expressed by the D-7 (obtained from Merck) (246.5 mg), lithium bis(trifluoromethanesulfonyl)imide (product name: LiTFSI, obtained from Tokyo Chemical Industry Co., Ltd.) (37.0 mg) as an additive and a basic compound expressed by the C-1 (37.5 mg) were added and dissolved to prepare a hole-transporting layer coating liquid.

[Chem. 36]

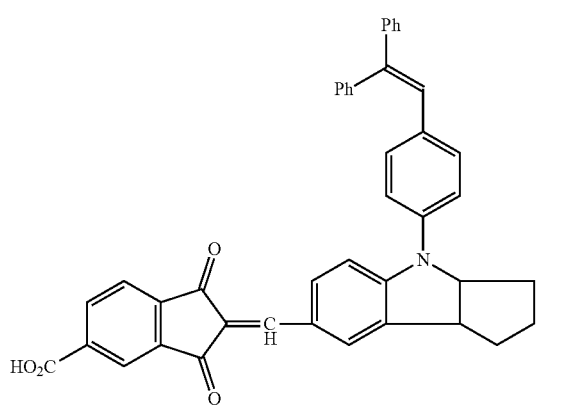

Structural Formula (A)

Here, Ph represents a phenyl group.

On the electron-transporting layer to which the photosensitization compound was adsorbed, the hole-transporting layer coating liquid was used to form a hole-transporting layer through spin coating (average thickness: 600 nm). At this time, the peripheral part of the electron-transporting layer was protected using masking tape so that the hole-transporting layer would not be attached thereto. After formation of the hole-transporting layer, the masking tape was peeled and removed.

Then, silver was deposited on the hole-transporting layer under vacuum, and a second electrode (average thickness: 100 nm) was formed to produce a photoelectric conversion element.

After formation of the second electrode, an acrylic resin (ultraviolet ray curable type, product name: TB3035B, obtained from ThreeBond Holdings Co., Ltd.) as a sealing member was coated using a screen printer (obtained from Micro-tec Co., Ltd.). A structure in the width direction can be adjusted by a printing pattern design of a screen printing plate (obtained from SONOCOM).

Then, nitrogen gas was introduced into a glove box, and the resultant was transferred thereto. A cover glass as a second substrate was placed on the sealing member and the sealing member was cured by irradiation of ultraviolet rays. Then, the power generation region was sealed to produce a photoelectric conversion element of Example 1.

The sealing structure with a curved shape in the obtained photoelectric conversion element of Example 1 was presented in FIG. 20 and Table 1-1.

Examples 2 to 9

Photoelectric conversion elements of Examples 2 to 9 were produced in the same manner as in Example 1 except that the printing pattern was changed so that the sealing part would have a curved shape as presented in FIG. 21; and the values of the minimum width A, the maximum width B, and the distance C of the sealing part were changed to values as presented in Table 1-1.

Examples 10 to 18

Photoelectric conversion elements of Examples 10 to 18 were produced in the same manner as in Example 2 except that the sealing member was changed to an epoxy resin (ultraviolet ray curable type, product name: WorldRock No. 5910, obtained from Kyoritsu Chemical & Co., Ltd.); and the values of the minimum width A, the maximum width B, and the distance C of the sealing part were changed to values as presented in Table 1-1.

Example 19

A photoelectric conversion element of Example 19 was produced in the same manner as in Example 12 except that the printing pattern was changed so that the sealing part would have a rectangular shape as presented in FIG. 22; and the values of the minimum width A, the maximum width B, and the distance C of the sealing part were changed to values as presented in Table 1-1.

Example 20

A photoelectric conversion element of Example 20 was produced in the same manner as in Example 12 except that the printing pattern was changed so that the sealing part would have a wedge shape as presented in FIG. 23; and the values of the minimum width A, the maximum width B, and the distance C of the sealing part were changed to values as presented in Table 1-1.

Example 21

A photoelectric conversion element of Example 21 was produced in the same manner as in Example 12 except that an electron-transporting layer and an hole-transporting layer were coated on the entire substrate; the electron-transporting layer and the hole-transporting layer were subjected to impact exfoliation using laser at the same time to form a deletion part; and a sealing member was coated.

Laser was emitted from a side of the first electrode. A laser device was a laser patterning device (obtained from Seishin Trading Co., Ltd.). An oscillator was a THG (Third Harmonic Generation) oscillator. The power was set to 8.5 microjoules, the defocus was set to −5 mm, the processing pitch was set to 20 micrometers, and the wavelength was set to 355 nm.

The thickness of the deletion layer and the elementary analysis of the surface were measured in the following manner. Specifically, a cross section was cut using a diamond wire saw (obtained from Meiwafosis Co., Ltd., DWS3100). The cross section was processed under a focused ion beam scanning electron microscope FIB-SEM (obtained from Hitachi High-Technologies Corporation), and was measured through energy-dispersive X-ray spectroscopy SEM-EDX (obtained from Hitachi High-Technologies Corporation). The obtained SEM image and the measurement conditions of the SEM (acceleration voltage: 3 kV, aperture size: 60 micrometers) are presented in FIG. 27, and the maximum thickness and the minimum thickness of the obtained deletion layer and the region (%) including the deletion layer are presented in Table 1-1. In the elementary analysis of the surface, an element (Ti) derived from the electron-transporting layer was confirmed.

Examples 22 to 32

Photoelectric conversion elements of Examples 22 to 32 were produced in the same manner as in Example 21 except that the power of the laser, defocus, and processing pitch were adjusted, and the maximum thickness and the minimum thickness of the deletion layer and the region including the deletion layer were changed to those as described in Table 1-1 and Table 1-2.

Example 33

A photoelectric conversion element of Example 33 was produced in the same manner as in Example 12 except that the hole-transporting layer was formed without protection using masking tape; the hole-transporting layer around the peripheral part of the electron-transporting layer was subjected to impact exfoliation using laser to form a deletion part; and a sealing member was coated.

Laser was emitted from a side of the first electrode. A laser device was a laser patterning device (obtained from Seishin Trading Co., Ltd.). An oscillator was a THG (Third Harmonic Generation) oscillator. The power was set to 8.5 microjoules, the defocus was set to −5 mm, the processing pitch was set to 20 micrometers, and the wavelength was set to 355 nm.

The thickness of the deletion layer and the elementary analysis of the surface were measured in the following manner. Specifically, a cross section was cut using a diamond wire saw (obtained from Meiwafosis Co., Ltd., DWS3100). The cross section was processed under a focused ion beam scanning electron microscope FIB-SEM (obtained from Hitachi High-Technologies Corporation), and was measured through energy-dispersive X-ray spectroscopy SEM-EDX (obtained from Hitachi High-Technologies Corporation). The maximum thickness and the minimum thickness of the obtained deletion layer and the region (%) including the deletion layer are presented in Table 1-2. In the elementary analysis of the surface, elements (F, S) derived from the hole-transporting layer were confirmed.

Examples 34 and 35

Photoelectric conversion elements of Examples 34 and 35 were produced in the same manner as in Example 21 except that the printing pattern was changed so that the distances C between the sealing part and the second electrode would be 50 micrometers, 100 micrometers, respectively.

Example 36

A photoelectric conversion element of Example 36 was produced in the same manner as in Example 35 except that $SiO_2$ particles having a particle diameter of 40 micrometers as a spacer were mixed in the sealing member.

Example 37

A photoelectric conversion element of Example 37 was produced in the same manner as in Example 35 except that the sealing member was coated and was cured with ultraviolet rays (UV) without placing a cover glass thereon to produce a spacer having a thickness of 40 micrometers, the sealing resin was coated again, and a cover glass was placed thereon for sealing.

Example 38

A photoelectric conversion module of Example 38 was produced in the same manner as in Example 37 except that an ITO conductive film that is a first electrode was subjected to laser etching using a laser device to process it so as to have a 6-cell series substrate; a through hole configured to couple the photoelectric conversion elements in series was formed through laser processing after formation of the hole-transporting layer; and silver was deposited on the hole-transporting layer under vacuum using a mask patterned so as to have a 6-cell series, to form a second electrode (average thickness: 100 nm).

Comparative Example 1

A photoelectric conversion element of Comparative Example 1 was produced in the same manner as in Example 1 except that the printing pattern was changed so that the sealing part having the same width was disposed in a linear manner as presented in FIG. 24; and the values of the minimum width A, the maximum width B, and the distance C were changed to values presented in Table 1-2.

Comparative Example 2

A photoelectric conversion element of Comparative Example 2 was produced in the same manner as in Example 1 except that the printing pattern was changed so that the sealing part having the same width was disposed in a tortuous manner as presented in FIG. 25; and the values of the minimum width A, the maximum width B, and the distance C were changed to values presented in Table 1-2.

Comparative Examples 3 and 4

Photoelectric conversion elements of Comparative Examples 3 and 4 were produced in the same manner as in Example 1 except that the printing pattern was changed so that the values of the minimum width A, the maximum width B, and the distance C of the sealing part were changed to values presented in Table 1-2.

The obtained photoelectric conversion elements of Examples 1 to 38 and Comparative Examples 1 to 4 were measured for the initial maximum output power (Pmax1) and the maintenance rate of durability (Pmax2/Pmax1) in the following manners. Results are presented in Table 1-1 and Table 1-2.

<Initial Maximum Output Power (Pmax1) and Maintenance Rate of Durability (Pmax2/Pmax1)>

Each of the produced photoelectric conversion elements was evaluated for IV characteristics using a solar cell evaluation system (DC voltage•current source/monitor, 6241A, obtained from ADC CORPORATION) under irradiation of white LED adjusted to 200 lux, to determine the initial maximum output power Pmax1 ($\mu W/cm^2$).

Then, three corner portions of each of the produced photoelectric conversion elements were supported, and one corner portion was subjected to the torsion test where load of 15 N was applied to the one portion. The torsion test was performed at each of the four corner portions.

Moreover, the photoelectric conversion element after the torsion test was stored for 500 hours under irradiation of white LED adjusted to 200 lux in an environment (40 degrees Celsius and 90% RH). Then, the photoelectric conversion element was evaluated for the IV characteristics again to determine the maximum output power Pmax2 ($\mu W/cm^2$) after the high-temperature and high-humidity usage test. The obtained Pmax2 was divided by the Pmax1 as an initial value to determine "maintenance rate of durability" (Pmax2/Pmax1).

TABLE 1-1

| | A (mm) | B (mm) | B/A | Maximum thickness of deletion layer (nm) | Minimum thickness of deletion layer (nm) | Region (%) including deletion layer | C (μm) | Resin | Spacer | Pmax1 (μW/cm²) | Maintenance rate of durability (%) |
|---|---|---|---|---|---|---|---|---|---|---|---|
| Ex. 1 | 0.8 | 1.2 | 1.50 | — | — | — | 30 | Acrylic resin | Absence | 9.4 | 74 |
| Ex. 2 | 1.18 | 1.2 | 1.02 | — | — | — | 31 | Acrylic resin | Absence | 9.4 | 62 |
| Ex. 3 | 1.1 | 1.2 | 1.09 | — | — | — | 31 | Acrylic resin | Absence | 9.4 | 70 |
| Ex. 4 | 0.9 | 1.2 | 1.33 | — | — | — | 32 | Acrylic resin | Absence | 9.4 | 74 |
| Ex. 5 | 0.8 | 1.2 | 1.50 | — | — | — | 32 | Acrylic resin | Absence | 9.4 | 74 |
| Ex. 6 | 0.6 | 1.2 | 2.00 | — | — | — | 32 | Acrylic resin | Absence | 9.4 | 74 |
| Ex. 7 | 0.4 | 1.2 | 3.00 | — | — | — | 31 | Acrylic resin | Absence | 9.4 | 72 |
| Ex. 8 | 0.3 | 1.2 | 4.00 | — | — | — | 31 | Acrylic resin | Absence | 9.4 | 68 |
| Ex. 9 | 0.24 | 1.2 | 5.00 | — | — | — | 31 | Acrylic resin | Absence | 9.4 | 60 |
| Ex. 10 | 1.18 | 1.2 | 1.02 | — | — | — | 30 | Epoxy resin | Absence | 9.6 | 68 |
| Ex. 11 | 1.1 | 1.2 | 1.09 | — | — | — | 30 | Epoxy resin | Absence | 9.6 | 77 |
| Ex. 12 | 0.8 | 1.2 | 1.50 | — | — | — | 31 | Epoxy resin | Absence | 9.6 | 81 |
| Ex. 13 | 0.6 | 1.2 | 2.00 | — | — | — | 31 | Epoxy resin | Absence | 9.6 | 81 |
| Ex. 14 | 0.4 | 1.2 | 3.00 | — | — | — | 31 | Epoxy resin | Absence | 9.6 | 79 |
| Ex. 15 | 0.24 | 1.2 | 5.00 | — | — | — | 30 | Epoxy resin | Absence | 9.6 | 66 |
| Ex. 16 | 0.80 | 0.90 | 1.13 | — | — | — | 30 | Epoxy resin | Absence | 9.6 | 78 |
| Ex. 17 | 0.80 | 1.00 | 1.25 | — | — | — | 31 | Epoxy resin | Absence | 9.6 | 50 |
| Ex. 18 | 0.80 | 1.10 | 1.38 | — | — | — | 32 | Epoxy resin | Absence | 9.6 | 81 |
| Ex. 19 | 0.8 | 1.2 | 1.50 | — | — | — | 31 | Epoxy resin | Absence | 9.6 | 81 |
| Ex. 20 | 0.8 | 1.2 | 1.50 | — | — | — | 31 | Epoxy resin | Absence | 9.6 | 81 |
| Ex. 21 | 0.8 | 1.2 | 1.50 | 160 | 0 | 73 | 30 | Epoxy resin | Absence | 9.6 | 95 |
| Ex. 22 | 0.8 | 1.2 | 1.50 | 10 | 0 | 70 | 30 | Epoxy resin | Absence | 9.6 | 90 |
| Ex. 23 | 0.8 | 1.2 | 1.50 | 105 | 0 | 75 | 32 | Epoxy resin | Absence | 9.6 | 93 |
| Ex. 24 | 0.8 | 1.2 | 1.50 | 159 | 10 | — | 31 | Epoxy resin | Absence | 9.6 | 90 |

TABLE 1-2

| | A (mm) | B (mm) | B/A | Maximum thickness of deletion layer (nm) | Minimum thickness of deletion layer (nm) | Region (%) including deletion layer | C (μm) | Resin | Spacer | Pmax1 (μW/cm²) | Maintenance rate of durability (%) |
|---|---|---|---|---|---|---|---|---|---|---|---|
| Ex. 25 | 0.8 | 1.2 | 1.50 | 161 | 21 | — | 31 | Epoxy resin | Absence | 9.6 | 86 |
| Ex. 26 | 0.8 | 1.2 | 1.50 | 300 | 0 | 71 | 31 | Epoxy resin | Absence | 9.6 | 92 |
| Ex. 27 | 0.8 | 1.2 | 1.50 | 504 | 0 | 73 | 30 | Epoxy resin | Absence | 9.6 | 85 |
| Ex. 28 | 0.8 | 1.2 | 1.50 | 158 | 0 | 30 | 31 | Epoxy resin | Absence | 9.6 | 91 |
| Ex. 29 | 0.8 | 1.2 | 1.50 | 159 | 0 | 40 | 32 | Epoxy resin | Absence | 9.6 | 93 |
| Ex. 30 | 0.8 | 1.2 | 1.50 | 159 | 0 | 55 | 32 | Epoxy resin | Absence | 9.6 | 94 |
| Ex. 31 | 0.8 | 1.2 | 1.50 | 160 | 0 | 80 | 31 | Epoxy resin | Absence | 9.6 | 94 |
| Ex. 32 | 0.8 | 1.2 | 1.50 | 162 | 0 | 95 | 31 | Epoxy resin | Absence | 9.6 | 91 |
| Ex. 33 | 0.8 | 1.2 | 1.50 | 5 | 0 | 73 | 31 | Epoxy resin | Absence | 9.6 | 83 |
| Ex. 34 | 0.8 | 1.2 | 1.50 | 160 | 0 | 75 | 50 | Epoxy resin | Absence | 9.8 | 95 |
| Ex. 35 | 0.8 | 1.2 | 1.50 | 161 | 0 | 72 | 100 | Epoxy resin | Absence | 10.1 | 95 |

TABLE 1-2-continued

|  | A (mm) | B (mm) | B/A | Maximum thickness of deletion layer (nm) | Minimum thickness of deletion layer (nm) | Region (%) including deletion layer | C (μm) | Resin | Spacer | Pmax1 (μW/cm$^2$) | Maintenance rate of durability (%) |
|---|---|---|---|---|---|---|---|---|---|---|---|
| Ex. 36 | 0.8 | 1.2 | 1.50 | 161 | 0 | 7 | 101 | Epoxy resin | Presence | 10.1 | 97 |
| Ex. 37 | 0.8 | 1.2 | 1.50 | 161 | 0 | 71 | 102 | Epoxy resin | Presence | 10.1 | 98 |
| Ex. 38 | 0.8 | 1.2 | 1.50 | 161 | 0 | 72 | 101 | Epoxy resin | Presence | 10.1 | 98 |
| Comp. Ex. 1 | 1.2 | 1.2 | 1.00 | — | — | — | 30 | Acrylic resin | Absence | 9.4 | 44 |
| Comp. Ex. 2 | 1.2 | 1.2 | 1.00 | — | — | — | 31 | Acrylic resin | Absence | 9.4 | 44 |
| Comp. Ex. 3 | 0.22 | 1.2 | 5.45 | — | — | — | 31 | Acrylic resin | Absence | 9.4 | 40 |
| Comp. Ex. 4 | 0.2 | 1.2 | 6.00 | — | — | — | 30 | Acrylic resin | Absence | 9.4 | 17 |

From the results of Table 1-1 and Table 1-2, the photoelectric conversion elements of Examples 1 to 38, which satisfied "a width of the sealing part disposed at each side has a minimum width A and a maximum width B in a width direction, and a ratio (B/A) of the maximum width B to the minimum width A is 1.02 or more but 5.0 or less", were excellent in the durability to mechanical stress and the stability over time in the torsion test.

Specifically, it is believed that because the sealing part was disposed around the photoelectric conversion layer, damages (exfoliation and crack) of the photoelectric conversion layer could be prevented when the photoelectric conversion element was deformed by mechanical stress; and a displacement amount could become large in accordance with the deformation of the photoelectric conversion element to prevent exfoliation or breakage of the sealing part. Meanwhile, the photoelectric conversion elements of Comparative Examples 1 to 4, which did not satisfy "a width of the sealing part disposed at each side has a minimum width A and a maximum width B in a width direction, and a ratio (B/A) of the maximum width B to the minimum width A is 1.02 or more but 5.0 or less", could not obtain desired characteristics.

From the above results, it was found that the photoelectric conversion element of the present disclosure is excellent in durability to mechanical stress and stability over time.

Aspects of the present disclosure are as follows, for example.

<1> A photoelectric conversion element including:
a first substrate;
a first electrode;
a photoelectric conversion layer;
a second electrode; and
a second substrate,
wherein the photoelectric conversion element includes a sealing part sealing at least the photoelectric conversion layer,
the sealing part is disposed so as to surround periphery of the photoelectric conversion layer, and
a width of the sealing part disposed at each side has a minimum width A and a maximum width B in a width direction, and a ratio (B/A) of the maximum width B to the minimum width A is 1.02 or more but 5.0 or less.

<2> The photoelectric conversion element according to <1>,
wherein at least part of a peripheral part of the photoelectric conversion layer includes a deletion part,
the photoelectric conversion element includes a sealing part between the deletion part and the second substrate, and
the deletion part includes a deletion layer containing one or more kinds of constituent materials of the photoelectric conversion layer.

<3> The photoelectric conversion element according to <2>,
wherein the deletion layer has concave-convex parts.

<4> The photoelectric conversion element according to <3>,
wherein a maximum thickness of the deletion layer is 10 nm or more but 300 nm or less.

<5> The photoelectric conversion element according to <3> or <4>,
wherein a minimum thickness of the deletion layer is 0 nm.

<6> The photoelectric conversion element according to any one of <2> to <5>,
wherein the photoelectric conversion layer includes an electron-transporting layer and a hole-transporting layer, and
the deletion layer includes same material as the electron-transporting layer.

<7> The photoelectric conversion element according to any one of <1> to <6>,
wherein the ratio (B/A) of the maximum width B to the minimum width A is 1.09 or more but 3.0 or less.

<8> The photoelectric conversion element according to any one of <1> to <7>,
wherein a distance C between the sealing part and the second electrode is 30 micrometers or more.

<9> The photoelectric conversion element according to any one of <1> to <8>,
wherein the sealing part includes an epoxy resin.

<10> The photoelectric conversion element according to any one of <1> to <9>,
wherein the sealing part is formed of a sealing resin and a spacer.

<11> A photoelectric conversion module including a plurality of photoelectric conversion elements, each of the plurality of photoelectric conversion elements being the photoelectric conversion element according to any one of <1> to <10>.

<12> The photoelectric conversion module according to <11>,
wherein the plurality of photoelectric conversion elements are coupled in series or in parallel.

<13> An electronic device including:
the photoelectric conversion element according to any one of <1> to <10> or the photoelectric conversion module according to <11> or <12>; and
a device configured to be driven by electric power generated through photoelectric conversion of the photoelectric conversion element or the photoelectric conversion module.

<14> A power supply module including:
the photoelectric conversion element according to any one of <1> to <10> or the photoelectric conversion module according to <11> or <12>; and
a power supply IC.
<15> An electronic device including:
the power supply module according to <14>; and
an electricity storage device.

The photoelectric conversion element according to any one of <1> to <10>, the photoelectric conversion module according to <11> or <12>, the electronic device according to <13> or <15>, and the power supply module according to <14> can solve the conventionally existing problems and can achieve the object of the present disclosure.

REFERENCE SIGNS LIST

1: first substrate
2: first electrode
3: hole blocking layer
4: electron-transporting layer
5: photosensitization compound
6: hole-transporting layer
7: second electrode
8: second substrate
9: sealing part
10: deletion part
11: deletion layer
12: spacer

The invention claimed is:
1. A photoelectric conversion element comprising:
a first substrate;
a first electrode;
a photoelectric conversion layer including an electron-transporting layer and a hole-transporting layer;
a second electrode; and
a second substrate,
wherein the photoelectric conversion element includes a sealing part sealing at least the photoelectric conversion layer,
the sealing part is disposed so as to surround periphery of the photoelectric conversion layer, and
a width of the sealing part disposed at each side has a minimum width A and a maximum width B in a width direction, and a ratio (B/A) of the maximum width B to the minimum width A is 1.02 or more but 5.0 or less,
wherein the photoelectric conversion element further comprises a deletion part surrounding the periphery of the photoelectric conversion layer,
the sealing part is disposed between the deletion part and the second substrate,
the sealing part is in direct contact with the deletion part, and
the deletion part includes a deletion layer containing same materials as the electron-transporting layer.
2. The photoelectric conversion element according to claim 1,
wherein the deletion layer has concave-convex parts.
3. The photoelectric conversion element according to claim 2,
wherein a maximum thickness of the deletion layer is 10 nm or more but 300 nm or less.
4. The photoelectric conversion element according to claim 2,
wherein a minimum thickness of the deletion layer is 5 nm.
5. The photoelectric conversion element according to claim 1,
wherein the ratio (B/A) of the maximum width B to the minimum width A is 1.09 or more but 3.0 or less.
6. The photoelectric conversion element according to claim 1,
wherein a distance C between the sealing part and the second electrode is 30 micrometers or more.
7. The photoelectric conversion element according to claim 1,
wherein the sealing part includes an epoxy resin.
8. The photoelectric conversion element according to claim 1,
wherein the sealing part is formed of a sealing resin and a spacer.
9. A photoelectric conversion module comprising
a plurality of photoelectric conversion elements, each of the plurality of photoelectric conversion elements being the photoelectric conversion element according to claim 1.
10. The photoelectric conversion module according to claim 9,
wherein the plurality of photoelectric conversion elements are coupled in series or in parallel.
11. An electronic device comprising:
the photoelectric conversion element according to claim 1; and
a device configured to be driven by electric power generated through photoelectric conversion of the photoelectric conversion element.
12. A power supply module comprising:
the photoelectric conversion element according to claim 1; and
a power supply IC.
13. An electronic device comprising:
the power supply module according to claim 12; and
an electricity storage device.
14. An electronic device comprising:
the photoelectric conversion module according to claim 9; and
a device configured to be driven by electric power generated through photoelectric conversion of the photoelectric conversion module.
15. A power supply module comprising:
the photoelectric conversion module according to claim 9; and
a power supply IC.
16. An electronic device comprising:
the power supply module according to claim 15; and
an electricity storage device.

* * * * *